(12) United States Patent
Gushima et al.

(10) Patent No.: US 7,986,597 B2
(45) Date of Patent: Jul. 26, 2011

(54) PLL CONTROL DEVICE AND REPRODUCTION APPARATUS WITH LINKING PORTION CONTROL

(75) Inventors: Toyoji Gushima, Osaka (JP); Shigeru Furumiya, Hyogo (JP); Takashi Ishida, Kyoto (JP); Hiromichi Ishibashi, Osaka (JP); Hironori Deguchi, Osaka (JP); Atsushi Nakamura, Osaka (JP); Junichi Minamino, Nara (JP); Makoto Usui, Osaka (JP); Takeshi Nakajima, Nara (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 12/818,188

(22) Filed: Jun. 18, 2010

(65) Prior Publication Data

US 2010/0254240 A1   Oct. 7, 2010

Related U.S. Application Data

(63) Continuation of application No. 12/139,085, filed on Jun. 13, 2008, now Pat. No. 7,768,893, which is a continuation of application No. 11/552,543, filed on Oct. 25, 2006, now Pat. No. 7,403,462, which is a continuation of application No. 10/203,849, filed as application No. PCT/JP01/11507 on Dec. 26, 2001, now Pat. No. 7,158,464.

(30) Foreign Application Priority Data

Dec. 26, 2000 (JP) .................................. 2000-395311
Feb. 20, 2001 (JP) .................................. 2001-043016
Jun. 4, 2001 (JP) .................................. 2001-168882

(51) Int. Cl.
*G11B 7/00* (2006.01)

(52) U.S. Cl. ..................................... 369/47.3; 369/53.34
(58) Field of Classification Search ............... 369/47.15, 369/47.17, 47.21–47.31, 47.35, 53.24, 53.31–53.37, 369/59.14–59.2, 59.23, 59.25–59.27, 124.07–124.11
See application file for complete search history.

(56) References Cited

U.S. PATENT DOCUMENTS

| 5,276,667 | A |   | 1/1994 | Tsutsui et al. |
| 5,754,522 | A |   | 5/1998 | Kobayashi et al. |
| 5,812,502 | A | * | 9/1998 | Hirai et al. .................. 369/47.34 |

(Continued)

FOREIGN PATENT DOCUMENTS

EP   0 367 217 A1   5/1990

(Continued)

OTHER PUBLICATIONS

International Search Report for corresponding Application No. PCT/JP01/11507 mailed Sep. 23, 2002.

(Continued)

*Primary Examiner* — Wayne R Young
*Assistant Examiner* — Nathan A Danielsen
(74) *Attorney, Agent, or Firm* — Renner, Otto, Boisselle & Sklar, LLP

(57) ABSTRACT

A recording medium comprising a recording area, the recording area includes a first area and a second area, the first area includes a frame area, the frame area includes an area in which a second synchronization code sequence and at least a portion of data are to be recorded, and the second area includes an area in which a third synchronization code sequence and a fourth synchronization code sequence are to be recorded.

4 Claims, 41 Drawing Sheets

U.S. PATENT DOCUMENTS

| | | |
|---|---|---|
| 5,850,382 A | 12/1998 | Koishi et al. |
| 5,881,037 A | 3/1999 | Tanaka et al. |
| 5,987,066 A | 11/1999 | Kojima et al. |
| 6,067,281 A | 5/2000 | Kobayashi et al. |
| 6,072,756 A | 6/2000 | Shigenobu |
| 6,088,311 A * | 7/2000 | Katoh .................. 369/47.18 |
| 6,091,688 A * | 7/2000 | Tanoue et al. ........... 369/47.35 |
| 6,191,903 B1 | 2/2001 | Fujimoto et al. |
| 7,054,398 B1 | 5/2006 | Wu et al. |
| 7,158,464 B2 | 1/2007 | Gushima et al. |
| 7,385,903 B2 | 6/2008 | Gushima et al. |
| 7,403,462 B2 | 7/2008 | Gushima et al. |
| 7,414,946 B2 | 8/2008 | Gushima et al. |
| 7,518,970 B2 | 4/2009 | Gushima et al. |
| 7,518,971 B2 | 4/2009 | Gushima et al. |
| 2003/0090971 A1 | 5/2003 | Gushima et al. |
| 2003/0174625 A1 | 9/2003 | Okamura et al. |
| 2004/0030983 A1 * | 2/2004 | Tomita ...................... 714/776 |
| 2004/0233816 A1 | 11/2004 | Jung et al. |

FOREIGN PATENT DOCUMENTS

| | | |
|---|---|---|
| EP | 0 441 967 A1 | 8/1991 |
| EP | 0 837 471 A2 | 4/1998 |
| JP | 54 155007 | 12/1979 |
| JP | 61 224187 | 10/1986 |
| JP | 02 113469 | 4/1990 |
| JP | 04-360070 | 12/1992 |
| JP | 09-106549 | 4/1997 |
| JP | 11-149720 | 6/1999 |
| JP | 2000-068846 | 3/2000 |
| JP | 2000-137948 | 5/2000 |
| JP | 3098258 | 8/2000 |
| JP | 3909573 | 2/2007 |
| JP | 2000-311449 | 11/2009 |
| WO | 02/052558 A2 | 7/2002 |

OTHER PUBLICATIONS

Japanese Office Action for corresponding Application No. 2006-272201 dated Jul. 3, 2007. (English translation provided).

Notice of Reasons for Rejection for corresponding Japanese Application No. 2007-144939 dated Dec. 22, 2009 (with English translation).

European Search Report for corresponding European Application No. 10164910.1 mailed Jul. 16, 2010.

* cited by examiner

FIG.5

Tmin = 3

Recording track
Recording mark
Space
4T 4T
NRZI recording waveform
NRZ code stream 0100010001000100010001000100

Tmin = 2

Recording track
Recording mark
Space
3T 3T
NRZI recording waveform
NRZ code stream 0100100100100100100100100100

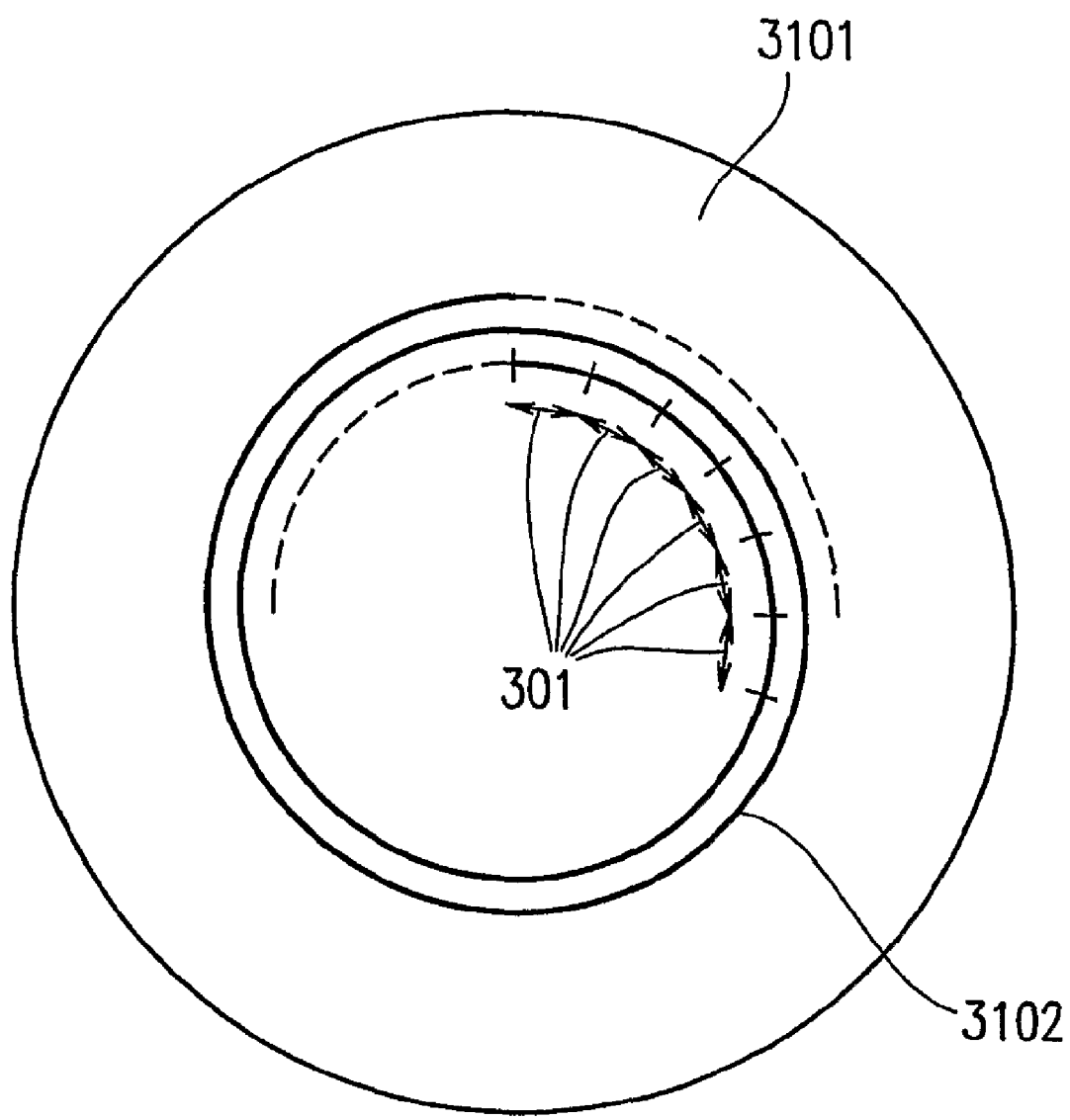

FIG.11
Recording mark of (Tmax+3) bits
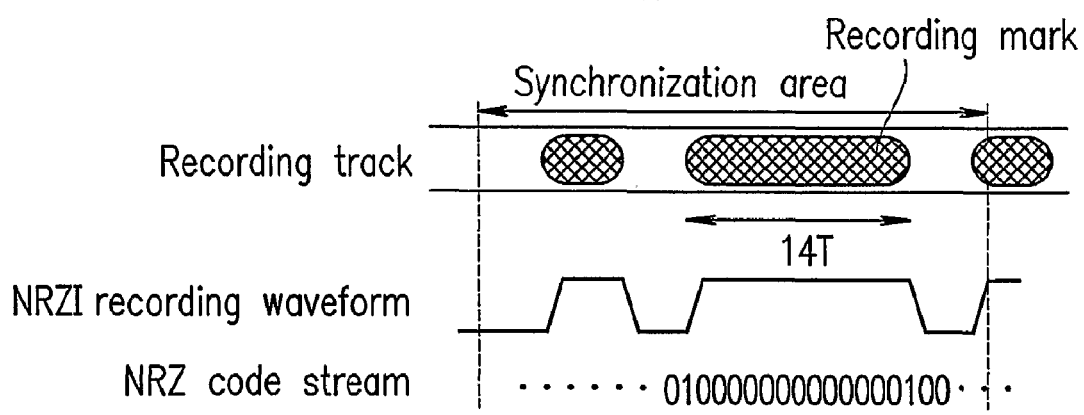
Space of (Tmax+3) bits
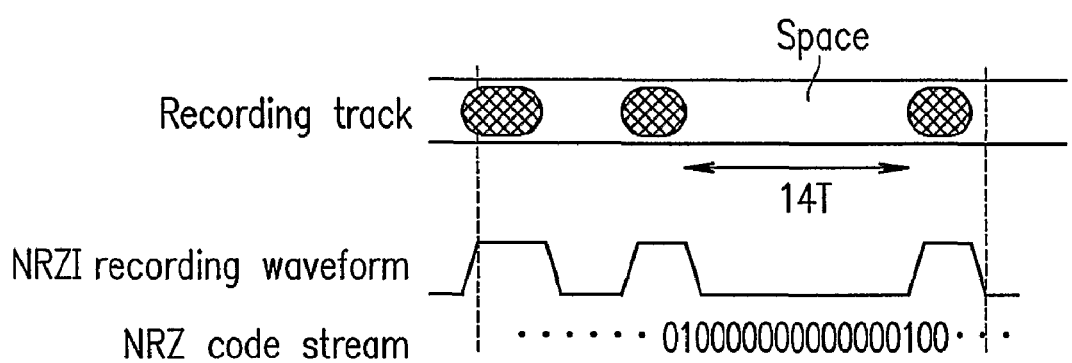

State 1 and State 2

| | 1st selection code sequence | CDS | 2nd selection code sequence | CDS |
|---|---|---|---|---|
| SY0 | 0010010000100100 0000000000010001 | +12 | 0001000010000100 0000000000010001 | −8 |
| SY | 0001000000000100 0000000000010001 | +4 | 0010000000100100 0000000000010001 | −14 |

State 3 and State 4

| | 1st selection code sequence | CDS | 2nd selection code sequence | CDS |
|---|---|---|---|---|
| SY0 | 1001000100000100 0000000000010001 | +6 | 1000000001000100 0000000000010001 | −16 |
| SY | 1000100001000100 0000000000010001 | +8 | 1000100000000100 0000000000010001 | −6 |

FIG.13
Code distance: 1
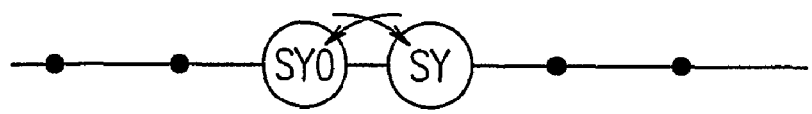
Code distance: 2
Code distance: 3
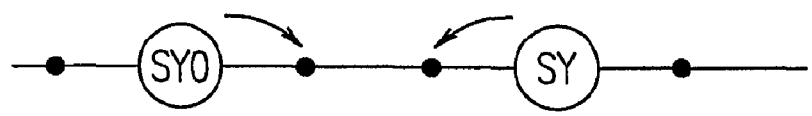
FIG.14
Synchronization frame area F0
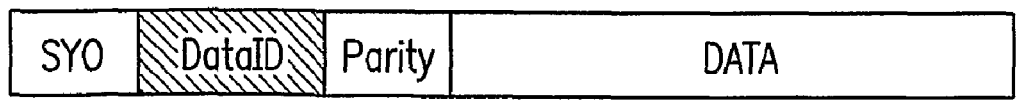

FIG.15

State 1 and State 2

| | 1st selection code sequence | CDS | 2nd selection code sequence | CDS |
|---|---|---|---|---|
| SYO | 0010010000100100 0000000000010001 | +12 | 0001000010000100 0000000000010001 | -8 |
| SY | 0001000000000100 0000000000010001 | +4 | 0010000000100100 0000000000010001 | -14 |
| PA | 0000001000000100 0000000000010001 | +4 | 0000001001000100 0000000000010001 | -10 |

State 3 and State 4

| | 1st selection code sequence | CDS | 2nd selection code sequence | CDS |
|---|---|---|---|---|
| SYO | 1001000100000100 0000000000010001 | +6 | 1000000001000100 0000000000010001 | -16 |
| SY | 1000100001000100 0000000000010001 | +8 | 1000100000000100 0000000000010001 | -6 |
| PA | 1000001000100100 0000000000010001 | +6 | 1000000100000100 0000000000010001 | -12 |

FIG.16

LSB = 1

| | 1st selection code sequence | CDS | 2nd selection code sequence | CDS |
|---|---|---|---|---|
| SYO | 010000000100 000000001001 | +2 | 010000010100 000000001001 | −12 |
| SY | 010001010100 000000001001 | +6 | 010010000100 000000001001 | −6 |
| PA | 010101000100 000000001001 | +6 | 010101010100 000000001001 | −8 |

LSB = 0

| | 1st selection code sequence | CDS | 2nd selection code sequence | CDS |
|---|---|---|---|---|
| SYO | 101000010100 000000001001 | +10 | 100000010100 000000001001 | −14 |
| SY | 101010000100 000000001001 | +4 | 100010000100 000000001001 | −8 |
| PA | 100010100100 000000001001 | +4 | 101010100100 000000001001 | −8 |

FIG.17

| | Frame | | Frame |
|---|---|---|---|
| SY0 | | SY1 | |
| SY1 | | SY2 | |
| SY1 | | SY1 | |
| SY2 | | SY1 | |
| SY1 | | SY2 | |
| SY1 | | SY1 | |
| SY2 | | SY1 | |
| SY1 | | SY2 | |
| SY1 | | SY1 | |
| SY2 | | SY1 | |
| SY1 | | SY2 | |
| SY1 | | SY1 | |
| SY2 | | SY1 | |

13 rows

FIG.21

| | Frame | | Frame | |
|---|---|---|---|---|
| | SY0 | | SY1 | |
| | SY2 | | SY3 | |
| | SY1 | | SY2 | |
| | SY3 | | SY1 | |
| | SY2 | | SY3 | |
| | SY1 | | SY2 | |
| | SY3 | | SY1 | |
| | SY2 | | SY3 | |
| | SY1 | | SY2 | |
| | SY3 | | SY1 | |
| | SY2 | | SY3 | |
| | SY1 | | SY2 | |
| | SY3 | | SY1 | |

13 rows

PLL CONTROL DEVICE AND REPRODUCTION APPARATUS WITH LINKING PORTION CONTROL

This application is a continuation of U.S. patent application Ser. No. 12/139,085 filed Jun. 13, 2008, now U.S. Pat. No. 7,768,893 which is a continuation of U.S. application Ser. No. 11/552,543, filed on Oct. 25, 2006, now U.S. Pat. No. 7,403,462, which is a continuation of U.S. application Ser. No. 10/203,849, filed on Aug. 14, 2002, now U.S. Pat. No. 7,158,464, which is a §371 of International Application No. PCT/JP01/11507 filed Dec. 26, 2001, the entire disclosures of which are incorporated herein by reference, and is related to sibling U.S. application Ser. No. 11/552,548 filed on Oct. 25, 2006, now U.S. Pat. No. 7,385,903, Ser. No. 11/759,271 filed on Jun. 7, 2007, now U.S. Pat. No. 7,414,946, Ser. No. 12/114,305 filed May 2, 2008, now U.S. Pat. No. 7,518,970, Ser. No. 12/114,399 filed on May 2, 2008, now U.S. Pat. No. 7,518,971 and Ser. No. 12/139,129 filed Jun. 13, 2008, now abandoned.

TECHNICAL FIELD

The present invention relates to an optical disc medium allowing high density data recording, and a method and apparatus for recording data on or reproducing data from the optical disc medium.

BACKGROUND ART

Recently, the recording density of optical disc media has been rapidly increasing. In the case of optical disc media allowing digital data recording, data recording, reproduction and management are generally performed in units of blocks, each block having a prescribed byte length. (Such a block will be referred to as a "data block".) Each data block is given address information. Data recording and reproduction are performed with reference to the address information.

For recording data on an optical disc medium, user data such as, for example, audio, video and computer data to be stored is provided with redundant data such as, for example, an error correction code (parity code) used for detecting or correcting a data error when the stored data is read. The user data provided with the redundant data is transformed in accordance with a modulation code system suitable to the characteristics of recording and reproduction signals for the optical disc medium. On the optical disc medium, the post-transformation data bit stream is recorded. One known modulation code system which is often used for optical disc media is run length limited code.

A run length limited code determines the post-transformation data bit stream so that the number of "0" bits interposed between two "1" bits in a bit sequence is limited to a prescribed number. The number of "0" bits interposed between "1" bits will be referred to as a "zero run". An interval (length) between one "1" bit to the next "1" bit in a data bit stream (code sequence) will be referred to as an "inversion interval". The limitation of the zero run determines the limits, i.e., the maximum value and the minimum value, of the inversion interval of a data bit stream. The maximum value will be referred to as a "maximum inversion interval k" and a "minimum inversion interval d".

In the case where a data bit stream is recorded on an optical disc medium by mark position recording (PPM: Pit Position Modulation), bit "1" of the data bit stream corresponds to a recording mark, and a zero run "0"s corresponds to a space. In the case where a data bit stream is recorded on an optical disc medium by mark length recording (PWM: Pulse Width Modulation), the recording state, i.e., whether a recording mark is to be recorded on the optical disc medium or a space is to be recorded, is switched when a "1" bit of the data bit stream occurs. In the case of mark length recording, the inversion interval corresponds to the length of a recording mark or the length of a space.

Accordingly, when, for example, the minimum value of the physical size of marks which can be formed on an optical disc medium (such a minimum value will be referred to as a "mark unit") is equal in the mark position recording and the mark length recording, mark position recording requires 3 mark units in order to record data of a minimum code length (3 bits "100" of a data bit stream), but the mark length recording requires only one mark unit.

When a run length limited code having a minimum inversion interval d=2 is used, the number of bits per unit length of track of the optical disc medium is larger in the case of the mark length recording than in the case of the mark position recording. Namely, the recording density is higher by the mark length recording than by the mark position recording.

In general, when a data bit stream transformed into a modulation code is recorded on an optical disc medium, a synchronization pattern is often inserted into the data bit stream at every prescribed cycle of the data bit stream. Such a synchronization pattern performs proper data synchronization when the data bit stream is read. According to one known technique for inserting the synchronization pattern, a synchronization pattern including a sequence which does not exist in a modulation code sequence is inserted at the start of an area, referred to as a frame area, having a prescribed byte length.

Among some data formats for recording-type optical disc media which have recently been put into practice, the DVD-RW data format will be briefly described.

In the DVD-RW data format, address information is arranged by pre-pits which are located in a land between two adjacent groove tracks in which data is to be recorded. Data is continuously recorded on the groove tracks. An ECC block, which is a minimum unit for data recording and reproduction, includes a plurality of areas, referred to as data frame areas, each having a fixed byte length. A data frame area includes a synchronization information area provided at the start thereof and a data area. Data recording or reproduction is begun and terminated in the data area in the data frame area which is located at the start of each ECC block. An operation for additionally recording data in an ECC block next to the ECC block which has data already recorded therein is referred to as "linking". A data frame area corresponding to a position at which data recording is begun and terminated is referred to as a "linking frame area".

FIG. 44 shows a data format of a linking position and the vicinity thereof of a conventional DVD-RW. In a DVD-RW, one ECC block includes 16 sectors, and one sector includes 26 frame areas. The minimum unit for data recording is one ECC block. Data recording is begun and terminated at a data area DATA of a leading frame area (linking frame area) of a leading sector S0 of one ECC block. FIG. 44 shows the position at which data recording is begun and terminated as "start position of data recording". In the example shown in FIG. 44, linking is performed so that the data recording is terminated at the 16th byte from the start of the linking frame area and the data recording is begun between the 15th byte and the 17th byte from the start of the linking frame area.

In the linking frame area in which the data recording is begun and terminated, data is recorded in a discontinuous manner. Therefore, data recorded from the linking beginning position (start position) to the next frame area cannot be read since accurate bit synchronization cannot be realized. Furthermore, when the low precision of linking causes the length of the frame area to be larger or smaller than the prescribed length, or when repeated linking recording in the same frame area degrades the signal in the frame area, signal reproduction systems for level-slicing, PLL or the like become unstable when the data recorded in and in the vicinity of the linking position is reproduced. In the worst case, there is a possibility that data cannot be read in several frame areas after the linking position. In such a case, error correction cannot be performed, which possibly generates a reading error. When the positioning accuracy when performing linking is less than one bit, the possibility of accurate data reading is increased. However, the tolerance of less than one bit is difficult to realize and thus is impractical as the recording density of data is increased.

The present invention, in light of the above-described problems, has an objective of providing a recording medium, a recording method, a reproduction method, a recording apparatus and a reproduction apparatus for allowing stable data recording and reproduction even at a beginning position and termination position of data recording.

DISCLOSURE OF THE INVENTION

According to one aspect of the invention, a recording medium comprising a recording area is provided. The recording area includes a first area and a second area. The first area includes a frame area. The frame area includes an area in which a second synchronization code sequence and at least a portion of data are to be recorded. The second area includes an area in which a third synchronization code sequence and a fourth synchronization code sequence are to be recorded.

In one embodiment of the invention, the second synchronization code sequence represents the start of the frame area, the third synchronization code sequence represents the start of the second area, and at least a portion of the fourth synchronization code sequence is used for stably reproducing data.

In one embodiment of the invention, the first area is provided rearward with respect to the third area. The second area is provided rearward with respect to the first area. The third area includes an area in which a first synchronization code sequence is to be recorded.

In one embodiment of the invention, at least a portion of the first synchronization code sequence is used for stably reproducing data.

In one embodiment of the invention, the third area includes an area in which a fifth synchronization code sequence is to be recorded.

In one embodiment of the invention, the fifth synchronization code sequence is used for specifying the start of the first area rearward thereto.

In one embodiment of the invention, the first area includes a plurality of frame areas, the first area is divided into fourth areas each including a prescribed number of frame areas, the second synchronization code sequence recorded in the frame area located at the start of the fourth area is different from the second synchronization code sequence recorded in any of the frame areas other than the frame area located at the start of the fourth area.

In one embodiment of the invention, the second synchronization code sequence recorded in the frame area located at the start of the fourth area is different by a code distance equal to or greater than 2 from the second synchronization code sequence recorded in any of the frame areas other than the frame area located at the start of the fourth area.

In one embodiment of the invention, a length of the fourth synchronization code sequence is randomly set each time data is recorded on the recording medium.

In one embodiment of the invention, a length of the first synchronization code sequence is randomly set each time data is recorded on the recording medium.

In one embodiment of the invention, at least a portion of the fourth synchronization code sequence is overwritten by a first synchronization code sequence recorded when additional data is recorded on the recording medium.

According to another aspect of the invention, a method for recording information on a recording medium having a recording area is provided. The method includes the steps of receiving data; recording a first synchronization code sequence in the recording area, recording a frame in a first area located rearward with respect to the area of the recording area having the first synchronization code sequence recorded therein, wherein the frame includes a second synchronization code sequence and at least a portion of the received data; recording a third synchronization code sequence in an area rearward with respect to the first area; and recording a fourth synchronization code sequence in an area rearward with respect to the area of the recording area having the third synchronization code sequence recorded therein.

In one embodiment of the invention, the method further includes the step of recording a fifth synchronization code sequence in an area of the recording area which is rearward with respect to the area in which the first synchronization code sequence is recorded and is forward with respect to the first area.

In one embodiment of the invention, the first area includes a plurality of frame areas, the first area is divided into fourth areas each including a prescribed number of frame areas, the second synchronization code sequence recorded in the frame area located at the start of the fourth area is different from the second synchronization code sequence recorded in any of the frame areas other than the frame area located at the start of the fourth area.

In one embodiment of the invention, the second synchronization code sequence recorded in the frame area located at the start of the fourth area is different by a code distance equal to or greater than 2 from the second synchronization code sequence recorded in any of the frame areas other than the frame area located at the start of the fourth area.

In one embodiment of the invention, the step of recording the first synchronization code sequence includes the step of randomly setting a length of the first synchronization code sequence.

In one embodiment of the invention, the step of recording the fourth synchronization code sequence includes the step of randomly setting a length of the fourth synchronization code sequence.

In one embodiment of the invention, at least a portion of the first synchronization code sequence is used for stably reproducing the data. The second synchronization code sequence represents the start of the frame area. The third synchronization code sequence represents the start of a second area including the third synchronization code sequence and the fourth synchronization code sequence. At least a portion of the fourth synchronization code sequence is used for stably reproducing the data. The fifth synchronization code sequence is used for specifying the start of the first area.

In one embodiment of the invention, at least a portion of the fourth synchronization code sequence is overwritten by the first synchronization code sequence, which is recorded when additional data is recorded on the recording medium.

According to still another aspect of the invention, a method for recording additional information on a recording medium having a recording area having information recorded therein is provided. The recording area includes a first area and a second area. The first area includes a frame area. The frame area includes an area in which a second synchronization code sequence and at least a portion of data are recorded. The second area includes an area in which a third synchronization code sequence and a fourth synchronization code sequence are recorded. The method includes the steps of receiving the additional data; detecting the third synchronization code sequence; determining a recording beginning position in the recording area based on the position of the detected third synchronization code sequence; recording a first additional synchronization code sequence at the recording beginning position; recording additional first area data including an additional frame in an area of the recording area rearward with respect to the area having the first additional synchronization code sequence recorded therein, wherein the additional frame includes a second additional synchronization code sequence for identifying the start of the additional frame and at least a portion of the received additional data; recording a third additional synchronization code sequence in an area rearward with respect to an additional first area having the additional first area data recorded therein; and recording a fourth additional synchronization code sequence in an area rearward with respect to the area having the third additional synchronization code sequence recorded therein.

In one embodiment of the invention, the method further includes the step of recording a fifth additional synchronization code sequence in an area of the recording area which is rearward with respect to the area in which the first additional synchronization code sequence is recorded and is forward with respect to the additional first area.

In one embodiment of the invention, at least a portion of the first additional synchronization code sequence is used for stably reproducing the data. The second additional synchronization code sequence represents the start of the frame area. The third additional synchronization code sequence represents the start of a second area including the third additional synchronization code sequence and the fourth additional synchronization code sequence. At least a portion of the fourth additional synchronization code sequence is used for stably reproducing the data. The fifth additional synchronization code sequence is used for specifying the start of the additional first area.

In one embodiment of the invention, the plurality of additional frames are grouped into a plurality of sector data each including a prescribed number of additional frames, and the second additional synchronization code sequence of the additional frame, among the prescribed number of additional frames, at the start of each sector data, is different from the second additional synchronization code sequence of any of the additional frames other than the additional frame at the start of each sector data.

In one embodiment of the invention, the second additional synchronization code sequence of the additional frame, among the prescribed number of additional frames, at the start of each sector data is different by a code distance equal to or greater than 2 from the second additional synchronization code sequences of any of the additional frames other than the additional frame at the start of each sector data.

In one embodiment of the invention, the step of determining the recording beginning position in the recording area includes the step of randomly determining the recording beginning position.

In one embodiment of the invention, the step of recording the first additional synchronization code sequence includes the step of randomly setting a length of the first additional synchronization code sequence.

In one embodiment of the invention, the step of recording the fourth additional synchronization code sequence includes the step of randomly setting a length of the fourth additional synchronization code sequence.

In one embodiment of the invention, the step of determining the recording beginning position in the recording area includes the step of determining the recording beginning position so that at least a portion of the fourth synchronization code sequence is overwritten by the first additional synchronization code sequence.

According to still another aspect of the invention, a recording apparatus for recording information on a recording medium having a recording area is provided. The recording apparatus includes a receiving section for receiving data; and a recording section for recording a first synchronization code sequence in the recording area. The recording section records a frame in a first area located rearward with respect to the area of the recording area having the first synchronization code sequence recorded therein. The frame includes a second synchronization code sequence and at least a portion of the received data. The recording section records a third synchronization code sequence in an area rearward with respect to a first area. The recording section records a fourth synchronization code sequence in an area rearward with respect to the area of the recording area having the third synchronization code sequence recorded therein.

In one embodiment of the invention, the recording apparatus records a fifth synchronization code sequence in an area of the recording area which is rearward with respect to the area in which the first synchronization code sequence is recorded and is forward with respect to the first area.

In one embodiment of the invention, the first area includes a plurality of frame areas, the first area is divided into fourth areas each including a prescribed number of frame areas, the second synchronization code sequence recorded in the frame area located at the start of the fourth area is different from the second synchronization code sequence recorded in any of the frame areas other than the frame area located at the start of the fourth area.

In one embodiment of the invention, the second synchronization code sequence recorded in the frame area located at the start of the fourth area is different by a code distance equal to or greater than 2 from the second synchronization code sequence recorded in any of the frame areas other than the frame area located at the start of the fourth area.

In one embodiment of the invention, the recording section randomly sets a length of the first synchronization code sequence.

In one embodiment of the invention, the recording section randomly sets a length of the fourth synchronization code sequence.

In one embodiment of the invention, at least a portion of the first synchronization code sequence is used for stably reproducing the data. The second synchronization code sequence represents the start of the frame area. The third synchronization code sequence represents the start of a second area including the third synchronization code sequence and the fourth synchronization code sequence. At least a portion of the fourth synchronization code sequence is used for stably reproducing the data. The fifth synchronization code sequence is used for specifying the start of the first area.

In one embodiment of the invention, at least a portion of the fourth synchronization code sequence is overwritten by the first synchronization code sequence, which is recorded when additional data is recorded on the recording medium.

According to still another aspect of the invention, a recording apparatus for recording additional information on a recording medium having a recording area having information recorded therein is provided. The recording area includes a first area and a second area. The first area includes a frame area. The frame area includes an area in which a second synchronization code sequence and at least a portion of data are recorded. The second area includes an area in which a third synchronization code sequence and a fourth synchronization code sequence are recorded. The recording apparatus includes a recording section for receiving the additional data; a detection section for detecting the third synchronization code sequence; a determination section for determining a recording beginning position in the recording area based on the position of the detected third synchronization code sequence; and a recording section for recording a first additional synchronization code sequence at the recording beginning position. The recording section records additional first area data including an additional frame in an area of the recording area rearward with respect to the area having the first additional synchronization code sequence recorded therein, wherein the additional frame includes a second additional synchronization code sequence for identifying the start of the additional frame and at least a portion of the received additional data. The recording section records a third additional synchronization code sequence in an area rearward with respect to an additional first area having the additional first area data recorded therein. The recording section records a fourth additional synchronization code sequence in an area rearward with respect to the area having the third additional synchronization code sequence recorded therein.

In one embodiment of the invention, the recording section records a fifth additional synchronization code sequence in an area of the recording area which is rearward with respect to the area in which the first additional synchronization code sequence is recorded and is forward with respect to the additional first area.

In one embodiment of the invention, at least a portion of the first additional synchronization code sequence is used for stably reproducing the data. The second additional synchronization code sequence represents the start of the frame area. The third additional synchronization code sequence represents the start of a second area including the third additional synchronization code sequence and the fourth additional synchronization code sequence. At least a portion of the fourth additional synchronization code sequence is used for stably reproducing the data. The fifth additional synchronization code sequence is used for specifying the start of the additional first area.

In one embodiment of the invention, the plurality of additional frames are grouped into a plurality of sector data each including a prescribed number of additional frames, and the second additional synchronization code sequence of the additional frame, among the prescribed number of additional frames, at the start of each sector data, is different from the second additional synchronization code sequence of any of the additional frames other than the additional frame at the start of each sector data.

In one embodiment of the invention, the second additional synchronization code sequence of the additional frame, among the prescribed number of additional frames, at the start of each sector data is different by a code distance equal to or greater than 2 from the second additional synchronization code sequences of any of the additional frames other than the additional frame at the start of each sector data.

In one embodiment of the invention, the determination section randomly determines the recording beginning position.

In one embodiment of the invention, the recording section randomly sets a length of the first additional synchronization code sequence.

In one embodiment of the invention, the recording section randomly sets a length of the fourth additional synchronization code sequence.

In one embodiment of the invention, the determination section determines the recording beginning position so that at least a portion of the fourth synchronization code sequence is overwritten by the first synchronization code sequence.

According to still another aspect of the invention, a method for reproducing information recorded on a recording medium having a recording area is provided. The recording area includes a first area and a second area. The first area includes a frame area. The frame area includes an area in which a second synchronization code sequence and at least a portion of data are recorded. The second area includes an area in which a third synchronization code sequence and a fourth synchronization code sequence are recorded. The method includes the steps of reproducing the third synchronization code sequence; reproducing the fourth synchronization code sequence; reproducing the second synchronization code sequence; and reproducing the at least a portion of the data.

In one embodiment of the invention, the second synchronization code sequence represents the start of the frame area, the third synchronization code sequence represents the start of the second area, and at least a portion of the fourth synchronization code sequence is used for stably reproducing the data.

In one embodiment of the invention, the first area is provided rearward with respect to the third area, and the second area is provided rearward with respect to the first area. The third area includes an area in which a first synchronization code sequence is recorded. The method further includes the step of reproducing the first synchronization code sequence.

In one embodiment of the invention, at least a portion of the first synchronization code sequence is used for stably reproducing data.

In one embodiment of the invention, the third area includes an area in which a fifth synchronization code sequence is to be recorded.

In one embodiment of the invention, the fifth synchronization code sequence is used for specifying the start of the first area rearward thereto.

In one embodiment of the invention, the first area includes a plurality of frame areas, the first area is divided into fourth areas each including a prescribed number of frame areas, the second synchronization code sequence recorded in the frame area located at the start of the fourth area is different from the second synchronization code sequence recorded in any of the frame areas other than the frame area located at the start of the fourth area.

In one embodiment of the invention, the second synchronization code sequence recorded in the frame area located at the start of the fourth area is different by a code distance equal to or greater than 2 from the second synchronization code sequence recorded in any of the frame areas other than the frame area located at the start of the fourth area.

In one embodiment of the invention, a length of the fourth synchronization code sequence is randomly set each time data is recorded on the recording medium.

In one embodiment of the invention, a length of the first synchronization code sequence is randomly set each time data is recorded on the recording medium.

In one embodiment of the invention, at least a portion of the fourth synchronization code sequence is overwritten by the first synchronization code sequence recorded when additional data is recorded on the recording medium.

According to still another aspect of the invention, a reproduction apparatus for reproducing information recorded on a recording medium having a recording area is provided. The recording area includes a first area and a second area. The first area includes a frame area. The frame area includes an area in which a second synchronization code sequence and at least a portion of data are recorded. The second area includes an area in which a third synchronization code sequence and a fourth synchronization code sequence are recorded. The reproduction apparatus includes a section for reproducing the third synchronization code sequence; a section for reproducing the fourth synchronization code sequence; a section for reproducing the second synchronization code sequence; and a section for reproducing the at least a portion of the data.

In one embodiment of the invention, the second synchronization code sequence represents the start of the frame area, the third synchronization code sequence represents the start of the second area, and at least a portion of the fourth synchronization code sequence is used for stably reproducing the data.

In one embodiment of the invention, the first area is provided rearward with respect to the third area. The second area is provided rearward with respect to the first area. The third area includes an area in which a first synchronization code sequence is recorded. The reproduction apparatus further includes a section for reproducing the first synchronization code sequence.

In one embodiment of the invention, at least a portion of the first synchronization code sequence is used for stably reproducing data.

In one embodiment of the invention, the third area includes an area in which a fifth synchronization code sequence is recorded.

In one embodiment of the invention, the fifth synchronization code sequence is used for specifying the start of the first area rearward thereto.

In one embodiment of the invention, the first area includes a plurality of frame areas, the first area is divided into fourth areas each including a prescribed number of frame areas, the second synchronization code sequence recorded in the frame area located at the start of the fourth area is different from the second synchronization code sequence recorded in any of the frame areas other than the frame area located at the start of the fourth area.

In one embodiment of the invention, the second synchronization code sequence recorded in the frame area located at the start of the fourth area is different by a code distance equal to or greater than 2 from the second synchronization code sequence recorded in any of the frame areas other than the frame area located at the start of the fourth area.

In one embodiment of the invention, a length of the fourth synchronization code sequence is randomly set each time data is recorded on the recording medium.

In one embodiment of the invention, a length of the first synchronization code sequence is randomly set each time data is recorded on the recording medium.

In one embodiment of the invention, at least a portion of the fourth synchronization code sequence is overwritten by a first synchronization code sequence recorded when additional data is recorded on the recording medium.

According to still another aspect of the invention, a recording medium includes a rewritable recording area for recording data; and a recording area exclusively used for reproduction, which has user data and specific purpose data different from the user data recorded therein. The rewritable recording area includes a first area and a second area. The first area includes a frame area. The frame area includes an area in which a second synchronization code sequence and at least a portion of data are to be recorded. The second area includes an area in which a third synchronization code sequence and a fourth synchronization code sequence are to be recorded. The recording area exclusively used for reproduction includes a plurality of further frame areas, each of which includes, recorded therein, a further second synchronization code sequence for identifying the start of the respective further frame area and at least a portion of the user data, and an area having a further third synchronization code sequence and the specific purpose data recorded therein. The further third synchronization code sequence identifies the start of the specific purpose data.

According to still another aspect of the invention, a method for reproducing specific purpose data recorded on a recording medium is provided. The recording medium includes a rewritable recording area for recording data, and a recording area exclusively used for reproduction, which has user data and specific purpose data different from the user data recorded therein. The rewritable recording area includes a first area and a second area. The first area includes a frame area. The frame area includes an area in which a second synchronization code sequence and at least a portion of data are to be recorded. The second area includes an area in which a third synchronization code sequence and a fourth synchronization code sequence are to be recorded. The recording area exclusively used for reproduction includes a plurality of further frame areas, each of which includes, recorded therein, a further second synchronization code sequence for identifying the start of the respective further frame area and at least a portion of the user data, and an area having a further third synchronization code sequence and the specific purpose data recorded therein. The further third synchronization code sequence identifies the start of the specific purpose data. The method includes the steps of detecting the further third synchronization code sequence, and reproducing the specific purpose data in response to the detection of the further third synchronization code sequence.

According to still another aspect of the invention, a reproduction apparatus for reproducing specific purpose data recorded on a recording medium is provided. The recording medium includes a rewritable recording area for recording data, and a recording area exclusively used for reproduction, which has user data and specific purpose data different from the user data recorded therein. The rewritable recording area includes a first area and a second area. The first area includes a frame area. The frame area includes an area in which a second synchronization code sequence and at least a portion of data are to be recorded. The second area includes an area in which a third synchronization code sequence and a fourth synchronization code sequence are to be recorded. The recording area exclusively used for reproduction includes a plurality of further frame areas, each of which includes, recorded therein, a further second synchronization code sequence for identifying the start of the respective further frame area and at least a portion of the user data, and an area having a further third synchronization code sequence and the specific purpose data recorded therein. The further third synchronization code sequence identifies the start of the specific purpose data. The reproduction apparatus includes a detection section for detecting the further third synchronization code sequence, and a reproduction section for reproducing the specific purpose data in response to the detection of the further third synchronization code sequence.

According to still another aspect of the invention, a recording medium includes a recording area exclusively used for reproduction, which has user data and specific purpose data different from the user data recorded therein. The recording area exclusively used for reproduction includes a plurality of frame areas, each of which includes, recorded therein, a second synchronization code sequence for identifying the start of the respective frame area and at least a portion of the user data, and an area having a third synchronization code sequence and the specific purpose data recorded therein. The third synchronization code sequence identifies the start of the specific purpose data.

According to still another aspect of the invention, a method for reproducing specific purpose data recorded on a recording medium is provided. The recording medium includes a recording area exclusively used for reproduction, which has user data and specific purpose data different from the user data recorded therein. The recording area exclusively used for reproduction includes a plurality of frame areas, each of which includes, recorded therein, a second synchronization code sequence for identifying the start of the respective frame area and at least a portion of the user data, and an area having a third synchronization code sequence and the specific purpose data recorded therein. The third synchronization code sequence identifies the start of the specific purpose data. The method includes the steps of detecting the third synchronization code sequence, and reproducing the specific purpose data in response to the detection of the third synchronization code sequence.

According to still another aspect of the invention, a reproduction apparatus for reproducing specific purpose data recorded on a recording medium is provided. The recording medium includes a recording area exclusively used for reproduction, which has user data and specific purpose data different from the user data recorded therein. The recording area exclusively used for reproduction includes a plurality of frame areas, each of which includes, recorded therein, a second synchronization code sequence for identifying the start of the respective frame area and at least a portion of the user data, and an area having a third synchronization code sequence and the specific purpose data recorded therein. The third synchronization code sequence identifies the start of the specific purpose data. The reproduction apparatus includes a detection section for detecting the third synchronization code sequence, and a reproduction section for reproducing the specific purpose data in response to the detection of the third synchronization code sequence.

According to still another aspect of the invention, a recording apparatus for additionally recording information on a recording medium having information recorded thereon or for overwriting information recorded on the recording medium is provided. The recording medium includes at least one second data unit, each of the at least one second data unit includes a prescribed number of first data units, each of the prescribed number of first data units includes a plurality of frame areas having a prescribed byte length, a second synchronization code sequence is recorded at the start of at least one frame area among the plurality of frame areas, the recording medium further includes at least one first frame area for each second data unit, and a third synchronization code sequence is recorded at the start of each of the at least one first frame area. The recording apparatus includes a first detection section for detecting the second synchronization code sequence from the second data unit; a third detection section for detecting the third synchronization code sequence from the second data unit; and a recording beginning timing determination section for determining a timing for beginning the additional recording or the overwriting, using a detection result obtained by the first detection section and/or a detection result obtained by the third detection section.

According to still another aspect of the invention, a reproduction apparatus for reading information from a recording medium having information recorded thereon is provided. The recording medium includes at least one second data unit, each of the at least one second data unit includes a prescribed number of first data units, each of the prescribed number of first data units includes a plurality of frame areas having a prescribed byte length, a second synchronization code sequence is recorded at the start of at least one frame area among the plurality of frame areas, the recording medium further includes at least one first frame area for each second data unit, and a third synchronization code sequence is recorded at the start of each of the at least one first frame area. The reproduction apparatus includes a first detection section for detecting the second synchronization code sequence; a third detection section for detecting the third synchronization code sequence; and a reproduction beginning timing determination section for determining a timing for beginning the reproduction, using a detection result of the first synchronization code sequence obtained by the first detection section from a second data unit, which is located forward with respect to a second data unit from which the information is to be read; and/or a detection result of the third synchronization code sequence obtained by the third detection section from a second data unit, which is located forward with respect to a second data unit from which the information is to be read.

According to still another aspect of the invention, a reproduction apparatus for reading information from a recording medium having information recorded thereon is provided. The recording medium includes at least one second data unit, each of the at least one second data unit includes a prescribed number of first data units, each of the prescribed number of first data units includes a plurality of frame areas having a prescribed byte length, a second synchronization code sequence is recorded at the start of at least one frame area among the plurality of frame areas, the recording medium further includes at least one first frame area for each second data unit, and a third synchronization code sequence is recorded at the start of each of the at least one first frame area. The reproduction apparatus includes a level-slicing section for generating level-sliced data by level-slicing a reading signal from the recording medium; a first detection section for detecting the second synchronization code sequence from the level-sliced data level-sliced by the level-slicing section; a third detection section for detecting the third synchronization code sequence from the level-sliced data; and a level-slicing mode switching section for switching the mode of level-slicing of the level-slicing section at a prescribed position in the at least one first frame area, using a detection result of the first synchronization code sequence obtained by the first detection section from a second data unit, which is located forward with respect to a second data unit from which the information is to be read; and/or a detection result of the third synchronization code sequence obtained by the third detection section from a second data unit, which is located forward with respect to a second data unit from which the information is to be read.

According to still another aspect of the invention, a reproduction apparatus for reading information from a recording medium having information recorded thereon is provided. The recording medium includes at least one second data unit, each of the at least one second data unit includes a prescribed number of first data units, each of the prescribed number of first data units includes a plurality of frame areas having a prescribed byte length, a second synchronization code sequence is recorded at the start of at least one frame area among the plurality of frame areas, the recording medium further includes at least one first frame area for each second data unit, and a third synchronization code sequence is recorded at the start of each of the at least one first frame area. The reproduction apparatus includes a clock generation section for generating a bit synchronization clock using a signal read from the recording medium; a first detection section for detecting the second synchronization code sequence using the bit synchronization clock; a third detection section for detecting the third synchronization code sequence using the bit synchronization clock; and a clock reproduction mode switching section for switching the mode of clock reproduction of the clock generation section at a prescribed position in the at least one first frame area, using a detection result of the first synchronization code sequence obtained by the first detection section from a second data unit, which is located forward with respect to a second data unit from which the information is to be read; and/or a detection result of the third synchronization code sequence obtained by the third detection section from a second data unit, which is located forward with respect to a second data unit from which the information is to be read.

According to still another aspect of the invention, a recording apparatus for additionally recording information on a recording medium having information recorded thereon or for overwriting information recorded on the recording medium is provided. The recording medium includes at least one second data unit, each of the at least one second data unit includes a prescribed number of first data units, each of the prescribed number of first data units includes a plurality of frame areas having a prescribed byte length, a second synchronization code sequence is recorded at the start of at least one frame area among the plurality of frame areas, the recording medium further includes at least one first frame area for each second data unit, a third synchronization code sequence is recorded at the start of each of the at least one first frame area, and a fifth synchronization code sequence is recorded at the end of each of the at least one first frame area. The recording apparatus includes a first detection section for detecting the second synchronization code sequence from the second data unit; a third detection section for detecting the third synchronization code sequence from the second data unit; a fourth detection section for detecting the fifth synchronization code sequence from the second data unit; and a recording beginning timing determination section for determining a timing for beginning the additional recording or the overwriting, using at least one of a detection result obtained by the first detection section, a detection result obtained by the third detection section, and a detection result obtained by the fourth detection section.

According to still another aspect of the invention, a reproduction apparatus for reading information from a recording medium having information recorded thereon is provided. The recording medium includes at least one second data unit, each of the at least one second data unit includes a prescribed number of first data units, each of the prescribed number of first data units includes a plurality of frame areas having a prescribed byte length, a second synchronization code sequence is recorded at the start of at least one frame area among the plurality of frame areas, the recording medium further includes at least one first frame area for each second data unit, a third synchronization code sequence is recorded at the start of each of the at least one first frame area, and a fifth synchronization code sequence is recorded at the end of each of the at least one first frame area. The reproduction apparatus includes a first detection section for detecting the second synchronization code sequence; a third detection section for detecting the third synchronization code sequence; a fourth detection section for detecting the fifth synchronization code sequence; and a reproduction beginning timing determination section for determining a timing for beginning the reproduction, using at least one of a detection result of the first synchronization code sequence obtained by the first detection section from a second data unit, which is located forward with respect to a second data unit from which the information is to be read; a detection result of the third synchronization code sequence obtained by the third detection section from a second data unit, which is located forward with respect to a second data unit from which the information is to be read; and a detection result of the fourth synchronization code sequence obtained by the fourth detection section from a the second data unit, which is located forward with respect to a second data unit from which the information is to be read.

According to still another aspect of the invention, a reproduction apparatus for reading information from a recording medium having information recorded thereon is provided. The recording medium includes at least one second data unit, each of the at least one second data unit includes a prescribed number of first data units, each of the prescribed number of first data units includes a plurality of frame areas having a prescribed byte length, a second synchronization code sequence is recorded at the start of at least one frame area among the plurality of frame areas, the recording medium further includes at least one first frame area for each second data unit, a third synchronization code sequence is recorded at the start of each of the at least one first frame area, and a fifth synchronization code sequence is recorded at the end of each of the at least one first frame area. The reproduction apparatus includes a level-slicing section for generating level-sliced data by level-slicing a reading signal from the recording medium; a first detection section for detecting the second synchronization code sequence from the level-sliced data level-sliced by the level-slicing section; a third detection section for detecting the third synchronization code sequence from the level-sliced data; a fourth detection section for detecting the fifth synchronization code sequence from the level-sliced data; and a level-slicing mode switching section for switching the mode of level-slicing of the level-slicing section at a prescribed position in the at least one first frame area, using at least one of a detection result of the first synchronization code sequence obtained by the first detection section from a second data unit, which is located forward with respect to a second data unit from which the information is to be read; a detection result of the third synchronization code sequence obtained by the third detection section from a second data unit, which is located forward with respect to a second data unit from which the information is to be read; and a detection result of the fourth synchronization code sequence obtained by the fourth detection section from a second data unit, which is located forward with respect to a second data unit from which the information is to be read.

According to still another aspect of the invention, a reproduction apparatus for reading information from a recording medium having information recorded thereon is provided. The recording medium includes at least one second data unit, each of the at least one second data unit includes a prescribed number of first data units, each of the prescribed number of first data units includes a plurality of frame areas having a prescribed byte length, a second synchronization code sequence is recorded at the start of at least one frame area among the plurality of frame areas, the recording medium further includes at least one first frame area for each second data unit, a third synchronization code sequence is recorded at the start of each of the at least one first frame area, and a fifth synchronization code sequence is recorded at the end of each of the at least one first frame area. The reproduction apparatus includes a clock generation section for generating a bit synchronization clock using a signal read from the recording medium; a first detection section for detecting the second synchronization code sequence using the bit synchronization clock; a third detection section for detecting the third synchronization code sequence using the bit synchronization clock; a fourth detection section for detecting the fifth synchronization code sequence using the bit synchronization clock; and a reproduction mode switching section for switching the mode of clock reproduction of the clock generation section at a prescribed position in the at least one first frame area, using at least one of a detection result of the first synchronization code sequence obtained by the first detection section from a second data unit, which is located forward with respect to a second data unit from which the information is to be read; a detection result of the third synchronization code sequence obtained by the third detection section from a second data unit, which is located forward with respect to a second data unit from which the information is to be read; and a detection result of the fourth synchronization code sequence obtained by the fourth detection section from a second data unit, which is located forward with respect to a second data unit from which the information is to be read.

Hereinafter, a function of the present invention will be described.

In a recording medium according to the present invention, a recording area includes a first area and a second area. The first area includes a frame area. In the frame area, a second synchronization code sequence and at least a portion of data are recorded. The second area includes an area in which a third synchronization code sequence and a fourth synchronization code sequence area to be recorded. On such a recording medium, additional data recording (linking) can be begun, regarding a position in the fourth synchronization code sequence as the beginning position. Thus, additional data recording is not performed in the frame area in which data is recorded. Therefore, data recording and reproduction can be stably performed even at the beginning position and the termination position of the data recording.

BRIEF DESCRIPTION OF THE DRAWINGS

FIG. 5 shows an exemplary pattern to be recorded in the second synchronization area VFO when Tmin=3 and Tmin=2.

FIG. 8 shows a top view of a recordable optical disc medium (recording medium) 3101 according to a second example of the present invention.

FIG. 11 shows an example of a pattern preferably used as a synchronization code sequence in the second example of the present invention.

FIG. 13 schematically shows code distances between various types of synchronization code sequences (patterns).

FIG. 14 shows an exemplary internal structure of a frame area F0.

FIG. 15 shows specific examples of an SY0 pattern, an SY pattern, and a PA pattern in the second example of the present invention.

FIG. 16 shows other specific examples of an SY0 pattern, an SY pattern, and a PA pattern in the second example of the present invention.

FIG. 17 shows another example of synchronization code sequences located at the start of each of the 26 frame areas included in a sector 3103 (FIG. 9).

FIG. 21 shows still another example of synchronization code sequences located at the start of each of the 26 frame areas included in a sector 3103 (FIG. 9).

BEST MODE FOR CARRYING OUT THE INVENTION

Hereinafter, the present invention will be described by way of illustrative examples with reference to the attached drawings. In this specification, the terms "start" and "end" refer to the relative positions along information tracks of an optical disc medium. A position at which data is first recorded or reproduced in a zone along an information track will be referred to as the "start" of the zone (or the start of the data recorded in the zone), and a position at which data is last recorded or reproduced in a zone along an information track will be referred to as the "end" of the zone (or the end of the data recorded in the zone). In the case where there are area A and area B along an information track and data recording or reproduction is performed in area A after area B, area A is expressed as being "rearward" with respect to area B, and area B is expressed as being "forward" with respect to area A. The expression that one area is "rearward" or "forward" with respect to the other area does not necessarily mean that the two areas are adjacent to each other. When area A is rearward with respect to area B and the area A is adjacent to area B, area A is expressed as being an area immediately subsequent to area B.

In this specification, the term "frame area" represents a specific area on an information track of an optical disc medium. In the frame area, a prescribed amount of data and/or a prescribed amount of code sequence is recorded. Data or a code sequence recorded in the frame area is referred to as a "frame". In this specification, the term "sector" also represents a specific area on an information track of an optical disc medium, and includes a plurality of frame areas mentioned above.

Example 1

Figure 1:
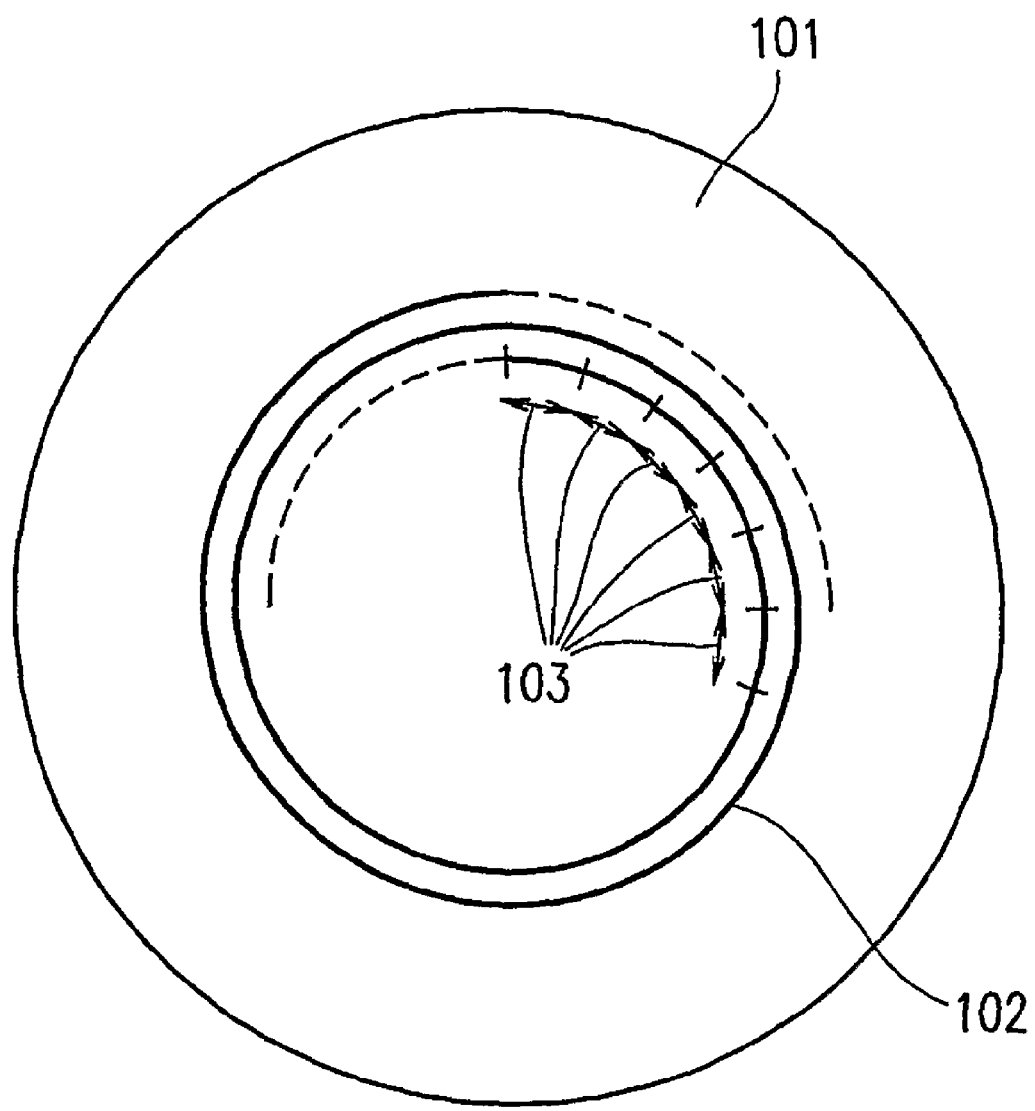
FIG. 1 shows a top view of a recordable optical disc medium (recording medium) 101 according to a first example of the present invention.

FIG. 1 shows a top view of a recordable optical disc medium (recording medium) 101 according to a first example of the present invention. On a recording surface of the optical disc medium 101, a recording track 102 (recording area) is formed in a spiral manner. The recording track 102 is divided into data blocks 103. In other words, on the recording surface of the optical disc medium 101, the data blocks 103 are continuously arranged in a circumferential direction to form the information track 102.

Figure 2:
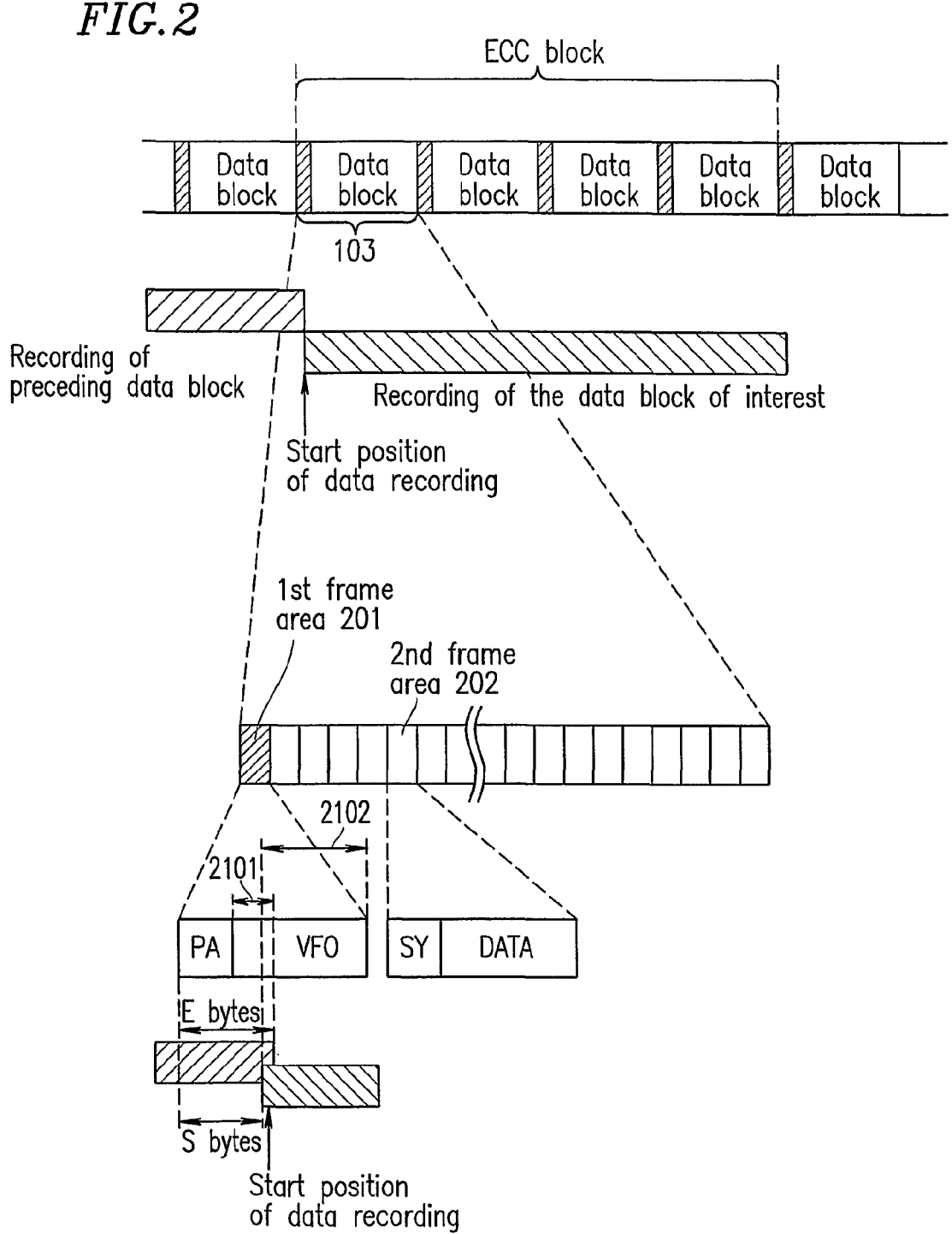
FIG. 2 shows a data format of a data blocks 103 of the optical disc medium 101.

FIG. 2 shows a data format of the data blocks 103 of the optical disc medium 101. As shown in FIG. 2, each data block 103 includes a first frame area 201 at the start thereof and then a plurality of second frame areas 202 thereafter. The first frame area 201 and the second frame areas 202 form one data block 103. In FIG. 2, an area shown in the right is rearward to an area shown in the left.

Thus, the information track 102 of the optical disc medium 101 includes a plurality of second frame areas 202 (collectively referred to as a first area) and a first frame area 201 (second area) which are included in one data block.

The first frame area 201 includes a first synchronization area PA at the start thereof and then a second synchronization area VFO thereafter.

The second frame area 202 (frame area) includes a third synchronization area SY at the start thereof and then a data area DATA thereafter. A third synchronization area SY is an area in which an SY pattern (second synchronization code sequence) is to be recorded. A data area DATA is an area in which at least a portion of user data to be recorded in the recording medium is to be recorded. In other words, the second frame area 202 (frame area) includes an area in which an SY pattern (second synchronization code sequence) and at least a portion of the user data are to be recorded.

The role of each area will be described. First, the data area DATA is for recording a data bit stream including user data. The data bit stream includes a parity code used for detecting or correcting a data error when the data is read. The parity code is included in an area other than the user data. The data bit stream is not recorded as binary data itself, but is transformed by a modulation system matching the characteristics of a recording and reproduction signal of the optical disc medium before being recorded.

Here, it is assumed that a post-transformation data bit stream is a code sequence limited to the minimum run (minimum inversion interval) d and the maximum run (maximum inversion interval) k, and the code sequence is obtained by dividing the input data bit stream into blocks each having units of (m×i) bits and then transforming each block of the input data into a code sequence having units of (n×i) bits. In this case, d and k are each a natural number fulfilling d<k, m and n are each a natural number fulfilling m<n, and i is a natural number fulfilling $1 \leq i \leq r$. Especially when r=1, this transformation system is referred to as a fixed length code system, and when $r \geq 1$ (i can be a plurality of values), this transformation system is referred to as a variable length code system.

When a code sequence is recorded by the NRZ (Non Return to Zero) format, bit "1" of the code sequence corresponds to a recording mark and a zero run "0"s corresponds to a space. In an optical disc medium, recording marks and spaces are distinguished from each other by whether the pits are convex or concave or by a difference in reflectance which is caused by a phase change in a recording layer. When the code sequence is recorded by the NRZI (Non Return to Zero Inverted) format, the recording state, i.e., whether a recording mark is to be recorded or a space is to be recorded, is switched when a "1" bit of the data bit stream occurs. In the case of mark length recording, the inversion interval corresponds to the length of a recording mark or the length of a space.

Assuming that the minimum value of the size of marks which can be formed on a recording layer of an optical disc medium (such a minimum value will be referred to as a "mark unit") is equal in the NRZ recording and the NRZI recording, the NRZ recording requires 3 mark units in order to record data of a minimum code length (3 bits "100" of a data bit stream), but the NRZI recording requires only one mark unit. Accordingly, when a run length limited code having a minimum inversion interval d=2 is used, the number of bits per unit length of track of the optical disc medium is larger in the case of the NRZI recording than in the case of the NRZ mark recording. Namely, the recording density is higher by the NRZI recording than by the NRZ recording.

In the first example of the present invention, mark length recording is performed using a run length limited code having parameters of d=2, k=10, m=8, n=16, and r=1 for modulation. In other words, the data bit stream recorded in the data area DATA of the optical disc medium 101 (FIG. 1) includes recording marks and recording spaces having a minimum length Tmin=3 bits and a maximum length Tmax=11 bits.

The first synchronization area PA is provided for identifying the start of the first frame area 201, and preferably has a pattern recorded which does not occur in a data bit stream to be recorded in at least the data area DATA. By recording a pattern in the first synchronization area PA, which does not occur in the data area DATA, the first synchronization area PA can be easily distinguished from the data area DATA when the data bit stream is read.

The second synchronization area VFO is provided for realizing stable operations of data reproduction systems when each data block 103 is read. The data reproduction systems refers to, for example, a section for level-slicing a reproduction signal RF (Radio Frequency) read from the data block 103 and a PLL (Phase Locked Loop) section for extracting a bit synchronization clock from the level-sliced data. In order to realize stable operations of the data reproduction systems, the patterns recorded in the second synchronization area VFO preferably fulfill conditions 1 through 3 given below.

(Condition 1) A sufficient amplitude and a sufficient S/N ratio (Signal to Noise Ratio) of the reproduction signal RF are guaranteed.

(Condition 2) The number of times of recording mark/space switching is sufficient.

(Condition 3) The DSV value (Digital Sum Value) of the pattern is as close to 0 as possible.

Condition 1 is for properly obtaining level-sliced data from the reproduction signal RF. When the amplitude of the reproduction signal RF is too small or the S/N ratio thereof is too low, the signal is not accurately level-sliced or the signal is level-sliced into wrong data due to the influence of the noise of the data reproduction systems.

Condition 2 is for obtaining a bit synchronization clock from the level-sliced data at a high speed and stably. When the clock frequency/phase is locked by the PLL section in the second synchronization area VFO, the information for frequency/phase comparison can be obtained more frequently as the number of times of recording mark/space switching is larger. Thus, the clock frequency/phase can be locked more quickly. When the number of times of recording mark/space switching is too small, the information for frequency/phase comparison cannot be obtained. As a result, clock frequency/phase is locked more slowly or unstably.

Condition 3 is for stably level-slicing the reproduction signal RF. In the case where a DC feedback system (for performing feedback control of slicing level by a DC component of the post-level-slicing data), which is generally used as a level-slicing system, is used, when the DSV value of the pattern significantly fluctuates or disperses, the slicing level significantly fluctuates or significantly shifts from the center of the reproduction signal RF. As a result, the level-sliced data cannot be stably obtained. A DSV value of the pattern which is as close as possible to 0 is preferable to the DC feedback system.

The third synchronization area SY is provided for identifying the start of each second frame area 202. Like the first synchronization area PA for identifying the start of the first frame area 201, it is preferable to record a pattern, in the third synchronization area SY, which does not occur in at least a data bit stream to be recorded in the data area DATA. By recording a pattern, in the third synchronization area SY, which does not occur in the data area DATA, the third synchronization area SY can be easily distinguished from the data area DATA when the data bit stream is read.

Figure 3:
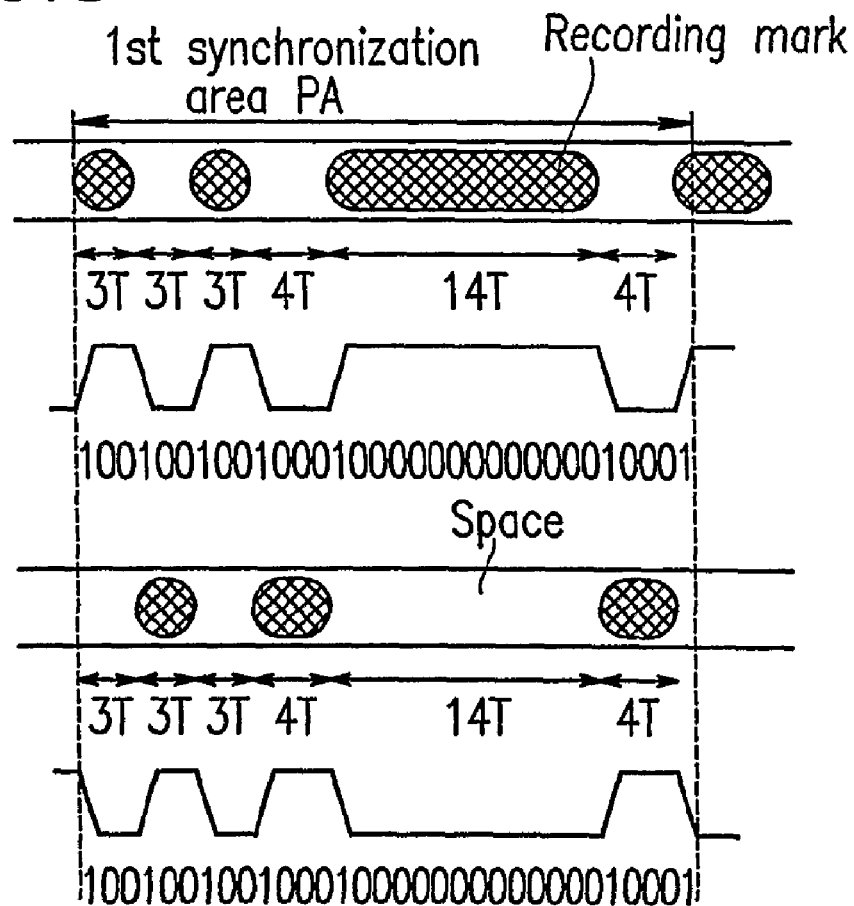
FIG. 3 shows an example of a pattern to be recorded in a first synchronization area PA (PA pattern), which is especially preferable in the first example of the present invention.

FIG. 3 shows an example of a pattern to be recorded in the first synchronization area PA (PA pattern), the example being especially preferable in the first example of the present invention. A feature of the PA pattern shown in FIG. 3 is that the pattern includes a recording mark or a space having a length of 14 channel bits (14T), which is a (Tmax+3) channel bit length. In the first example, as described above, the maximum mark/space length Tmax of a data bit stream to be recorded in the data area DATA is 11 channel bits (11T), which is different, by 3 bits, from 14T included in the first synchronization area PA. Even when a 1 channel bit edge shift occurs due to the influence of noise generated during reproduction, and as a result, the 14T mark (or the 14T space) in the first synchronization area shortens to 13 channel bits and the 11T mark (or the 11T space) in the data area DATA lengthens to 12 channel bits, there is still a 1 channel bit difference between the mark (or space) in the first synchronization area and the mark (or space) in the data area DATA. Thus, against an edge shift of about one bit, a sufficient error margin is provided for preventing the 11T pattern in the data area DATA from being incorrectly detected as the pattern in the first synchronization area PA. In this manner, the PA pattern is used for identifying the start of the subsequent VFO pattern.

In the example shown in FIG. 3, a 4T space/mark is located immediately after the 14T mark/space. By using (14T+4T) as the detection pattern when the data in the data block 103 is read, the possibility of incorrect detection can be reduced compared to using only 14T as the detection pattern. By adding (15T+3T) or (13T+5T) to the detection pattern, not only (14T+4T), 14T can be avoided from being undetected even when an edge shift occurs at the rear end of the 14T, and still the possibility of incorrect detection can be kept as low as possible.

Thus, a PA pattern can be easily distinguished from the VFO pattern rearward thereto or any other pattern recorded in the data area DATA. By the reproduction apparatus or the recording apparatus detecting the PA pattern, it becomes possible to determine the termination of the data area DATA in a data block forward with respect to the PA pattern, or to predict the start of the second synchronization area VFO subsequent to the PA pattern or the start of the data block rearward to the second synchronization area VFO. Specific examples in which the PA pattern recorded in the first synchronization area is used for reproduction control or recording control will be described later in sixth and seventh examples. The PA pattern represents the start of the first frame area (second area).

In FIG. 3, the pattern in the first synchronization area PA is represented by the NRZ format as {10010010010001000000000000010001}. By adding, to immediately before (14T+4T), the sequence (3T+3T+3T+4T) fulfilling the run length limitation of d=2 and k=10 (limitation on the zero run, i.e., the number of continuous "0" bits) as in the case of the modulation code, a pattern of having a total of 32 channel bits (i.e., 2 bytes) is formed. It is preferable that the sequence located immediately before 14T fulfills the same run length limitation as that of the modulation code, but the present invention is not limited to this. The pattern of the first synchronization area PA is not limited to one pattern, but can be selected from a plurality of patterns. For example, a plurality of patterns having different zero runs (the number of continuous "0" bits) at the start of the pattern is prepared. From the plurality of patterns, one pattern is selected so that the selected pattern fulfills the same run length limitation as that of the modulation code when being connected to the zero run resulted from the modulation of the immediately preceding byte (final zero run). Alternatively, a plurality of patterns having different DSV values, and one pattern is selected so that the post-selection DSV value is minimum. The post-selection DSV value is a sum of the DSV value of the sequence immediately preceding the selected pattern and the DSV value of the selected pattern.

Figure 4:
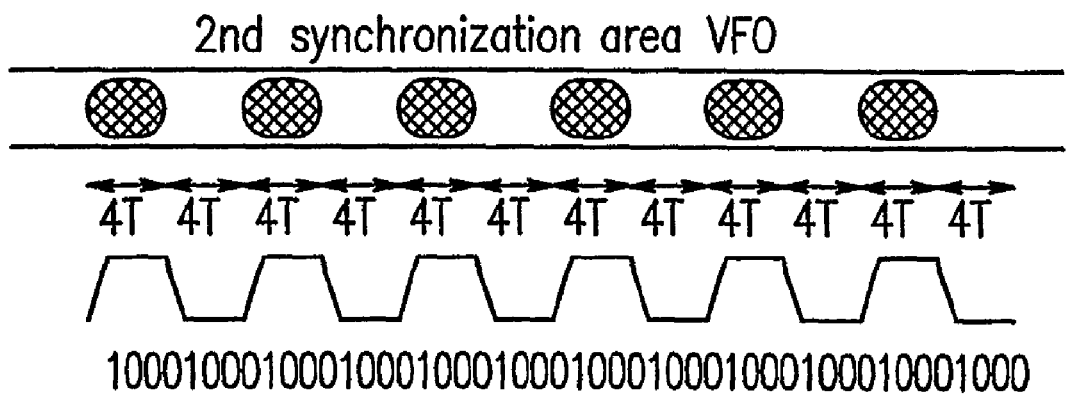
FIG. 4 shows an example of a pattern to be recorded in a second synchronization area VFO (VFO pattern), which is especially preferable in the first example of the present invention.

FIG. 4 shows an example of a pattern to be recorded in the second synchronization area VFO (VFO pattern), the example being especially preferable in the first example of the present invention. A feature of the VFO pattern shown in FIG. 4 is that the pattern includes repeated 4 channel bit recording marks and spaces. The pattern shown in FIG. 4 fulfills conditions 1 through 3 as described above.

The pattern having a single length of 4T guarantees a sufficient amplitude of the reproduction signal RF (condition 1). A pattern which provides the largest number of times of mark/space switching is a pattern having a single length of 3 channel bits (minimum length), but a pattern having a single length of 4T is considered as preferable for the following reason. In the recording and reproduction characteristics of an optical disc medium realizing high density recording, the amplitude of a reproduction signal RF having a minimum length bit is generally significantly shorter than the longer mark/space. Therefore, with the length of 3 channel bits, a reproduction signal RF to be stably level-sliced may not be obtained. Therefore, a pattern having a single length of 4T is considered as preferable in order to fulfill both conditions 1 and 2. Since the pattern having a single length of 4T can have the DSV=0, the pattern also fulfills condition 3.

The pattern to be recorded in the second synchronization area VFO is not limited to a pattern having a single length of 4T. It is preferable to record a pattern fulfilling all the conditions 1 through 3, but the conditions can be provided with priority levels in accordance with the recording and reproduction characteristics of the optical disc medium. For example, in the case of an optical disc medium which provides a sufficient amplitude of a reproduction signal RF (condition 1) with a recording mark or space having a minimum length of 3T, a pattern having repeated 3T recording marks or spaces can be used. Thus, the number of times of mark/space switching can be increased (condition 2) as compared to a pattern having a single length of 4T. In this manner, condition 2 obtains a higher priority level than condition 1, and the data PLL can be locked more quickly. Alternatively, in the case of an optical disc medium which does not provide a sufficient amplitude of a reproduction signal RF even with a pattern having a single length of 4T, a pattern having repeated 5T recording marks or spaces can be used. In this case, condition 1 obtains a higher priority level than condition 2; i.e., although the number of times of mark/space switching is decreased as compared to a pattern having a single length of 4T, the precision of data level-slicing can be improved.

FIG. 5 shows an exemplary pattern to be recorded in the second synchronization area VFO when Tmin=3 and Tmin=2. In the example shown in FIG. 5, when Tmin=3, a pattern having repeated 4T recording marks and spaces is used; and when Tmin=2, a pattern having repeated 3T recording marks and spaces is used.

Thus, a pattern having a single length of (Tmin+1) channel bits provides a sufficient amplitude of a reproduction signal RF and thus fulfills condition 1.

When an 8/16 modulation system is used, Tmin=3 and 1 byte=16 channel bits. Therefore, 4T marks or spaces are repeated 4 times per byte. Since the length of the second synchronization area VFO in the first example is 91 bytes, 4T marks or spaces are repeated 364 times (=91×4).

The 8/16 modulation system is one system for transforming 8 bit binary data into a code word having 16 channel bits. The 8/16 modulation system is disclosed in detail in, for example, Japanese Laid-Open Publication No. 8-31100. In the 8/16 modulation system, a plurality of transformation tables are allocated to 8 bit pre-modulation data, and the transformation tables are switched to transform the 8 bit pre-modulation data into a code so that the post-modulation code sequence has as few low frequency components as possible. The transformation tables are switched so that the conditions of the minimum inversion interval d=2 and the maximum inversion interval k=11 are fulfilled while minimizing the absolute value of the DSV in the code sequence.

Figure 6:
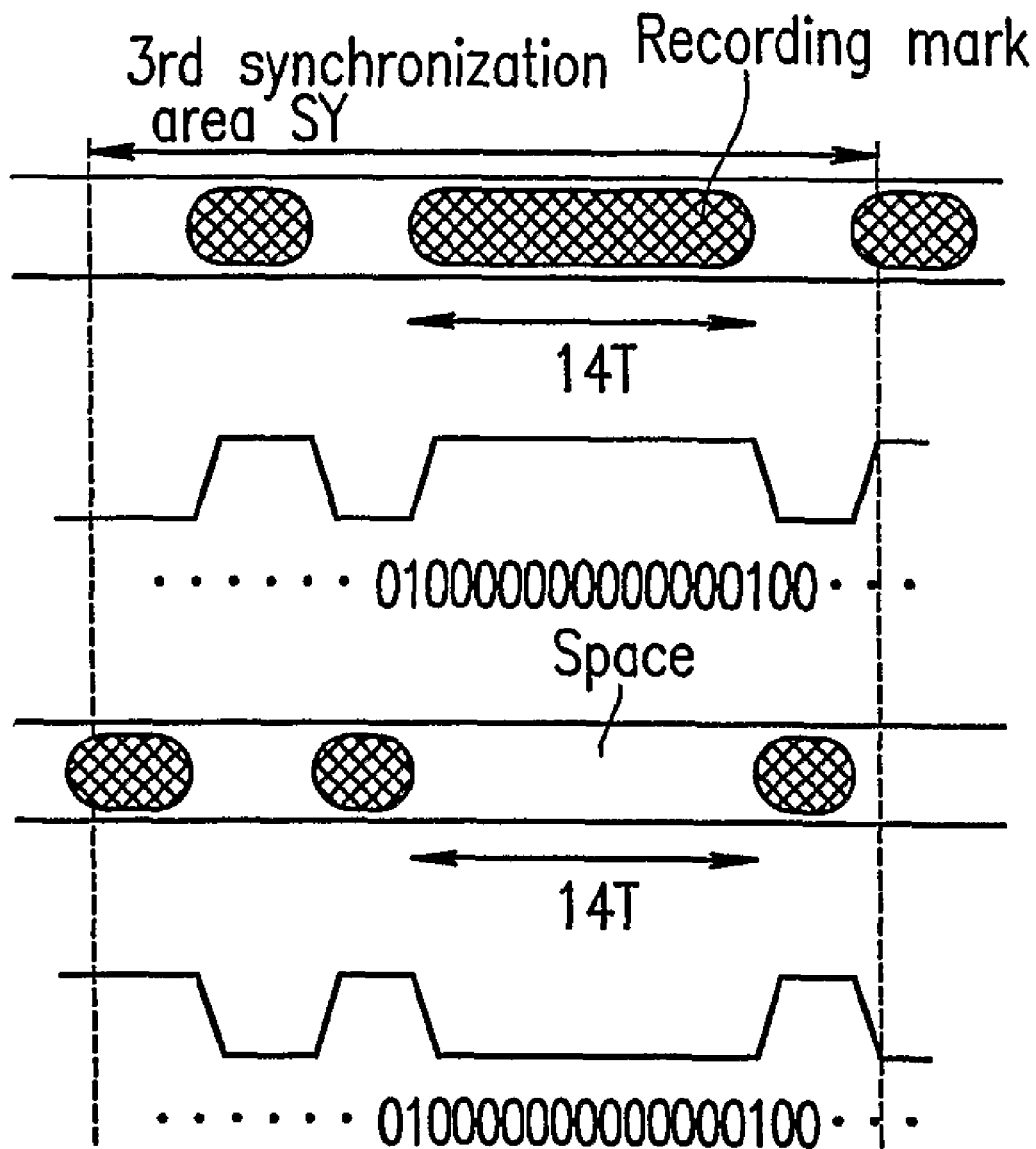
FIG. 6 shows an example of a pattern to be recorded in a third synchronization area SY (SY pattern), which is especially preferable in the first example of the present invention.

FIG. 6 shows an example of a pattern to be recorded in the third synchronization area SY (SY pattern), the example being especially preferable in the first example of the present invention. A feature of the SY pattern shown in FIG. 6 is that the pattern includes a recording mark or a space having a length of 14 channel bits (14T), which is a (Tmax+3) channel bit length. The length of 14T is different by 3 channel bits from the maximum mark/space length Tmax of 11 (11T) of a data bit stream to be recorded in the data area DATA. Therefore, against an edge shift of about one bit, a sufficient error margin is provided for preventing the 11T pattern in the data area DATA from being incorrectly detected as the pattern in the third synchronization area SY, as described above regarding the pattern to be recorded in the first synchronization area PA with reference to FIG. 3. In this manner, the SY pattern is used for identifying (or representing) the start of the second frame area 202 (frame area).

A method for recognizing an absolute position (hereinafter, referred to as an "address") in the information track 102 from the optical disc medium 101 in the first example of the present invention will be described. In order to record data at a prescribed address on a recordable optical disc medium, a recording apparatus needs to read information on the prescribed address before data recording and search for the position at which the data is to be recorded. In order to obtain address information in an area where no data has been recorded, the address information needs to be pre-formatted. According to an exemplary pre-formatting technique, the address information is represented by pre-pits defined using the convex and concave portions at the recording surface, or the address information is represented by the manner of meandering in which grooves for forming the information track 102 are formed.

In the present invention, any technique can be used for obtaining the address information in the optical disc medium 101. Unless specifically described in this specification, each data block is given inherent address information, and the address information of each data block is obtained by accessing a prescribed portion of the information track 102.

With reference to FIG. 2 again, a method for recording data on the optical disc medium 101 (FIG. 1) having the above-described data format will be described. On the optical disc medium 101, data is recorded using the data block 103 as a minimum unit. A series of data recording is begun and terminated in the second synchronization area VFO of the first frame area 201. Herein, the first frame area 201 including a position at which data is additionally recorded is referred to as a "linking frame area".

When additional data is recorded from the termination position of a series of data recording, the beginning position of the additional data recording and the termination position of the additional data recording are determined so that the relationship S≦E is always fulfilled with the following conditions. The beginning position of the additional data recording is an Sth byte of the second synchronization area VFO of the first frame area 201, which is a linking frame area ("S" is a rational number which is smaller than the number of bytes representing the length of the second synchronization area VFO). The termination position of the additional data recording is an Eth byte of the second synchronization area VFO ("E" is a rational number which is smaller than the number of bytes representing the length of the second synchronization area VFO). By thus determining the beginning position and termination position of the additional data recording, the portion in which the data is additionally recorded includes no area which is left without any pattern (VFO pattern) recorded. When an area is left without any VFO pattern recorded, there is an undesirable possibility that the reproduction systems are not accurately locked.

The difference between S and E is preferably determined in consideration of various fluctuation error factors of a driving apparatus. In an ideal state where the fluctuation error is zero, the number of bytes given by (S−E) is recorded in the same area when recording of data is terminated and also when recording is begun. Therefore, the data previously recorded in this area is overwritten by data currently recorded. Accordingly, it is preferable to set the number of bytes given by (S−E) to be the upper limit of the fluctuation error factors or higher. In this case, even when the fluctuation error is maximum, additional data recording can be performed without leaving any area without any VFO pattern recorded.

When the optical disc medium 101 is a rewritable optical disc medium formed using a phase change recording material or the like, repeating additional data recording a great number of times at the same position may cause degradation of the recording layer. In order to minimize the degradation of the recording layer and still improve overwritability (increase the number of times data can be recorded on the same track), the beginning position and the termination position of data recording can be randomly changed within a prescribed range each time data is recorded. In such a case, the length of the first frame area 201 is not necessarily a fixed byte length. The reason is that the length of the second synchronization area VFO varies due to the change of the beginning position and the termination position of data recording. How much the beginning position and the termination position of data recording should be changed is preferably determined in consideration of the length of the second synchronization area VFO, the time period required for locking the reproduction systems, the degradation characteristics of the recording layer, and the like.

According to the present invention, the frame area in which additional data recording is begun, i.e., the linking frame area, is the first frame area 201 which does not include a data area DATA. Therefore, even additional data recording is not performed discontinuously. Accordingly, the undesirable possibility is eliminated that additionally recorded data is not read and as a result, data recorded in one frame area is lost. As compared to the conventional optical disc medium in which linking is performed in a data area DATA (additional data is recorded in the data area DATA), the reading error margin in the additionally recorded data can be significantly improved. As a result, data recording and reproduction can be stably performed even at the beginning position and the termination position of data recording.

As can be appreciated from FIG. 2, a recording apparatus records data on the optical disc medium 101 as follows. First, a record start VFO portion 2102 (first synchronization code sequence provided for stably reproducing data) shown in FIG. 2 is first recorded in the first frame area 201 (third area) on the information track 102, and then the at least one second frame area 202 is recorded. Accordingly, the area (first area) in which at least one second frame is rearward to the first frame area 201 (third area). The first frame area 201 (third area) includes an area in which a record start VFO portion 2102 (first synchronization code sequence) is to be recorded.

The second frame area 202 includes the SY pattern (second synchronization code sequence) for identifying the start of the second frame area 202 and at least a portion of the data to be recorded (data to be recorded in the data area DATA). In the case where the data to be recorded on the optical disc medium 101 corresponds to a plurality of data blocks 103, the first frame area 201 is provided at the border of two adjacent data blocks 103 so that the PA pattern and the VFO pattern are recorded. When the data recording on the optical disc medium 101 is terminated, a PA pattern (third synchronization code sequence) is recorded after the at least one second frame area 202. Then, a record finish VFO portion 2101 (fourth synchronization code sequence provided for stably reproducing data) shown in FIG. 2 is recorded. The PA pattern and the record finish VFO portion 2101 are recorded in a first frame area 201 (second area). This first frame area 201 (second area) is different from the first frame area 201 (third area) in which the record start VFO portion 2102 was recorded when the recording was begun, and is provided rearward to the first area. The first frame area 201 (second area) includes an area in which the PA pattern (third synchronization code sequence) and the record finish VFO portion 2101 (fourth area) are to be recorded.

In order to randomly change the beginning position of the additional recording, the length of the record start VFO portion 2102 (the first synchronization code sequence provided for stably reproducing data) shown in FIG. 2 in the VFO pattern may be randomly set. In order to randomly change the termination position of the additional recording, the length of the record finish VFO portion 2101 (the fourth synchronization code sequence provided for stably reproducing data) shown in FIG. 2 in the VFO pattern may be randomly set. When the beginning position or the termination position of recording is randomly changed, it is not indispensable that the length of the record finish VFO portion 2101 or the record start VFO portion 2102 is randomly changed. As described above, the position at which data is to be recorded can be obtained by pre-formatted address information, regardless of whether the data has already been recorded or not. Accordingly, the beginning position or the termination position of recording can be randomly changed with respect to the absolute position on the optical disc medium 101 which is obtained by reproducing the address information. In this case, it is preferable that the end of the record finish VFO portion 2101 is positioned rearward with respect to the start of the record start VFO portion 2102.

As described above, the beginning position and the termination position of additional data recording are set so that the relationship $S \leqq E$ is always fulfilled. Therefore, at least a portion of the record finish VFO portion 2101 (the fourth synchronization code sequence already recorded on the optical disc medium 101 is overwritten by the record start VFO portion 2102 (the first synchronization code sequence of the VFO pattern recorded when additional data recording is performed.

As described above, in the first example of the present invention, a data block which is the minimum unit of recording and reproduction includes a first frame area at the start and a frame area located subsequent to the first frame area. The first frame area includes a first synchronization area (PA) and a second synchronization area (VFO). The second frame area includes a third synchronization area (SY) and a data area (DATA) for recording data. Due to such a structure, the beginning/termination of data recording (linking) can be performed in the second synchronization area (VFO) in the first frame area (linking frame area). Various fluctuation factors in the data recording can be absorbed within the second synchronization area VFO, and thus stable data recording and reproduction can always be provided. Overhead is kept small at slightly more than one frame per data block.

According to the present invention, it is not necessary to precisely set the positioning accuracy to less than one channel bit. Accordingly, a driving apparatus can be designed with a simple structure, thus reducing the production cost of the driving apparatus.

Figure 7A:
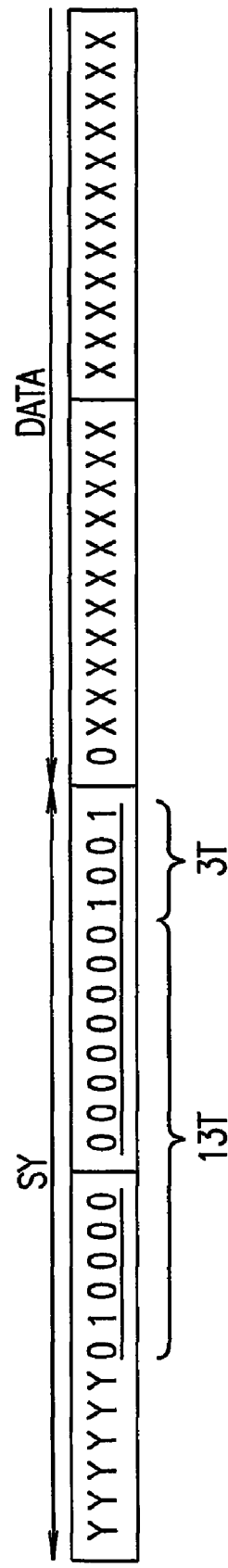
FIG. 7A shows an exemplary recording pattern of a beginning position of a usual frame area (i.e., second frame area) in the first example of the present invention.
Figure 7B:
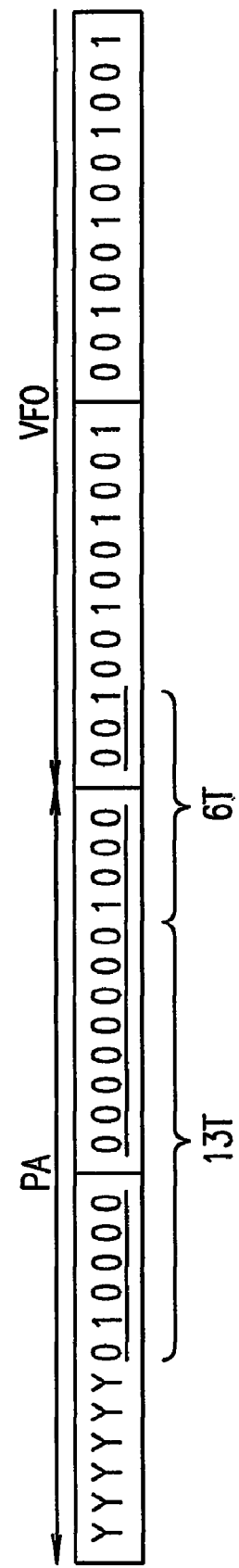
FIG. 7B shows an exemplary recording pattern of a beginning position of a linking frame area (i.e., first frame area) in the first example of the present invention.

FIG. 7A shows an exemplary recording pattern of a beginning position of a usual frame area (i.e., the second frame area 202) and FIG. 7B shows an exemplary recording pattern of a beginning position of a linking frame area (i.e., the first frame area 201) both in the first example of the present invention. The examples shown in FIGS. 7A and 7B are obtained when a run length limited code having parameters of d=1, k=9, and n/m=1.5 is used for modulation of the data area.

In FIG. 7A, the beginning position of the usual frame area refers to the start of the second frame area 202 (FIG. 2) in conformity of the data format of the first example of the present invention. At the start of the second frame area 202, the third synchronization area SY is provided having a length of two bytes (i.e., 24 channel bits). The data area DATA is provided from the third byte. In the SY pattern of the third synchronization area SY, the underlined partial pattern "10000000000001001" corresponds to the pattern of (Tmax+3)·(Tmin+1) in a run length limited code having parameters of d=1 and k=9. "YYYYYY" at the start of the SY pattern (left of FIG. 7A) is preferably determined so as to fulfill the run length limitation of d=1 and k=9 in consideration of the connection with the immediately preceding data area DATA.

In FIG. 7B, the beginning position of the linking frame area refers to the start of the first frame area 201 in conformity of the data format of the first example of the present invention. At the start of the first frame area 201, the first synchronization area PA is provided having a length of two bytes (i.e., 24 channel bits). The second synchronization area VFO is provided from the third byte. The underlined partial pattern "10000000000001000001" in the first synchronization area PA and the second synchronization area VFO corresponds to the pattern of (Tmax+3)·(Tmin+4) in a run length limited code having parameters of d=1 and k=9. The unique pattern of the linking frame area, i.e., the pattern of ((Tmax+3)·(Tmin+4)) and the unique pattern of the usual frame area, i.e., the pattern of ((Tmax+3)·(Tmin+1)) have the relationship that the length from the beginning position to the beginning position of (Tmax+3) is the same (8 channel bits) and the termination position of (Tmax+3) is the same.

In FIG. 7B, "YYYYYY" at the start is preferably determined so as to fulfill the run length limitation of d=1 and k=9 in consideration of the connection with the immediately preceding data area DATA. "YYYYYY" in FIG. 7B can be exactly the same as the "YYYYYY" in the SY pattern in FIG. 7A. Even in this case, the code distance between the PA pattern and the SY pattern can be still 3 since the pattern immediately after (Tmax+3) in the SY pattern is (Tmin+1) whereas the pattern immediately after (Tmax+3) in the PA pattern is (Tmin+4).

Accordingly, even when, for example, the SY pattern and the PA pattern each have a length of 2 bytes and thus many types patterns cannot be formed when (Tmax+3) is included in the 2-byte length, the number of types of patterns which can be distinguished by the length of the pattern immediately after (Tmax+3) can be increased. Thus, the degree of freedom of use of patterns is increased.

When the degree of freedom of use of patterns is increased, it is also possible to increase the number of types of patterns usable as an SY pattern or a PA pattern while maintaining the code distance at 2 or more, or conversely to increase the code distance to 3 or more while maintaining the number of types of patterns usable as an SY pattern or a PA pattern.

The byte length of the first frame area 201 and the second frame area 202, and the number of the second frame areas 202 in each data block 103 in this example will be described.

It is preferable that the byte length of the first frame area 201 and the byte length of the second frame area 202 are preferably substantially identical to each other, or the byte length of one of the areas is substantially integral times the byte length of the other. By making the byte length of one of the first frame area 201 and the second frame area 202 substantially integral times the byte length of the other, it becomes possible to use the same circuits (timing generation circuit and the like) of a recording/reproduction apparatus, for example, for data generation in both of the frame areas when recording data and for frame interpolation in both of the frame areas when reproducing data. Thus, the scale of the recording/ reproduction apparatus can be reduced, and thus the cost can be reduced. In the first example of the present invention, the first frame area 201 and the second frame area 202 both have a length of 93 bytes. Alternatively, the byte length of the first frame area 201 can be about an integer times the byte length of the second frame area 202.

In the case where the first frame area 201 has a length of 93 bytes, the pattern shown in FIG. 3 is located in the first synchronization area PA, and the pattern shown in FIG. 4 is located in the second synchronization area VFO, the first synchronization area PA has a length of 2 bytes and the second synchronization area VFO has a length of 91 bytes. In this case, the pattern in the second synchronization area VFO includes 4T recording marks or spaces repeated 182 times.

In the first example of the present invention, the number of the second frame areas 202 in each data block 103 is 208. This number determines the frequency at which the first frame area 201 is inserted and the data size of the data block 103. When this number is large, the overhead (redundant portion of the format) caused by the first frame area 201 which does not have the data area DATA is small and thus the effect of increasing the storage capacity of the optical disc medium 101 is obtained. However, such a large number is disadvantageous when handling small size data since the data size of the data block 103 is increased.

As shown in FIG. 2, an ECC block includes 4 continuous data blocks 103. In this case, the number of the second frame areas 202 per ECC block is 208×4=832. The ECC block is defined as a coding unit of an error correction code. For example, in the case where a known product code is formed using a known Reed-Solomon code two-dimensionally as an error correction code, the ECC block is the unit of the product code. Where the third synchronization area SY has a length of 2 bytes, the total size of all the data areas DATA per ECC block is 91×832=75712 bytes. In the first example of the present invention, 65536 bytes of the 75712 bytes are used for user data, and the remaining bytes are allocated to redundant data such as an error correction, block identification ID and the like.

By forming an ECC block forming an error correction code of an integer number of data blocks, each of which is the minimum unit of a series of data recording, an effect of facilitating the management of the recording data in a driving apparatus (recording apparatus or reproduction apparatus) is provided. In the first example of the present invention, 1 ECC block=4 data blocks, but the present invention is not limited to this. A similar effect is provided even when the number of data blocks included in one ECC block is changed. For example, 1 ECC block can include one data block. However, in the first example, the number of the data blocks included in one ECC block inevitably has an upper limit since the leading frame area of each data block is the first frame area 201 (i.e., redundant data) which does not include a data area DATA. The number of data blocks included in one ECC block is preferably determined to be a value suitable to the use of the optical disc apparatus 101, the performance of the driving apparatus and the like in consideration of the error correction capability of the driving apparatus and the overhead.

The pattern recorded in the third synchronization area SY need not be identical regardless of the second frame area 202. For example, the second frame area 202 subsequent to the first frame area 201 in each data block 103 can have a specific pattern which is different from the pattern recorded in the other second frame area 202. In this manner, the above-mentioned specific pattern can be identified by the driving apparatus. Therefore, the first data area DATA in each data block 103 can be detected at a higher accuracy, which raises the reliability of the driving apparatus. In a second example described below, the SY pattern recorded at the start of one of a plurality of second frame areas 202 is different from the SY pattern recorded at the start of the other second frame areas 202.

In the first example, the first frame area (first area and third area) includes a first synchronization area PA and a second synchronization area VFO, but can include other synchronization code sequences or data bit streams.

Example 2

FIG. 8 shows a top view of a recordable optical disc medium (recording medium) 3101 according to a second example of the present invention. As shown in FIG. 8, on a recording surface of the optical disc medium 3101, a recording track 3102 (recording area) is formed in a spiral manner. The recording track 3102 is divided into data blocks 301. In other words, on the recording surface of the optical disc medium 3101, the data blocks 301 are continuously arranged in a circumferential direction to form the information track 3102.

Figure 9:
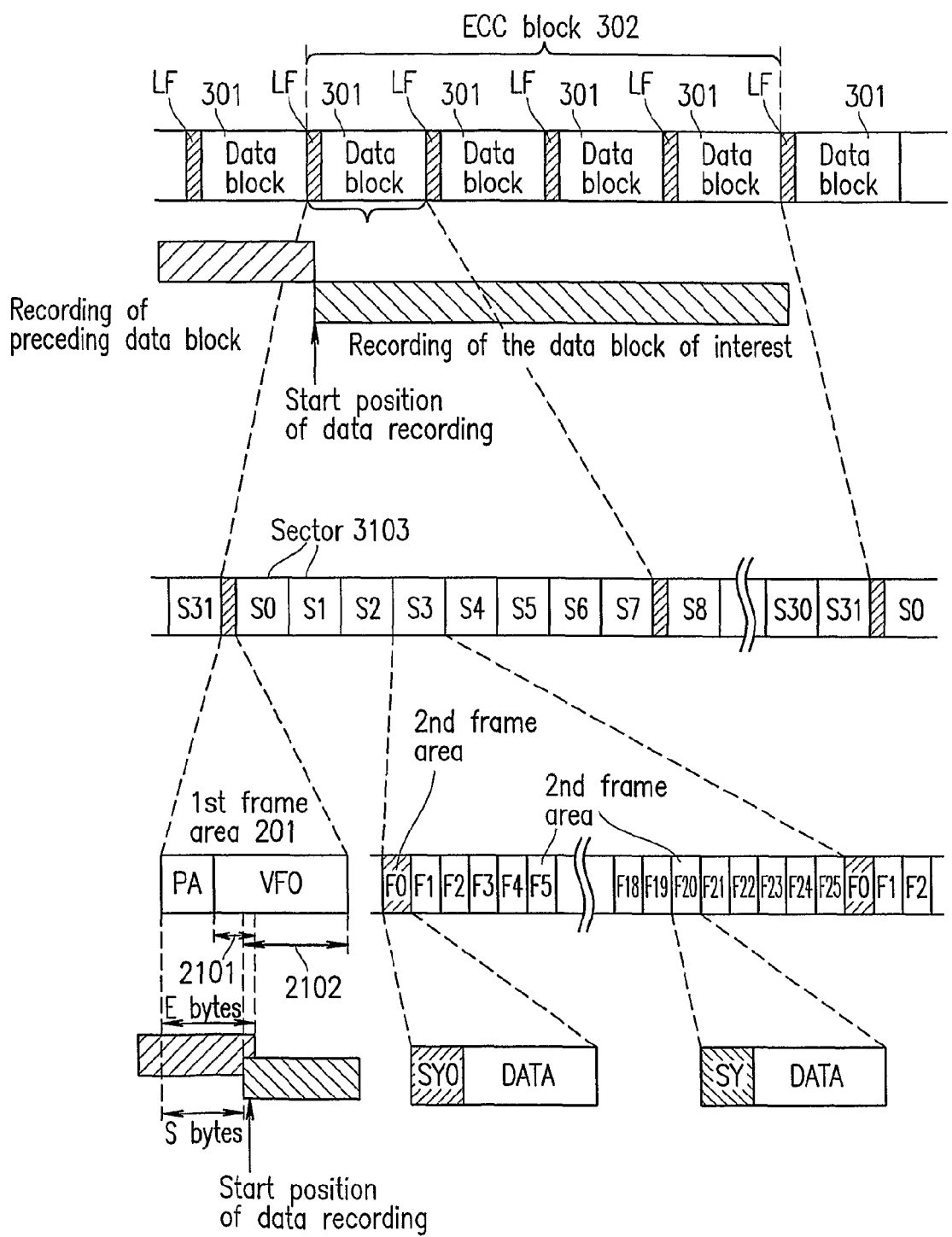
FIG. 9 shows an example of a data format of the optical disc medium 3101 in the second example of the present invention.

FIG. 9 shows an example of a data format of the optical disc medium 3101 in the second example of the present invention. In FIG. 9, identical elements as those described above with reference to FIG. 2 bear identical reference numeral therewith and will not be described in detail. In FIG. 9, an area shown in the right is rearward to an area shown in the left.

As shown in FIG. 9, each data block 301 includes a first frame area 201 and 8 sectors 3103. Four data blocks 301 form one ECC block 302. Accordingly, one ECC block includes 32 sectors.

A plurality of second frame areas included in each data block 301 are grouped into a plurality of sectors 3103 each including 26 second frame areas.

Each sector 3103 (fourth area) includes 26 second frame areas. Each frame area has a length of 93 bytes. The frame area positioned at the start of the sector 3103 is represented by reference numeral F0, and the remaining 25 frame areas are represented by reference numerals F1, F2, ... F24 and F25.

The frame area F0 includes a synchronization area SY0 (third synchronization area) at the start thereof and then a data area DATA subsequent thereto. The frame areas F1 through F25 each include a synchronization area SY (the third synchronization area) at the start thereof and then a data area DATA subsequent thereto. The synchronization area SY0 and the synchronization area SY both have a length of 2 bytes. Accordingly, the length of each of all the data areas DATA in the frame area F0 and the frame areas F1 through F25 is 91 bytes.

The total number of bytes of all the data areas DATA in each sector 3103 is 91×26=2366 bytes. User data to be recorded in each sector has a length of 2048 bytes, and redundant data such as address information for identifying the recording position of the data, a parity code used for detecting or correcting an error and the like has a length of 318 bytes. The total of the user data and the redundant data is 2366 bytes.

The data bit stream to be recorded in the data area DATA is not recorded as binary data itself, but is transformed by a modulation system matching the characteristics of a recording and reproduction signal of the optical disc medium before being recorded. It is assumed here that NRZI recording is performed using an 8/16 modulation system. The data bit stream to be recorded in each data area DATA has a length of 91×16=1456 channel bits, and includes recording marks or spaces having a minimum length Tmin of 3 bits and a maximum length Tmax of 11 bits.

The synchronization area SY0 is provided for identifying the start of the frame area F0, and preferably has a pattern recorded which does not occur in at least a data bit stream to be recorded in the data area DATA. By recording a pattern, in the synchronization area SY0, which does not occur in the data area DATA, the synchronization area SY0 can be easily distinguished from the data area DATA when the data bit stream is read.

Each synchronization area SY is provided for identifying the start of the respective second frame of the second frame areas F1 through F25. Each synchronization area SY preferably has a pattern recorded which does not occur in at least a data bit stream to be recorded in the data area DATA, like the synchronization area SY0 in the frame area F0. By recording a pattern, in the synchronization area SY, which does not occur in the data area DATA, the synchronization area SY can be easily distinguished from the data area DATA when the data bit stream is read. Hereinafter, the pattern recorded in the synchronization area SY or the synchronization area SY0 will also be referred to as a "synchronization code sequence".

Figure 10:
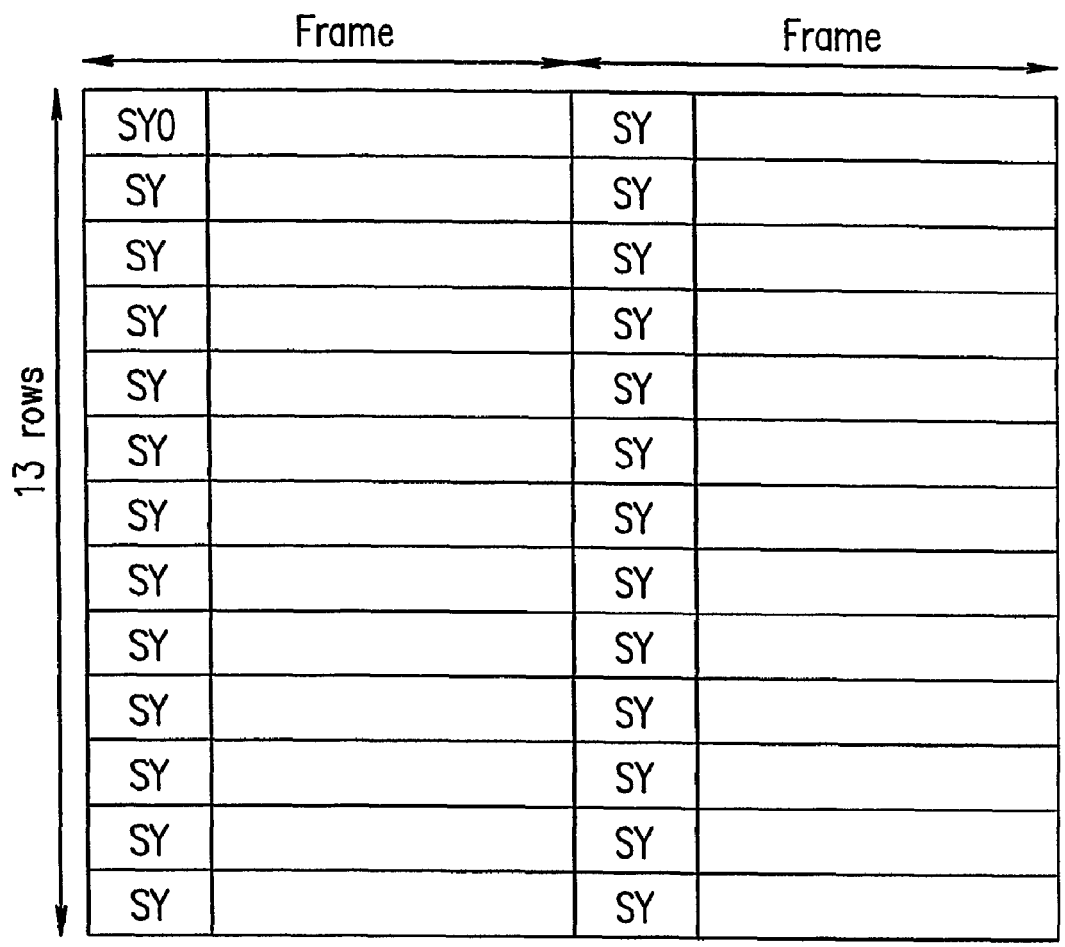
FIG. 10 shows an example of synchronization code sequences located at the start of each of the 26 frame areas included in a sector 3103 (FIG. 9).

FIG. 10 shows an example of synchronization code sequences located at the start of each of the 26 frame areas included in the sector 3103 (FIG. 9). The synchronization code sequences are classified into two types, the SY0 pattern and the SY pattern. The SY pattern is located in the second through the 26th frame areas.

FIG. 11 shows an example of a pattern preferably used as a synchronization code sequence in the second example of the present invention. The pattern shown in FIG. 11 includes a recording mark or space having a length of 14 channel bits (14T), which is a (Tmax+3) channel bit length. In the second example, as described above, the maximum mark/space length Tmax of a data bit stream to be recorded in the data area DATA is 11 channel bits (11T), which is different, by 3 bits, from 14T included in the synchronization code sequence. Even when a 1 channel bit edge shift occurs due to the influence of noise generated during reproduction, and as a result, the 14T mark (or the 14T space) in the synchronization code sequence shortens to 13 channel bits and the 11T mark (or the 11T space) in the data area DATA lengthens to 12 channel bits, there is still a 1 channel bit difference between the mark (or space) in the synchronization code sequence and the mark (or space) in the data area DATA. Thus, against an edge shift of about one bit, a sufficient error margin is provided for preventing the 11T pattern in the data area DATA from being incorrectly detected as the pattern in the synchronization code sequence.

In order to distinguish the SY0 pattern and the SY pattern from each other, it is preferable to provide a code distance therebetween of 2 or more. Herein, the code distance refers to the number of bits which are different between the two data bit streams. In the case of the NRZ recording, the code distance is given by the data bit stream in the NRZ representation. In the case of the NRZI recording, the code distance is given by the data bit stream in the NRZI representation. When the code distance between the SY0 pattern and the SY pattern is equal to or greater than 2, one pattern is not incorrectly identified as the other pattern even when a 1 bit shift error occurs in reading one of the patterns.

When the code distance is equal to or greater than 3, the identification capability is further improved. For example, with the code distance of 2, when the SY0 pattern and the SY pattern shift by one bit in the direction of approaching each other, the two patterns become identical and cannot be distinguished from each other. With the code distance equal to or greater than 3, by contrast, when the SY0 pattern and the SY pattern shift by one bit in the direction of approaching each other, there is still a difference equal to or greater than one bit, and the two patterns can be distinguished from each other. Therefore, the SY0 pattern and the SY pattern can always be distinguished from each other while keeping the tolerance of a 1 bit error. A plurality of types of SY patterns can be used as long as the code distance between the SY0 pattern and each of the SY patterns is equal to or greater than 2.

Figure 12:
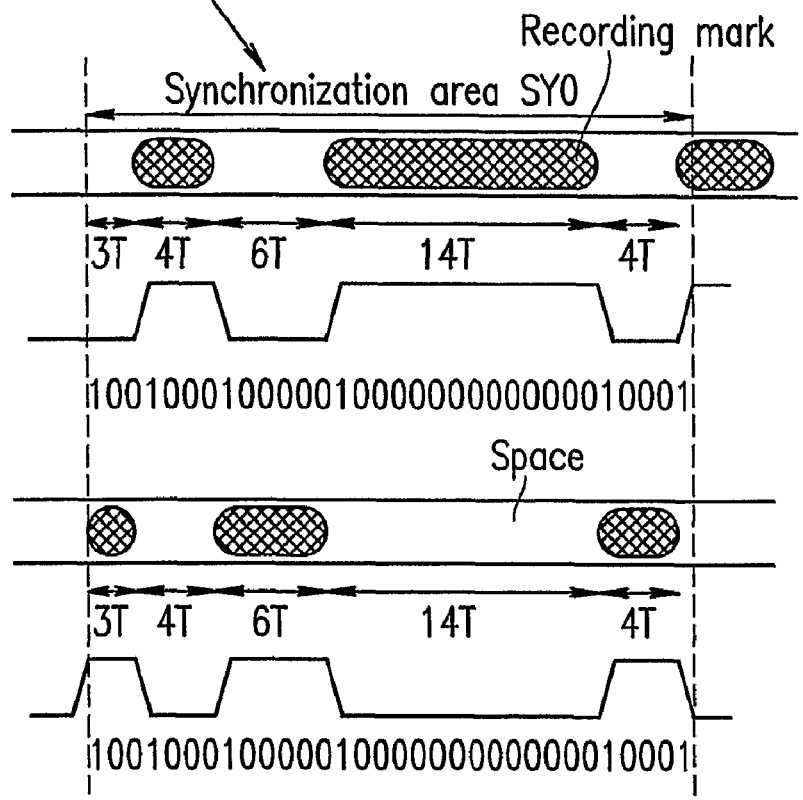
FIG. 12 shows a specific example of an SY0 pattern and an SY pattern in the second example of the present invention.

FIG. 12 shows a specific example of the SY0 pattern and the SY pattern in the second example of the present invention. The SY0 pattern and the SY pattern both have a length of 2 bytes (i.e., 32 channel bits) and both include a common unique pattern of (14T+4T). One advantage of matching the length of the two patterns and causing the two patterns to include a common unique pattern is that a device for detecting the patterns can be simplified since the device can include a common pattern detection system for the two patterns.

The unique pattern corresponds to the pattern of (Tmax+3)·(Tmin+1) in the 8/16 modulation system. The detection capability of the pattern itself is improved by locating a space (or mark) having (Tmin+1) bits immediately after a mark (or space) having (Tmax+3) bits. In other words, by using (14T+4T) as the detection pattern when the data in the data block 3103 is read, the possibility of incorrect detection can be reduced compared to using only 14T as the detection pattern. By adding (15T+3T) or (13T+5T) to the detection pattern, not only (14T+4T), 14T can be avoided from being undetected even when an edge shift occurs at the rear end of the 14T, and still the possibility of incorrect detection can be kept as low as possible.

FIG. 12 shows four types of patterns usable as an SY0 pattern and four types of patterns usable as an SY pattern (two types for State 1 and State 2 and two types for State 3 and State 4). Herein, States 1 through 4 represent index information indicating which of a plurality of transformation tables of the 8/16 modulation system is to be selected. The patterns for State 1 and State 2 have a feature that the zero run on the MSB side (left in FIG. 12) is 2 or 3. The patterns for State 3 and State 4 have a feature that the zero run on the MSB side (left in FIG. 12) is 0; i.e., the MSB starts with a "1" bit.

Now, how to make a selection from the four SY0 patterns will be described. When the modulation result immediately before the synchronization area SY0, i.e., the next state after the last data byte in the data area DATA in the frame area F25 is modulated, is 1 or 2, State 1 and State 2 are selected. Otherwise, State 3 and State 4 are selected. In this way, the zero run can be within a prescribed range (within the range of 2 to 10) at the connection point of the last byte of the frame area F25 and the SY0 pattern. Regarding the SY pattern, the selection is performed in a similar manner.

Next, how to select a first selection code sequence (shown in the left half of FIG. 12) or a second selection code sequence (shown in the right half of FIG. 12) will be described. In the first selection code sequence, CDS (Codeword Digital Sum) is a positive value; and in the second selection code sequence, CDS is a negative value. Here, CDS is a value obtained by summing up all the bits in the code sequence (pattern) which is obtained by NRZI transformation of the code sequence, assuming that the MSB is 1. The summation is performed with the bit "1" being +1 and the bit "0" being −1. Namely, a sum of the immediately preceding DSV value and the CDS of the code sequence is the DSV value after the code sequence is selected. Since the sign of the CDS of the first selection code sequence and that of the second selection code sequence are opposite to each other, selection of one of them allows the value of DSV closer to zero. As a result, the value of DSV can be effectively controlled.

The most noticeable feature of the patterns in FIG. 12 will be described. The most noticeable feature is that the code distances between the four types of patterns usable as the SY0 pattern and the four types of patterns usable as the SY pattern are all equal to or greater than 2 (in the NRZI representation).

For example, a code distance between the underlined pattern among the patterns usable as the SY0 pattern, "10010001000001000000000000010001" and each of the four patterns usable as the SY patterns will be checked. The code distance between the above-mentioned underlined pattern and the pattern "00010000000001000000000000010001" in the NRZI representation is 7. This code distance is found by comparing a pattern "11100001111110..." obtained by NRZI-transforming the former pattern beginning with bit "1" and a pattern "00011111111110..." obtained by NRZI-transforming the latter pattern beginning with bit "0".

Similarly, the code distance between the above-mentioned underlined pattern and the pattern "00100000001001000000000000010001" is 4, the code distance between the above-mentioned underlined pattern and the pattern "10001000010001000000000000010001" is 3, and the code distance between the above-mentioned underlined pattern and the pattern "10001000000001000000000000010001" is 6. Thus, all the code distances fulfill the condition of being equal to or greater than 2. By keeping all the code distances of the SY0 patterns and the SY patterns to be equal to or greater than 2, the possibility of incorrect identification of the two patterns can be reduced even when an error such as a bit shift or the like occurs. By having only the leading frame area F0 of the sector 3103 distinguished from the other frame areas F1 through F25, the start of the sector 3103 can be easily detected. A pattern to be recorded in the synchronization area SY at the start of each of the frame areas F1 through F25 can be any of a plurality of patterns which include a pattern having (Tmax+3) bits and a pattern having (Tmin+1) bits and fulfill the condition of the code distance from the SY0 pattern being equal to or greater than 2.

FIG. 13 schematically shows different code distances between the types of synchronization code sequences (patterns). FIG. 13 shows the relationship between the synchronization code sequence SY0 (SY0 pattern) and the synchronization code sequence SY (SY pattern). When the code distance therebetween is only 1, occurrence of a 1 bit error while the SY0 pattern is read results in the SY0 pattern being read as identical to the SY pattern. Therefore, when a 1 bit error occurs, the type of the pattern read cannot be determined even by complete matching determination (determination technique by which the two patterns are determined to be identical to each other only when the entire patterns completely match each other).

When the code distance between the SY0 pattern and the SY pattern is 2, occurrence of a 1 bit error in one of the patterns does not result in the two patterns being identical to each other. Even when a 1 bit error occurs in both of the patterns, the type of the pattern read can be determined as long as complete matching determination is used. Accordingly, determination of types of synchronization code sequences is possible with complete matching determination.

When the code distance between the SY0 pattern and the SY pattern is 3, even occurrence of a 1 bit error in both of the patterns still leaves the code distance of 1. Accordingly, even when a determination technique for allowing a 1 bit error is used, the type of the pattern read can be determined. When complete matching determination is used, even a 2 bit error can be allowed.

From the above description, it is appreciated that using a code distance between types of synchronization code sequences equal to or greater than 3, the reliability is higher compared to using a code distance of 2.

FIG. 14 shows an exemplary internal structure of the frame area F0. In the example shown in FIG. 9, the data area DATA is simply located immediately after the synchronization area SY0. In the example shown in FIG. 14, by contrast, a data position identification area DataID and an error correction area Parity for the data position identification area are provided immediately after the synchronization area SY0. Due to such a structure, the content of the data position identification area DataID can be read immediately after the SY0 pattern recorded in the synchronization area SY0 is detected. The content of the data position identification area DataID can include, for example, a sector number. In this case, the position of the sector can be determined only by reading the data position identification area DataID. Accordingly, the position of the sector can be identified only by detecting the SY0 pattern, which allows the reproduction apparatus to detect the sector easily and quickly.

FIG. 15 shows specific examples of the SY0 pattern, the SY pattern, and the PA pattern in the second example of the present invention. The SY0 pattern and the SY pattern are exactly the same as those described above with reference to FIG. 12 and will not be described in detail.

The PA pattern is determined in a manner similar to the manner used for the SY0 pattern and the SY pattern described above with reference to FIG. 12. The PA pattern has a length of 2 bytes (i.e., 32 channel bits). For conformity with the 8/16 modulation system, state control (selection of the patterns for State 1 and State 2 or the patterns for State 3 and State 4) is possible and also the DSV control (selection of the patterns, the signs of CDS of which are opposite to each other, i.e., positive or and negative) is possible. The DSV control suppresses the DC components of the post-modulation data bit stream.

The SY0 pattern, the SY pattern and the PA pattern all include a common unique pattern of (14T+4T). One advantage of the three patterns having the same bit number and including a common unique pattern is that a device for detecting the patterns can be simplified since the device can include a common pattern detection system for the three patterns.

The most noticeable feature of the patterns in FIG. 15 is that the code distances between the four types of patterns usable as the SY0 pattern, the four types of patterns usable as the SY pattern and the four types of patterns usable as the PA pattern are all equal to or greater than 2 (in the NRZI representation).

For example, a code distance between the underlined pattern among the patterns usable as the PA pattern, "00000010010001000000000000010001", and each of the four patterns usable as the SY0 patterns and each of the four patterns usable as the SY patterns will be checked. The code distance between the above-mentioned underlined pattern and the SY0 pattern "00100100001001000000000000010001" in the NRZI representation is 4. This code distance is found by comparing a pattern "11111100011110..." obtained by NRZI-transforming the former pattern beginning with bit "1" and a pattern "00111000001110..." obtained by NRZI-transforming the latter pattern beginning with bit "0".

Similarly, the code distance between the above-mentioned underlined pattern and the SY0 pattern "00010000100001000000000000010001" is 4, the code distance between the above-mentioned underlined pattern and the SY0 pattern "10010001000001000000000000010001" is 5, and the code distance between the above-mentioned underlined pattern and the SY0 pattern "1000000001000100000000000010001" is 6. Thus, all the code distances fulfill the condition of being equal to or greater than 2. The code distance between the above-mentioned underlined pattern and the SY pattern "0001000000001000000000000010001" is 6, the code distance between the above-mentioned underlined pattern and the SY pattern "0010000000100100000000000010001" is 5, the code distance between the above-mentioned underlined pattern and the SY pattern "1000100001000100000000000010001" is 3, and the code distance between the above-mentioned underlined pattern and the SY pattern "1000100000001000000000000010001" is 7. Thus, all the code distances fulfill the condition of being equal to or greater than 2.

In the above, the specific examples of the SY0 pattern, the SY pattern, and the PA pattern when the post-modulation data bit stream is run-length-limited to Tmin=3 and Tmax=11 are described. Hereinafter, with reference to FIG. 16, specific examples of the SY0 pattern, the SY pattern, and the PA pattern when Tmin=2 and Tmax=8 will be described. The patterns described below are especially preferable when, for example, the data area DATA is transformed using a so-called (1-7) modulation system, i.e., a run length limited code system having parameters of d=1, k=7, m=2 and n=3.

FIG. 16 shows, as described above, the specific examples of the SY0 pattern, the SY pattern, and the PA pattern preferable in the second example of the present invention. The patterns shown in FIG. 16 all have a feature of including a pattern "100000000001001" in the NRZ representation as underlined. The common pattern corresponds to the pattern of (Tmax+3)·(Tmin+1) of the (1-7) modulation system. An advantage of providing such a common unique pattern is as described above in the first example.

In the example shown in FIG. 16, four types of patterns usable as an SY0 pattern, four types of patterns usable as an SY pattern and four types of patterns usable as a PA pattern are provided (two types for the case where the LSB of the immediately preceding code word is "0", i.e., in the case where the inversion does not occur at the LSB by the NRZI representation; and two types for the case where the LSB of the immediately preceding code word is "1", i.e., in the case where the inversion occurs at the LSB by the NRZI representation). The classification based on the LSB of the immediately preceding code word corresponds to the Tmin of 2 in the (1-7) modulation system. In other words, by performing the above-described selection based on whether the zero run on the LSB side is 0, or equal to or greater than 1, when the immediately preceding data is modulated, the run length limitation can be fulfilled at the connection portion.

The first selection code sequence (shown in the left half of FIG. 16) has a CDS of a positive value, and the second selection code sequence (shown in the right half of FIG. 16) has a CDS of a negative value. Thus, the DSV value can be effectively controlled as described above with reference to FIG. 15.

The most noticeable feature of the patterns in FIG. 16 is that the code distances between the four types of patterns usable as the SY0 pattern, the four types of patterns usable as the SY pattern and the four types of patterns usable as the PA pattern are all equal to or greater than 2 (in the NRZI representation).

For example, a code distance between the upper left pattern among the patterns usable as the SY0 pattern, "010000000100000000001001", and each of the four patterns usable as the SY patterns and each of the four patterns usable as the PA patterns will be checked. The code distance between the above-mentioned underlined pattern and the SY pattern "010001010100000000001001" in the NRZI representation is 2. This code distance is found by comparing a pattern "1000000001 . . . " obtained by NRZI-transforming the former pattern beginning with bit "1" and a pattern "1000011001 . . . " obtained by NRZI-transforming the latter pattern beginning with bit "1".

Similarly, the code distance between the above-mentioned underlined pattern and the SY pattern "010010000100000000001001" is 4, the code distance between the above-mentioned underlined pattern and the SY pattern "101010000100000000001001" is 3, and the code distance between the above-mentioned underlined pattern and the SY pattern "100010000100000000001001" is 3. Thus, all the code distances fulfill the condition of being equal to or greater than 2. The code distance between the above-mentioned underlined pattern and the PA pattern "010101000100000000001001" is 2, the code distance between the above-mentioned underlined pattern and the PA pattern "010101010100000000001001" is 5, the code distance between the above-mentioned underlined pattern and the PA pattern "100010100100000000001001" is 3, and the code distance between the above-mentioned underlined pattern and the PA pattern "101010100100000000001001" is 3. Thus, all the code distances fulfill the condition of being equal to or greater than 2.

By keeping all the code distances with relation to the SY0 patterns, the SY patterns and the PA patterns to be equal to or greater than 2, the possibility of incorrect identification of the three patterns can be reduced even when an error such as a bit shift or the like occurs. Thus, the leading frame area F0 of the sector 3103 can be distinguished from the other frame areas F1 through F25, which facilitates detection of the start of the sector 3103.

The first frame area 201 corresponding to the linking frame area can be distinguished from the other frame areas with certainty, which facilitates detection of the linking position. By detecting the linking position, the discontinuity of data caused by linking can be appropriately processed with ease. The process performed by a recording apparatus during the additional data recording and the process performed in the linking frame area by a reproduction apparatus will be described below in sixth and seventh examples.

FIG. 17 shows another example of synchronization code sequences located at the start of each of the 26 frame areas included in the sector 3103 (FIG. 9). In the example shown in FIG. 17, the SY0 pattern is located in the leading frame area of the sector 3103. In the subsequent frame areas, {SY1·SY1·SY2·SY1·SY1·SY2·SY1 . . . SY1·SY2·SY1} are located sequentially from the immediately subsequent frame area. In this example, an SY2 pattern is located at a frequency of one in three continuous frame areas, except for the leading frame area.

Figure 18A:
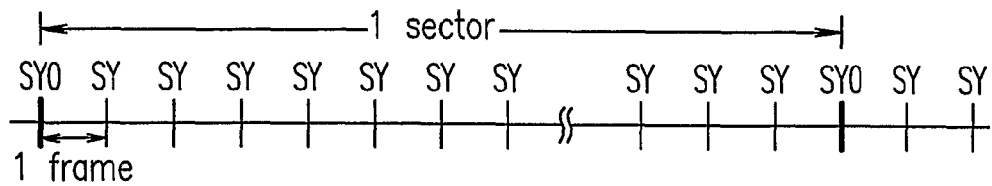
FIGS. 18A through 18D show examples in which synchronization code sequences to be recorded in second frame areas included in one sector are arranged in the order in which the synchronization code sequences are recorded on an optical disc medium.

FIGS. 18A through 18D show examples in which synchronization code sequences to be recorded in the second frame areas included in one sector are arranged in the order in which the synchronization code sequences are recorded on an optical disc medium. FIG. 18A corresponds to the arrangement of the synchronization code sequences described above with reference to FIG. 10. In the example shown in FIG. 18A, only the synchronization code sequence (SY0 pattern) located in the leading frame area is of a different type from that of the synchronization code sequences (SY pattern) located in the other frame areas. Therefore, when one frame slip occurs at a position in the sector due to a defect of a recording surface of the optical disc medium or the like, it is difficult to determine the position of the frame area currently read until the next SY0 pattern is detected.

Figure 18B:
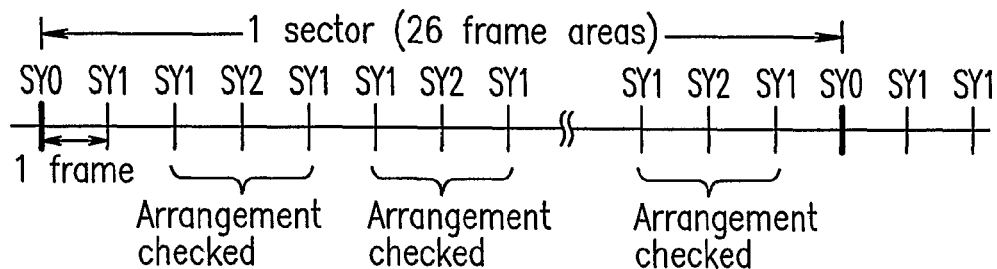

In the arrangement of FIG. 18B which uses three types of patterns of SY0, SY1 and SY2, by checking an arrangement of a minimum of three continuous frame areas (for example, {SY1·SY2·SY1}), it can be determined whether one forward frame slip has occurred or one rearward frame slip has occurred. Since the SY0 pattern is expected to be detected immediately after the arrangement of {SY1·SY2·SY1}, the start of the sector can be detected more reliably than in the case where only the SY0 pattern is detected.

Figure 18C:
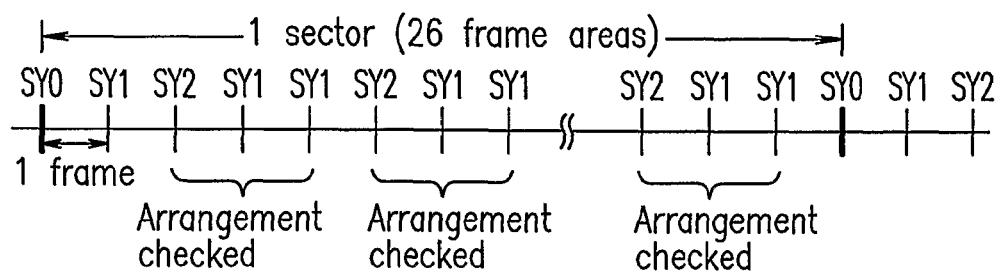
Figure 18D:
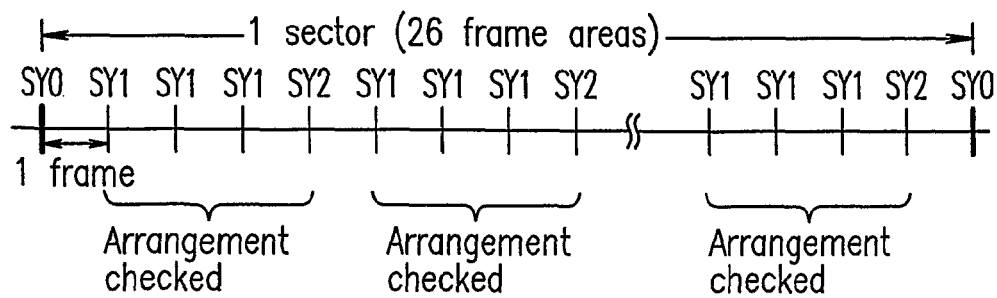

An effective arrangement of the three types of patterns of SY0, SY1 and SY2 is not limited to the above-described arrangement. The arrangement immediately after the SY0 pattern can be {SY1·SY2·SY1·SY1·SY2 . . . } as shown in FIG. 18C, or {SY2·SY1·SY1·SY2·SY1 . . . }. A similar effect as that described above can be provided. Alternatively, one cycle can include equal to or greater than four patterns. FIG. 18D shows one such example, i.e., {(SY1·SY1·SY1·SY2·SY1·SY1·SY1·SY2 . . . }.

The above-described manner of arrangement of synchronization code sequences in the second frame areas can be generalized as follows. The SY2 pattern is located at the start of the Mth frame area of the sector and the SY1 pattern is located at the start of each of the other frame areas. Here, "M" fulfills M=J×K+L, where M is a natural number equal to or less than N (N is the total number of second frame areas included in one sector and is an integer equal to or greater than 3), J and L are constants (J is an integer equal to or greater than 2 and L is a natural number equal to or less than J), and K is an integer equal to or greater than 0. When the patterns are located in this manner, by checking an arrangement of a minimum of J continuous frame areas, it can be determined whether up to (J−1) forward frame slips have occurred or up to (J−1) rearward frame slips have occurred.

The examples shown in FIGS. 18B and 18C correspond to the case where N=26, J=3 and K=0 through 8.

When three types of patterns are repeated at a cycle of four patterns (four frame areas), up to two frame slips can be determined by checking an arrangement of a minimum of four continuous frame areas. As the number of frame areas included in one cycle is increased to 5, 6, . . . , the number of frame slips which can be detected is increased. However, as the number of frame areas included in one cycle is increased, the number of continuous frame areas of an arrangement required to be checked is also increased. Thus, it takes a longer time period to determine the frame slip. In the case where the number of bits of an error is excessive, it is difficult to check the arrangement and may undesirably spoil the reliability of the reproduction apparatus. Accordingly, the cycle of the frame areas is determined to be optimum in accordance with the maximum number of frame slips which should be detected or other elements required by the reproduction apparatus.

Figure 19A:
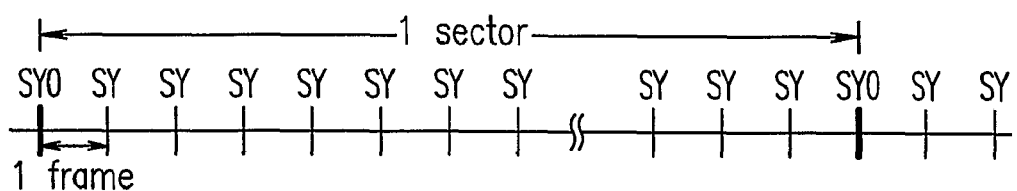
FIGS. 19A through 19C show examples in which synchronization code sequences to be recorded in second frame areas included in one sector are arranged in the order in which the synchronization code sequences are recorded on an optical disc medium.
Figure 19B:
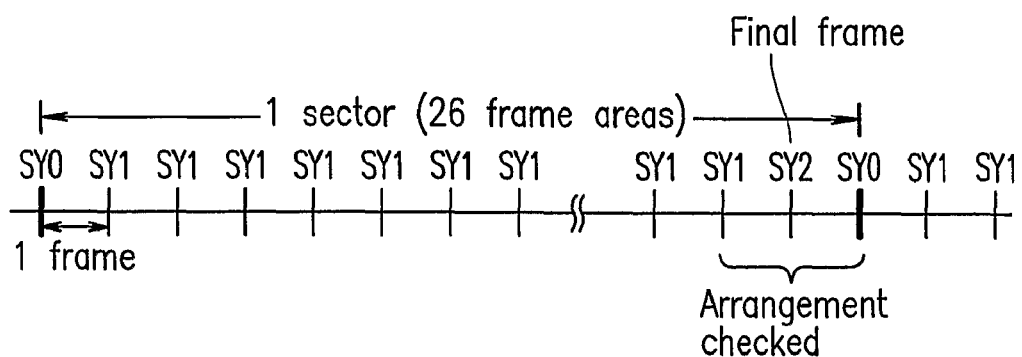
Figure 19C:
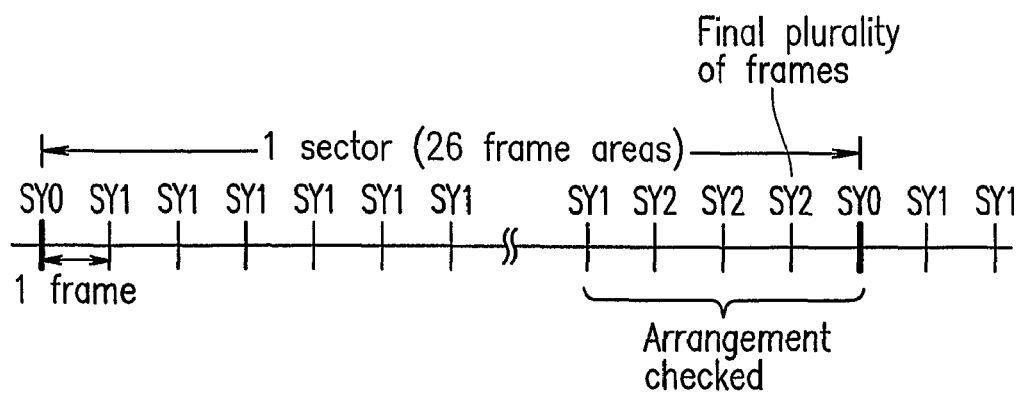

FIGS. 19A through 19C show other examples in which synchronization code sequences to be recorded in the second frame areas included in one sector are arranged in the order in which the synchronization code sequences are recorded on an optical disc medium. FIG. 19A is identical with FIG. 18A but is provided for the sake of reference. In FIG. 19B, only the synchronization code sequence (SY2 pattern) located in the final frame area is of a different type from that of the synchronization code sequences (SY1 pattern) located in the other frame areas. In this case, the reliability of detecting the start of the sector can be improved by detecting an arrangement of three continuous patterns {SY1·SY2·SY1} as compared to the case where only the SY0 pattern is detected. Alternatively, as shown in FIG. 19C, the different synchronization code sequence (SY2 pattern) can be located in the final plurality of frame areas of the sector instead of final one frame area of the sector.

Figure 20:
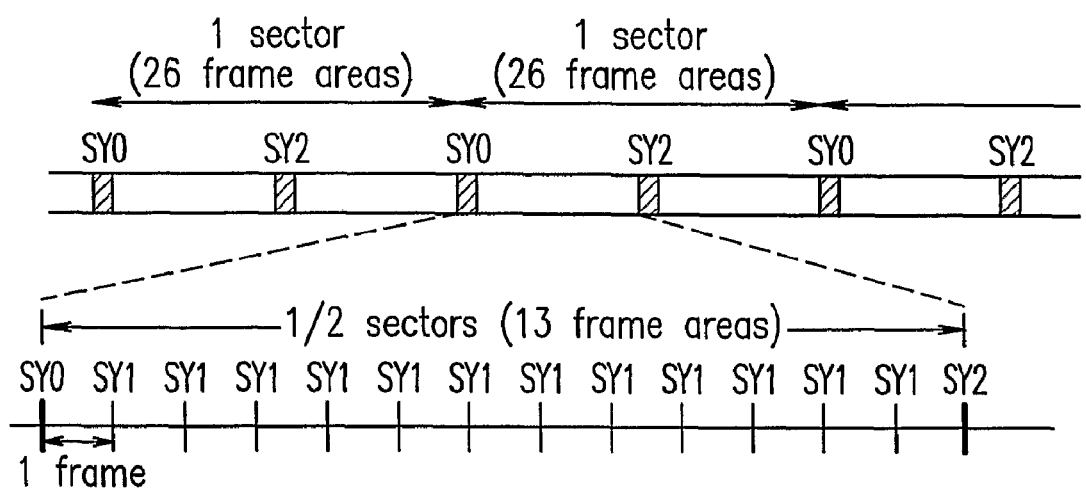
FIG. 20 shows still another example in which synchronization code sequences to be recorded in second frame areas included in one sector are arranged in the order in which the synchronization code sequences are recorded on an optical disc medium.

FIG. 20 shows still another example in which synchronization code sequences to be recorded in the second frame areas included in one sector are arranged in the order in which the synchronization code sequences are recorded on an optical disc medium. In the example shown in FIG. 20, the synchronization code sequence (SY2 pattern) located in a middle frame area of the sector is of a different type from that of the synchronization code sequences (SY1 pattern) located in the other frame areas. When, for example, the SY2 pattern is located in the 14th frame area of the sector, the pattern (SY2 pattern) of a different type from that of the other patterns (SY1 pattern) is recorded every ½ sector (13 frame areas). Thus, the start of the sector can be detected more quickly and a higher reliability. In the case where two types of patterns of SY0 and SY are used, the SY0 pattern needs to be detected for several continuous sectors in order to detect the start of the sectors with a higher reliability. In the case where the three types of patterns of SY0, SY1 and SY2 are arranged as shown in FIG. 20, the start of the sectors can be detected with a higher reliability only by detecting the arrangement of {SY0·SY2} every 13 frame areas.

As described above, by appropriately arranging three types of synchronization code sequences in a plurality of frame areas included in one sector, the reliability of detecting the start of the sector can be improved as compared to the case where two types of synchronization code sequences are used.

When three types of synchronization code sequences are used, a higher reliability is obtained by setting all the code distances to equal to or greater than 2 (or equal to or greater than 3). As long as the SY0 pattern is away from the other two types of patterns by a code distance equal to or greater than 2 (or 3), the effect of improving the reliability of detecting the start of the sector is obtained.

Hereinafter, examples of arrangement in the case where four types of synchronization code sequences are used will be described.

FIG. 21 shows still another example of synchronization code sequences located at the start of each of the 26 frame areas included in the sector 3103 (FIG. 9). In the example shown in FIG. 21, one sector includes 26 frame areas. Four types of synchronization code sequences SY0, SY1, SY2 and SY3 are located in the 26 frame areas. In the first frame area, the SY0 pattern is located. In the subsequent frame areas, {SY1·SY2·SY3·SY1·SY2·SY3 . . . SY1·SY2·SY3·SY1} are located sequentially from the second frame area. In this example, the SY2 pattern and the SY3 pattern are each located at a frequency of one in three continuous frame areas, except for the leading frame area.

Figure 22A:
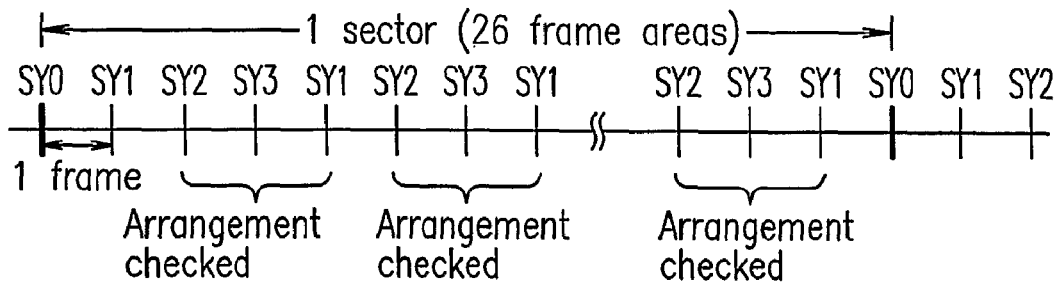
FIGS. 22A through 22C show examples in which synchronization code sequences to be recorded in second frame areas included in one sector are arranged in the order in which the synchronization code sequences are recorded on an optical disc medium, when four types of patterns SY0, SY1, SY2 and SY3 are used.
Figure 22B:
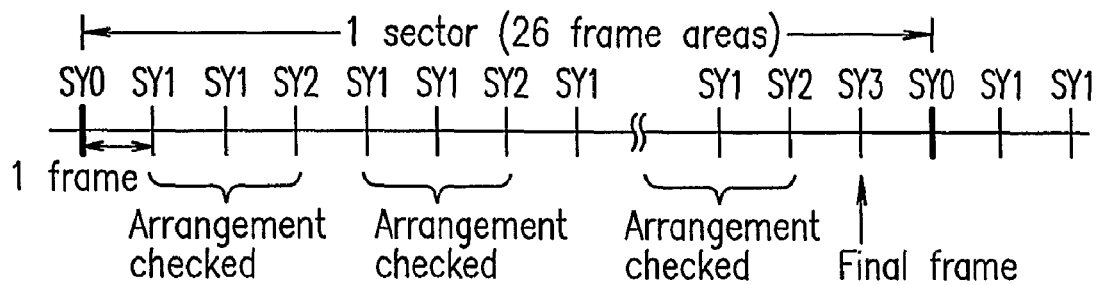
Figure 22C:
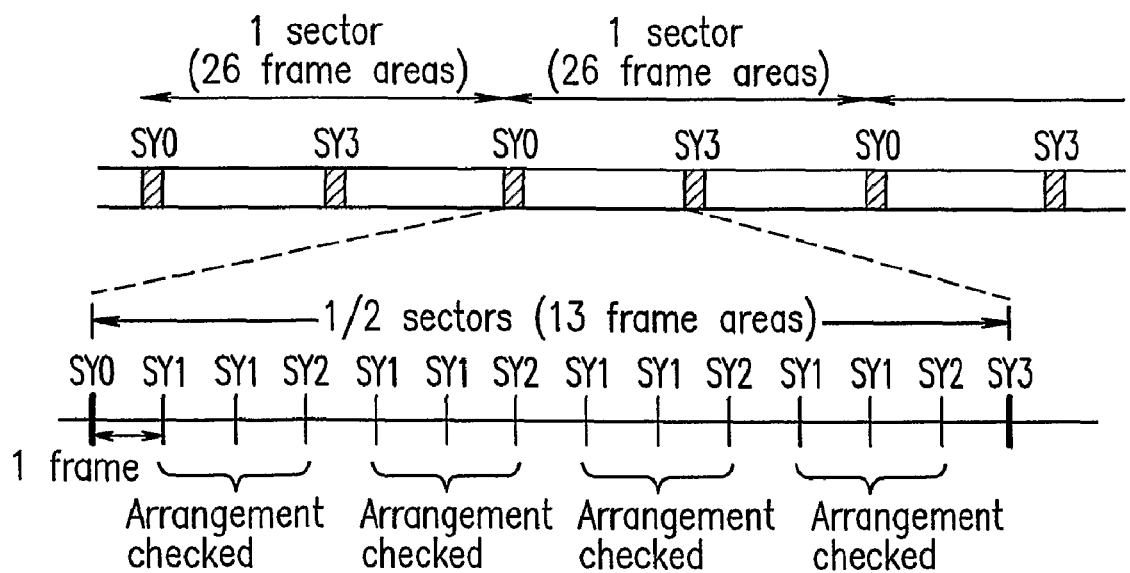

FIGS. 22A through 22C show examples in which synchronization code sequences to be recorded in the second frame areas included in one sector are arranged in the order in which the synchronization code sequences are recorded on an optical disc medium, when four types of patterns SY0, SY1, SY2 and SY3 are used. FIG. 22A corresponds to the arrangement of the synchronization code sequences described above with reference to FIG. 21. In the example shown in FIG. 22A, even when one frame slip occurs at a position in the sector, it can be detected whether a forward slip has occurred or a rearward slip has occurred by checking an arrangement of a minimum of three continuous frame areas, for example, {SY1·SY2·SY3}. Since the SY0 pattern is expected to be detected immediately after the arrangement of {SY1·SY2·SY1}, the start of the sector can be detected more reliably than in the case where only the SY0 pattern is detected.

Alternatively, as shown in FIG. 22B, in order to guarantee the detection of the SY0 pattern of the next sector, only the synchronization code sequence (SY3 pattern) in the final frame area of the sector can be of a different type from that of the synchronization code sequences located in the other frame areas. In this case, by, for example, detecting an arrangement of {SY2·SY3·SY0}, the reliability of detecting the start of the sector can be improved as compared to the case where only the SY0 pattern is detected. Regarding the other frame areas, even a frame slip at a position in the sector can be detected when repeating the arrangement of {SY1·SY1·SY2} as described above with reference to FIGS. 18B through 18D.

Still alternatively, as shown in FIG. 22C, only the synchronization code sequence (SY3 pattern) in a middle frame area of the sector can be of a different type from that of the synchronization code sequences located in the other frame areas. In the other frame areas, the arrangement of {SY1·SY1·SY2} can be repeated. In this case, the reliability of detecting the start of the sector can be improved by checking the arrangement including the SY3 pattern every ½ sector. In addition, the reliability of detecting a frame slip can be improved.

As described above, by appropriately arranging four types of synchronization code sequences in a plurality of frame areas included in one sector, the frame synchronization/sector synchronization performance can be improved in addition to the effect provided by using three types of synchronization code sequences.

When four types of synchronization code sequences are used, a higher reliability is obtained by setting all the code distances to equal to or greater than 2 (or equal to or greater than 3). As long as the SY0 pattern is away from the other three types of patterns by a code distance equal to or greater than 2 (or 3), the effect of improving the reliability of detection of the start of the sector is obtained.

As described above, in the optical disc medium 3101 according to the second example of the present invention, a first data unit (sector) includes a leading frame area (F0) and at least one frame area (F1 through F25) located subsequent to the leading frame area (F0). The leading frame area (F0) includes an area in which the SY0 pattern is to be recorded and a data area (DATA) in which user data is to be recorded. Each of the at least one frame area (F1 through F25) includes an area in which the SY pattern is to be recorded and a data area (DATA) in which user data is to be recorded. The SY0 pattern and the SY pattern are all identical in length and are set to have a code distance therebetween which is equal to or greater than 2.

More specifically, the SY pattern (second synchronization code sequence) located in the leading frame area F0, among the 26 (a prescribed number) frame areas (F0 through F25), is away from the second synchronization code sequence located in each of the other frame areas (F1 through F25) by a code distance equal to or greater than 2.

Due to such a structure, the SY0 pattern is easily detected during data reproduction, and thus the start of each first data unit (sector) can be detected quickly and with ease.

In the case where the code distance between the SY0 pattern and the SY pattern is equal to or greater than 3, the possibility of incorrectly detecting the SY0 pattern as the SY pattern or vice versa is further reduced as compared to the case where the code distance is 2. The SY0 pattern and the SY1 pattern can be distinguished from each other while still allowing for a 1 bit error. Accordingly, the stability of frame synchronization/sector synchronization and the reliability of detecting the start of the first data unit (sector) can be further improved. Thus, the reliability of the reproduction apparatus can be raised.

By locating at least two types of synchronization code sequences (SY1 and SY2, or SY1, SY2 and SY3) in the at least one frame area subsequent to the leading frame area, information on an arrangement of synchronization code sequences in continuous frame areas among the frame areas F1 through F25 can be obtained. Such information can be used to expect the occurrence of the SY0 pattern in the next first data unit (sector) or detect and correct a frame slip caused due to an unlocking of the PLL section.

It is preferable to set code distances between the SY0 pattern in the leading frame area of the first data unit (sector) and the other synchronization code sequences (SY1 and SY2, or SY1, SY2 and SY3) to equal to or greater than 2 (or 3). It is more preferable to set the code distances between all the different types of synchronization code sequences to equal to or greater than 2 (or 3). In this manner, the reliability of detecting the start of a sector, and the reliability of frame synchronization caused by a malfunction such as unlocking of the PLL section or the like, can be further improved.

A prescribed number of first data units (sectors) form a second data unit (data block). The first frame area 201 is located in every second data unit (data block). A PA pattern is located at the start of the first frame area 201. The SY0 pattern and the SY1 patterns are all identical in bit length and are located to be away from each other by a code distance equal to or greater than 2. Due to such a structure, the PA pattern can be easily detected during data reproduction, and the start of each second data unit (data block) can be detected quickly and with ease. The beginning position and the termination position of a series of information recording (linking) are set in the first frame area 201 (linking frame area). Therefore, the reliability of linking (additional recording) can be improved, and data reproduction of information which is recorded in and in the vicinity of a linking position can be performed stably and at a high speed.

In the second example, the first frame area (first area and third area) includes a first synchronization area PA and a second synchronization area VFO, but can include other synchronization code sequences or data bit streams. In the preferable examples described above, the synchronization pattern PA to be recorded in the first frame area, the synchronization pattern SY0 to be recorded in the second frame area which is positioned at the start of each sector, and the synchronization pattern SY to be recorded in the second frame areas other than the second frame area which is positioned at the start of each sector are set to have an equal length and also to have a code distance equal to or greater than 2 therebetween. The present invention is not limited to this.

Example 3

Figure 23:
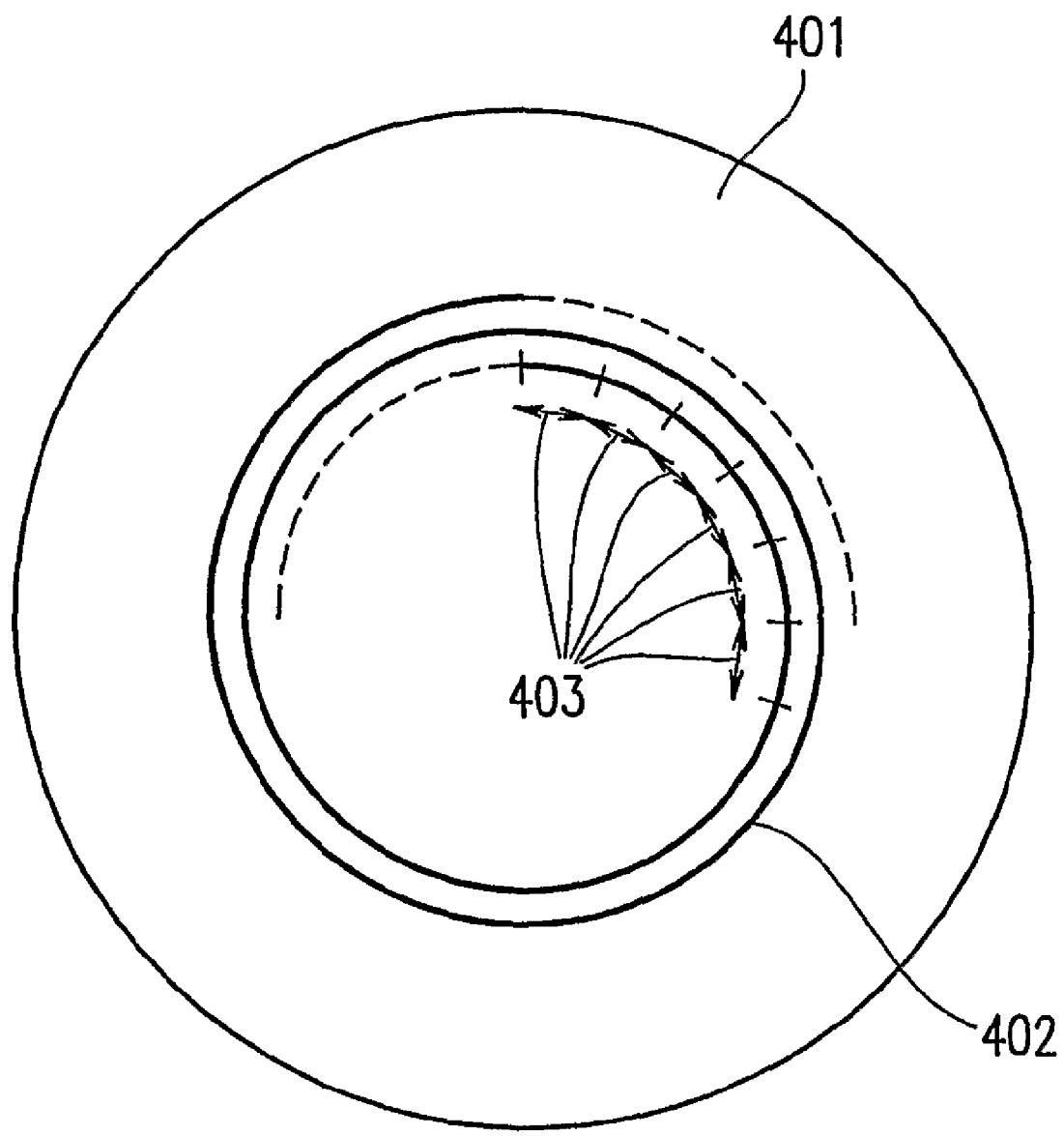
FIG. 23 shows a top view of a recordable optical disc medium 401 according to a third example of the present invention.

FIG. 23 shows a top view of a recordable optical disc medium 401 according to a third example of the present invention. On a recording surface of the optical disc medium 401, a recording track 402 is formed in a spiral manner. The recording track 402 is divided into data blocks 403. In other words, on the recording surface of the optical disc medium 401, the data blocks 403 are continuously arranged in a circumferential direction to form the information track 402.

Figure 24:
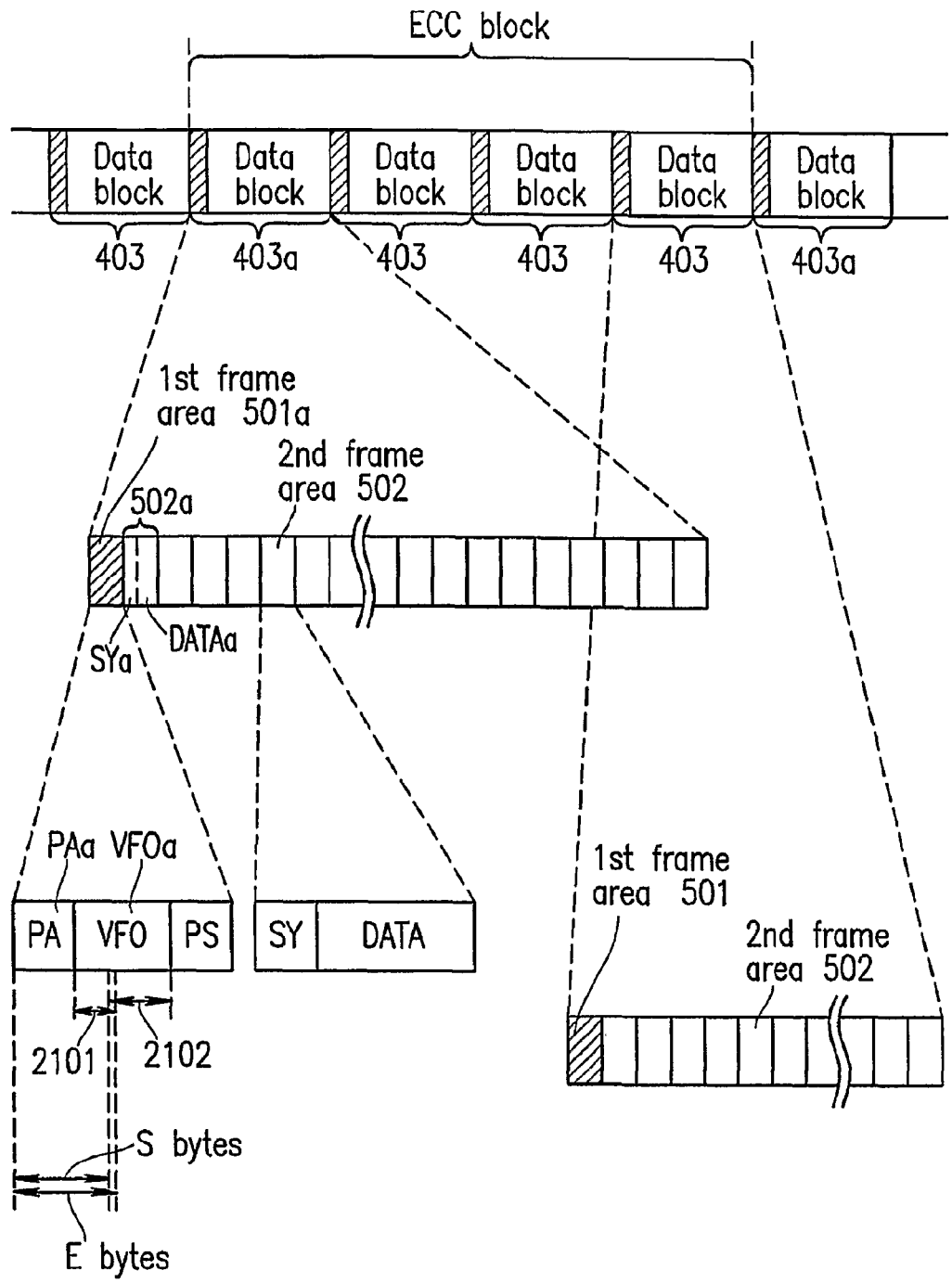
FIG. 24 shows a data format of the data blocks 403 of the optical disc medium 401 (FIG. 23) according to the third example of the present invention.

FIG. 24 shows a data format of the data blocks 403 of the optical disc medium 401 (FIG. 23) according to the third example of the present invention. As shown in FIG. 24, a first frame area 501 is located at the start of each data block 403, and a plurality of second frame areas 502 are located subsequent to the first frame area 501. The first frame area 501 and the plurality of second frame areas 502 form one data block 403. In FIG. 24, an area shown in the right is rearward to an area shown in the left.

The first frame area 501 includes a first synchronization area PA at the start thereof, a second synchronization area VFO subsequent thereto, and then a fourth synchronization area PS at the end thereof. Each of the second frame areas 502 includes a third synchronization area SY at the start thereof and a data area DATA subsequent thereto.

In the third example of the present invention, the first synchronization area PA, the second synchronization area VFO, the third synchronization area SY and the data area DATA have the same roles of those in the first example, and will not be described in detail. The third example is different from the first example in that the fourth synchronization area PS is provided at the end of the first frame area 501.

The fourth synchronization area PS has a role of assisting the reproduction apparatus to detect the start of the second frame area 502 without fail when reading each data block 403 (especially when reading a data block 403a corresponding to the start of the data additionally recorded). Data is recorded in the data block 403a as follows. In a first synchronization area PAa and a first portion of a second synchronization area VFOa in a first frame area 501a (the Eth byte counting from the start of the first synchronization area PAa), the data is recorded simultaneously with a data block 403 immediately preceding the data block 403a. Namely, the PA pattern and the record finish VFO portion 2101 are recorded in the first frame area 501a. The additional recording (linking) is performed in the data block 403a, from the position at which the previous recording is terminated (from the Sth (S≦E) byte counting from the start of the first synchronization area PAa). Namely, the record start VFO portion 2102 and the PS pattern are recorded in the first frame area 501a (third area). The third area includes an area in which the record start VFO portion 2102 is to be recorded and the fourth synchronization area PS in which the fifth synchronization code sequence (PS pattern) is to be recorded.

In FIG. 24, the second frame area immediately subsequent to the first frame area 501a is represented by reference numeral 502a. The second frame area 502a and the other second frame area 502 have a similar structure to that of the second frame area 202 described above with reference to FIG. 2. In the following description, the third synchronization area SY included in the second frame area 502a will be specifically represented by "SYa".

As described above in the Prior Art section, a reproduction apparatus involves various error factors such as rotation jitter of a disc motor for rotating an optical disc medium, a frequency of a recording channel clock and the like. Such error factors cause discontinuity at the beginning position of additional data recording, which is in the second synchronization area VFOa. Therefore, the length of the first frame area 501a changes by an error (discontinuity), as compared to the length of the first frame area 501 of each of the other data blocks 403. When this occurs, it is difficult to correctly detect the third synchronization area SYa located at the start of the second frame area 502a, even though level-slicing and locking of the clock frequency/phase by the PLL section are performed with certainty when the reproduction apparatus reads data using the second synchronization area VFO. When the third synchronization area SYa is not correctly detected, a data area DATAa subsequent to the third synchronization area SYa cannot be correctly modulated. As a result, a reading error occurs.

In the third example of the present invention, the fourth synchronization area PS is added in order to detect the start of the second frame area 501a with certainty. As long as the fourth synchronization area PS is detected, the data area DATAa can be correctly modulated even when the third synchronization area SYa is not correctly detected. Thus, a resistance to error can be increased.

In the third example of the present invention, mark length recording is performed using a run length limited code having parameters of d=2, k=10, m=8, n=16, and r=1 is used for modulation. Namely, the data bit stream to be recorded in the data area DATA includes recording marks or spaces having a Tmin of 3 bits and a Tmax of 11 bits.

Figure 25:
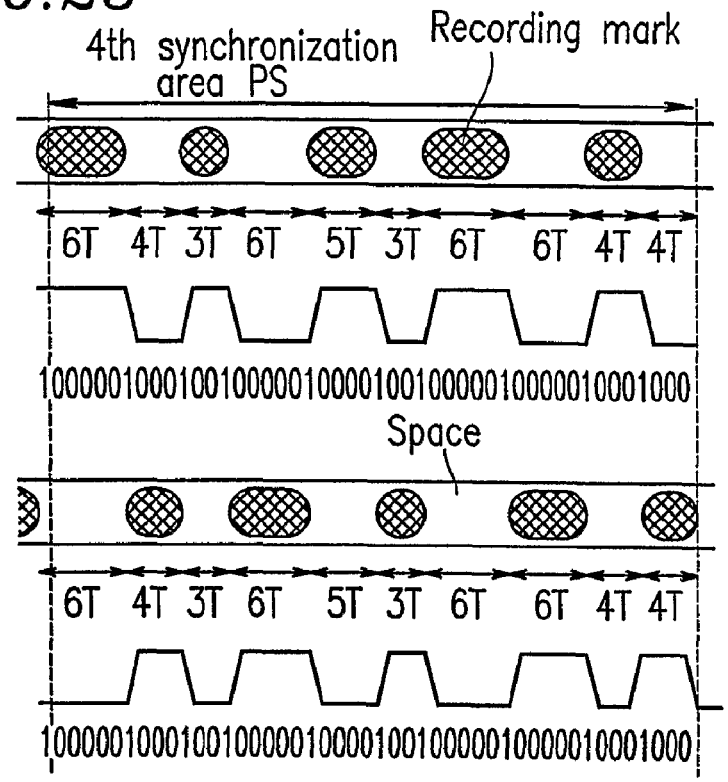
FIG. 25 shows an example of a pattern to be recorded in the fourth synchronization area PS (PS pattern), which is especially preferable in the third example of the present invention.

FIG. 25 shows an example of a pattern to be recorded in the fourth synchronization area PS (PS pattern), the example being especially preferable in the third example of the present invention. The pattern shown in FIG. 25 is, in the NRZ representation, {0000 0100 0100 1000 0010 0001 0010 0000 1000 0010 0001 0000}. The pattern has 48 channel bits in total. The pattern has the features of: (i) strong auto correlation; (ii) DSV=0; and (iii) a partial pattern obtained by dividing the pattern by 4 bits is one of the five types of 0000, 1000, 0100, 0010 or 0001. When a run length limited code having the parameters of d=2, k=10, m=8, n=16 and r=1 is used for modulation of the data area DATA, the pattern shown in FIG. 25 has a length of 3 bytes. This pattern is preferable when the immediately preceding second synchronization area VFO has repeated 4T recording marks/spaces. The pattern is described in detail in Japanese Patent No. 3098258.

Figure 26:
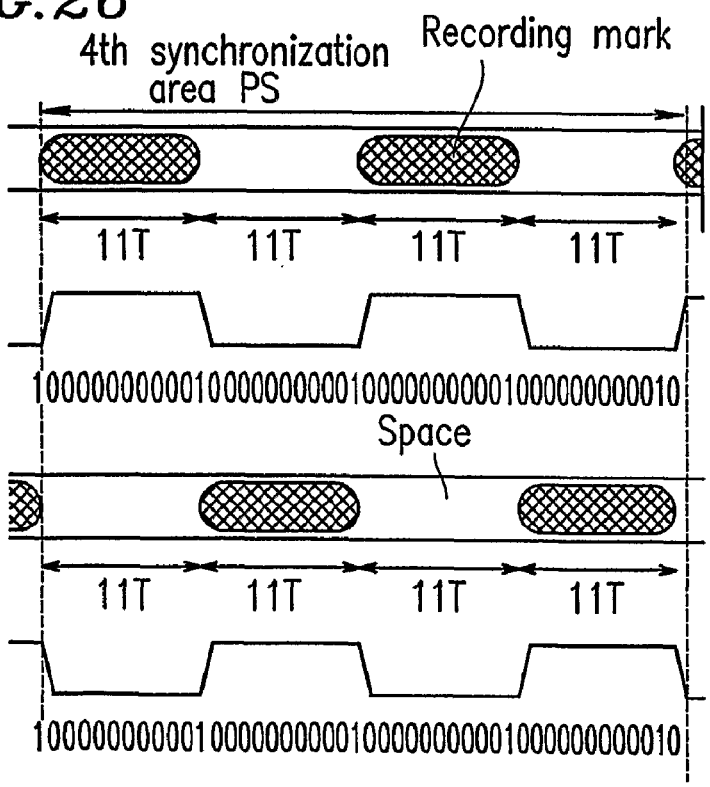
FIG. 26 shows another example of a pattern to be recorded in the fourth synchronization area PS (PS pattern), which is especially preferable in the third example of the present invention.

FIG. 26 shows another example of a pattern to be recorded in the fourth synchronization area PS (PS pattern), the example being especially preferable in the third example of the present invention. The pattern shown in FIG. 26 is, in the NRZ representation, {00000 00000 10000 00000 01000 00000 00100 00000 00010}. The pattern has 45 channel bits in total. The pattern has the features of (i) including 11T recording marks and 11T spaces alternately repeated twice; and (ii) having an absolute value of DSV of as small as 1. When a run length limited code having the parameters of d=2, k=10, m=8, n=15 and r=1 is used for modulation of the data area DATA, the pattern shown in FIG. 26 has a length of 3 bytes. This pattern is especially preferable when the post-modulation sequence does not include 11T recording marks or spaces repeated four times or more, since this pattern provides a sufficient code distance from all the types of patterns which can exist in the data area DATA and other areas and is highly resistant against incorrect detection.

Figure 27:
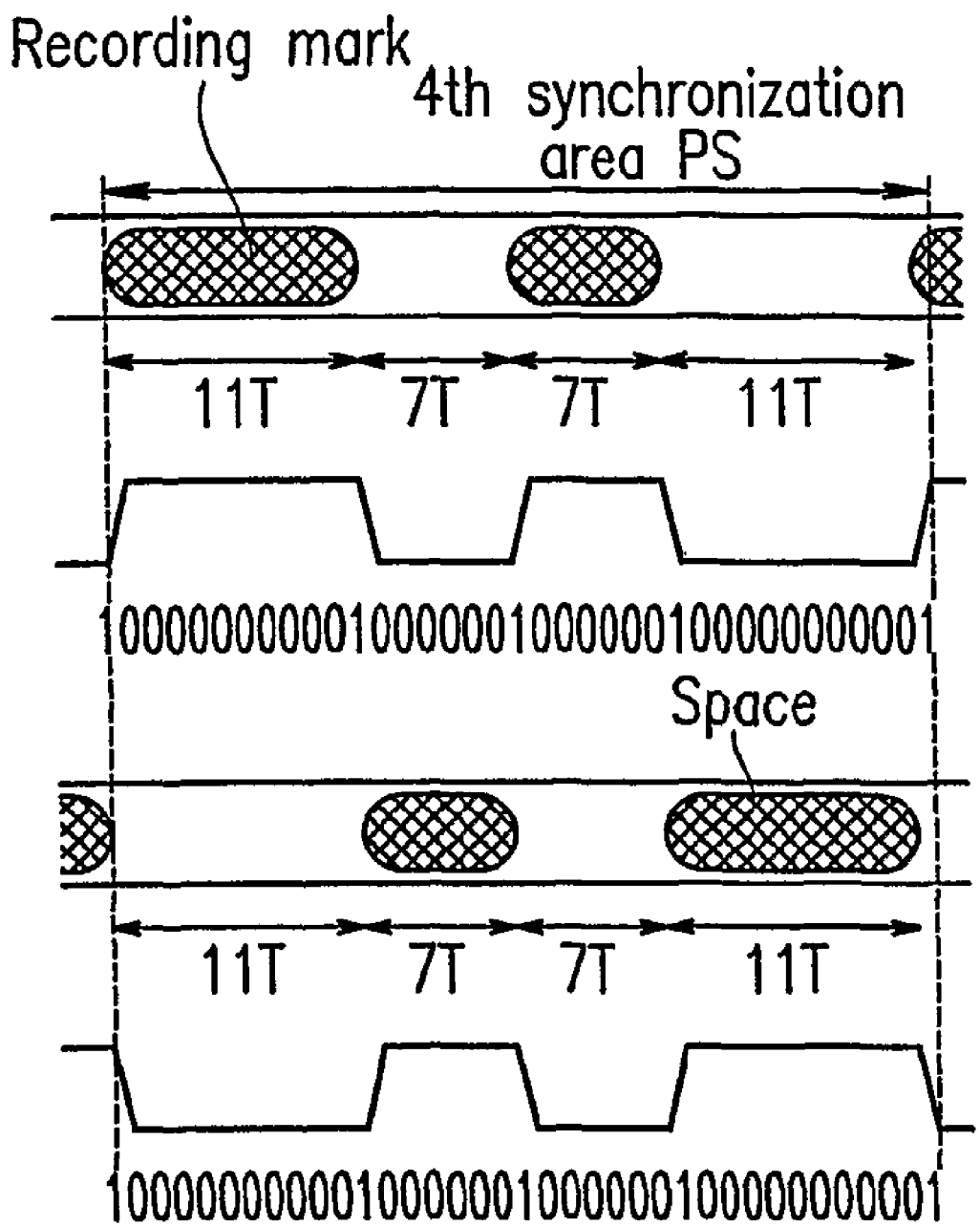
FIG. 27 shows still another example of a pattern to be recorded in the fourth synchronization area PS (PS pattern), which is especially preferable in the third example of the present invention.

FIG. 27 shows still another example of a pattern to be recorded in the fourth synchronization area PS (PS pattern), the example being especially preferable in the third example of the present invention. The pattern shown in FIG. 26 is, in the NRZ representation, {000 000 000 010 000 001 000 000 100 000 000 001}. The pattern has 36 bits in total. The pattern has the features of (i) including a pattern of 11T·7T·7T·11T and (ii) having a DSV of 0. When a run length limited code having the parameters of d=1, k=7, m=2, n=3 and r=1 is used for modulation of the data area DATA, the pattern shown in FIG. 27 has a length of 3 bytes. This pattern is especially preferable because this pattern, which includes two patterns of (Tmax+3)=11T (Tmax is the maximum inversion interval), provides a sufficient code distance between all the types of patterns which can exist in the data area DATA and other areas and thus is highly resistant against incorrect detection.

A method for recording data on the optical disc medium 401 having the above-described data format is similar to the method described in the first example, and will not be described in detail.

Figure 28:
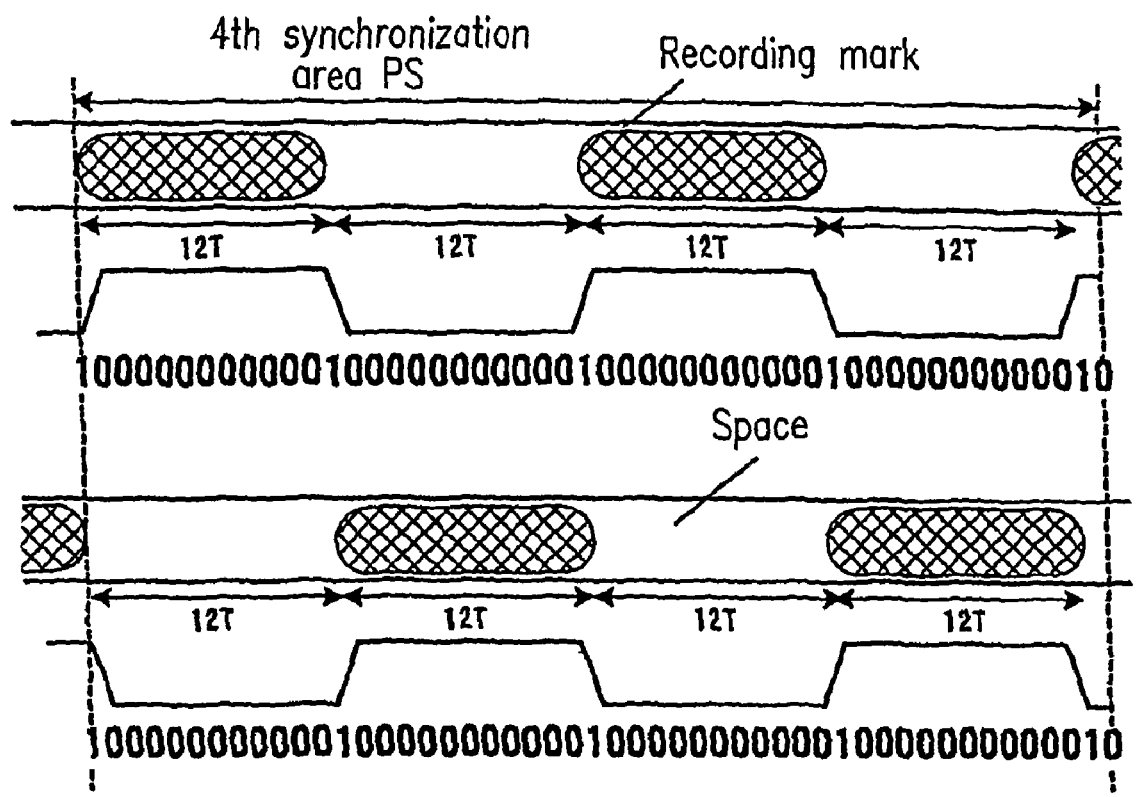
FIG. 28 shows still another example of a pattern to be recorded in the fourth synchronization area PS (PS pattern), which is especially preferable in the third example of the present invention.

FIG. 28 shows still another example of a pattern to be recorded in the fourth synchronization area PS (PS pattern), the example being especially preferable in the third example of the present invention. The pattern shown in FIG. 28 is, in the NRZ representation, "000000000001000000-00000100000000001000000000001". The pattern has 48 channel bits in total. The pattern has the features of (i) including 12T recording marks and 12T spaces alternately repeated twice; and (ii) having a CDS of 0. When an 8/16 modulation system is used for the data area DATA, 12T, which is (Tmax+1) bits, does not exist in any data bit stream in the data area DATA. When the pattern of 12T recording marks and 12T spaces is repeated 4 times, the code distance between such a pattern and the data bit stream obtained by the 8/16 modulation can be significantly extended. Therefore, the pattern shown in FIG. 28 is very highly resistant against incorrect detection.

In the case where the immediately preceding second synchronization area VFOa (FIG. 24) has a pattern of "0001000100010001 . . . " in which 4T recording marks and 4T spaces are repeated, the DSV value is maintained at 0 from the start of the second synchronization area VFOa to the termination position of the fourth synchronization area PS. Therefore, the slicing level for level-slicing of data performed by the reproduction apparatus can be stable. This is advantageous to reproducing the pattern recorded in the synchronization area SYa included in the immediately subsequent second frame area 502a.

When the 8/16 modulation system is used, the pattern shown in FIG. 28 has a length of 3 bytes. When a first frame area 501a (FIG. 24) has a length of 93 bytes and the third synchronization code sequence PA has a length of 2 bytes, the second synchronization area VFOa (FIG. 24) has a length of 88 bytes.

Figure 29:
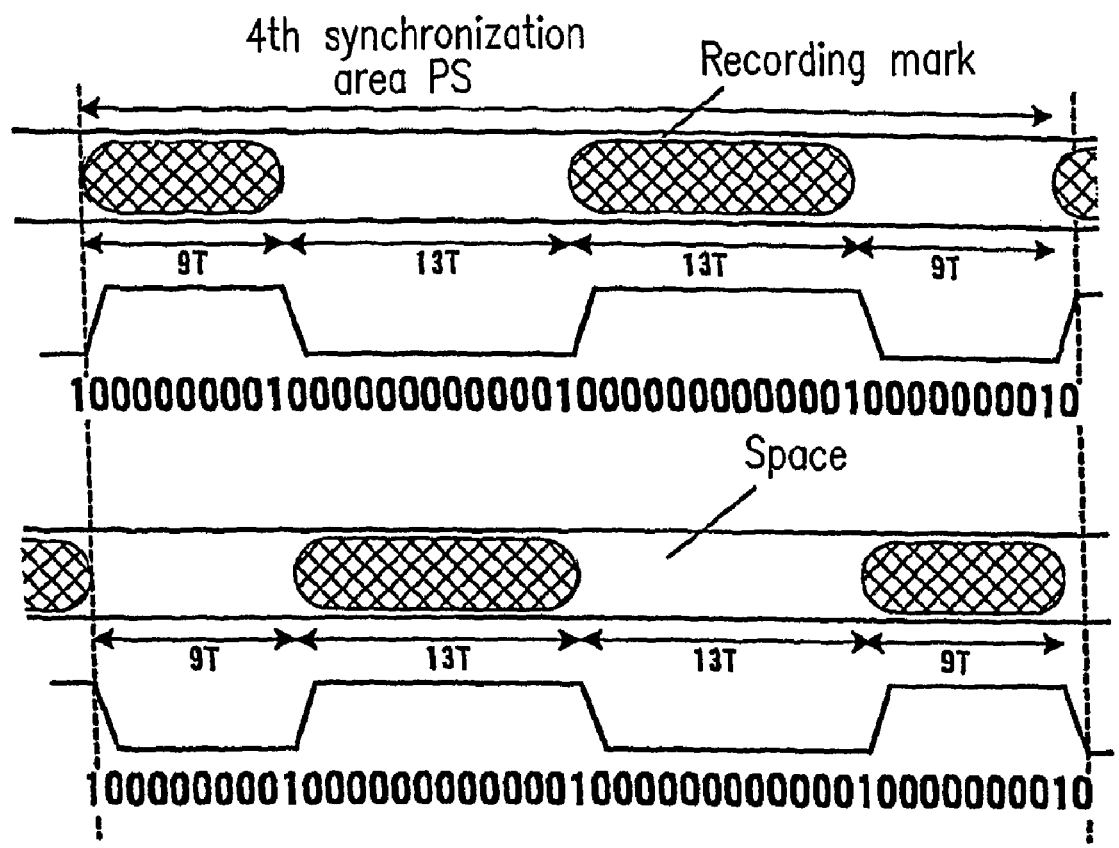
FIG. 29 shows still another example of a pattern to be recorded in the fourth synchronization area PS (PS pattern), which is especially preferable in the third example of the present invention.

FIG. 29 shows still another example of a pattern to be recorded in the fourth synchronization area PS (PS pattern), the example being especially preferable in the third example of the present invention. The pattern shown in FIG. 29 is, in the NRZ representation, "000000001000000000001000000000001000000010". The pattern has 45 channel bits in total. The pattern has the features of (i) including a pattern of 9T·13T·13T·9T and (ii) having an absolute value of DSV of as small as 1. When a run length limited code having the parameters of d=2, k=10, m=8, n=15 and r=1 is used for modulation of the data area DATA, the pattern shown in FIG. 29 has a length of 3 bytes.

This pattern includes a pattern having (Tmax+2) bits and a pattern having (Tmax−2) bits which are each repeated twice. Therefore, as in the case of the pattern shown in FIG. 28, the code distance between the pattern shown in FIG. 29 and the post-modulation data bit stream can be significantly extended. Furthermore, the pattern shown in FIG. 29 is a combination of long recording marks/long spaces, but has an average inversion interval, i.e., an edge required for phase comparison performed by the data PLL occurs every Tmax. This is equal to the maximum frequency at which the edge occurs, and thus there is no adverse influence by the edge not detected for a long period in the data PLL of the reproduction apparatus.

Since the long recording marks are ordered as (Tmax−2)·(Tmax+2)·(Tmax+2)·(Tmax−2), a partial pattern can be detected at a higher reliability. Instead of the entire pattern recorded in the fifth synchronization code sequence PS being detected by a method using complete matching, only the first half of the pattern, i.e., (Tmax−2)·(Tmax+2) can be detected, or only the second half of the pattern, i.e., (Tmax+2)·(Tmax−2) can be detected. The reason is that even the first half or the second half can maintain a sufficient code distance from all the types of patterns which can exist in the data area DATA and the other areas. Accordingly, the pattern shown in FIG. 29 is highly resistant against incorrect detection and is especially preferable.

Figure 30:
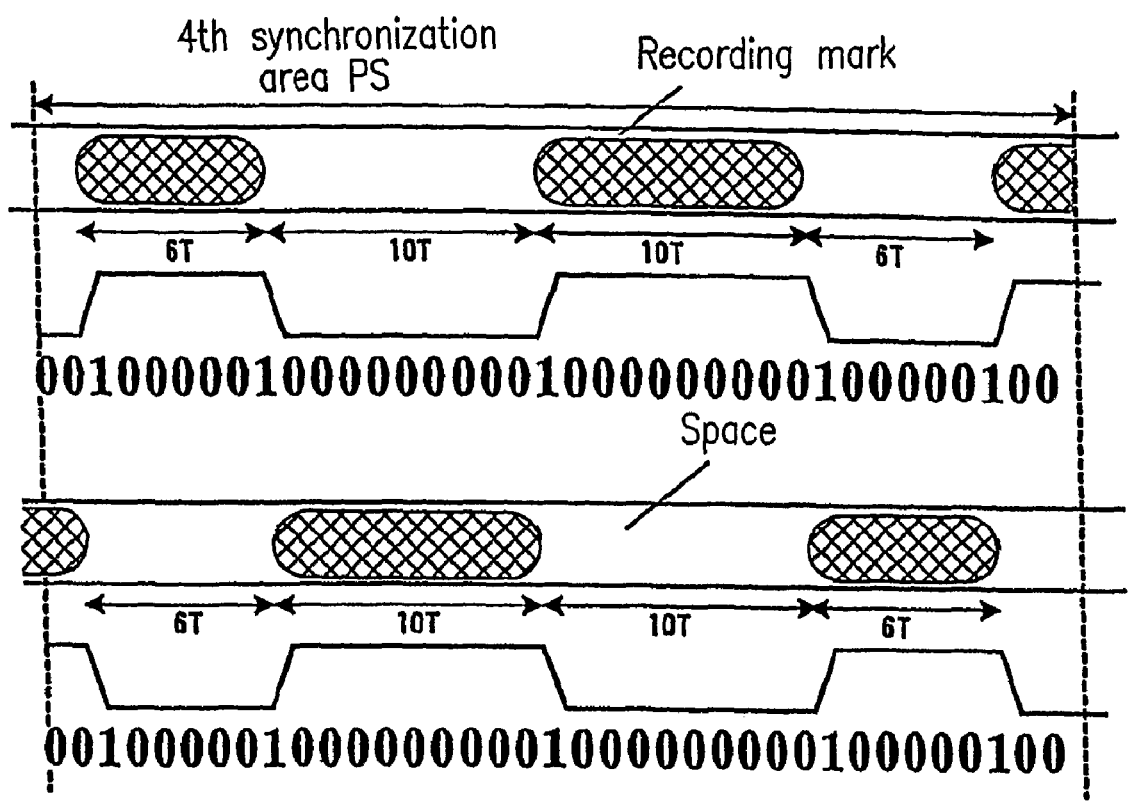
FIG. 30 shows still another example of a pattern to be recorded in the fourth synchronization area PS (PS pattern).

FIG. 30 shows still another example of a pattern to be recorded in the fourth synchronization area PS (PS pattern). The pattern shown in FIG. 30 is especially preferable when, for example, a run length limited code having parameters of d=1, k=7, m=2 and n=3 (so-called (1-7) modulation system) is used for modulation of the data area DATA.

The pattern shown in FIG. 30 is, in the NRZ representation, "001000001000000000100000000010000010". The pattern has 36 channel bits in total. The pattern has the features of (i) including a pattern of 6T·10T·10T·6T and (ii) having a CDS of 0. According to a known (1-7) modulation system of transforming 8-bit binary data into a 12 bit channel code word, the pattern shown in FIG. 30 has a length of 3 bytes.

Since the long recording marks are ordered as (Tmax−2)·(Tmax+2)·(Tmax+2)·(Tmax−2), a partial pattern can be detected at a higher reliability. Instead of the entire pattern recorded in the fifth synchronization code sequence PS being detected by a method using complete matching, only the first half of the pattern, i.e., (Tmax−2)·(Tmax+2) can be detected, or only the second half of the pattern, i.e., (Tmax+2)·(Tmax−2) can be detected. The reason is that even the first half or the second half can maintain a sufficient code distance from all the types of patterns which can exist in the data area DATA and the other areas. Accordingly, the pattern shown in FIG. 30 is highly resistant against incorrect detection and is especially preferable.

Figure 31:
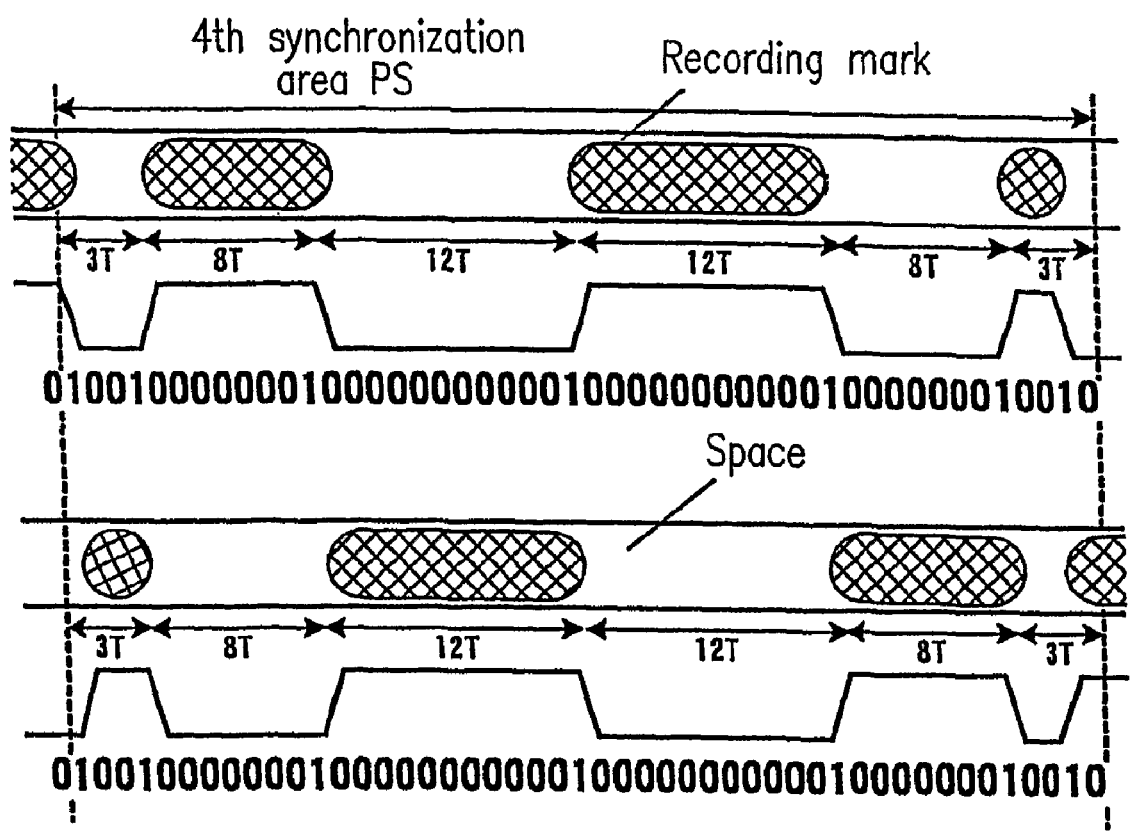
FIG. 31 shows still another example of a pattern to be recorded in the fourth synchronization area PS (PS pattern).

FIG. 31 shows still another example of a pattern to be recorded in the fourth synchronization area PS (PS pattern). The pattern shown in FIG. 31 is "010010000000100000000000100000000001000000010-010" in the NRZ representation. The pattern has 48 channel bits in total. The pattern has the feature of including a pattern of 8T·12T·12T·8T. The pattern is preferable when a run length limited code having parameters of d=1, k=9, n/m=1.5 is used for modulation of the data area DATA. Like the pattern shown in FIG. 30, this pattern includes (Tmax−2)·(Tmax+2)·(Tmax+2)·(Tmax−2) and thus is highly resistant against incorrect detection. As a result of performing NRZI recording of a 8T recording mark or space together with two 3T spaces or recording marks interposing the 8T recording mark or space, the total length of the recording mark portions is equal to the total length of the space portions (where the CDS=0). The pattern shown in FIG. 31 is symmetrical in a circumferential direction. Therefore, even when the asymmetry (in which the amplitude of the recording mark portions and the amplitude of the space portions are asymmetric to each other; a well known phenomenon of reproduction signal degradation which is caused when a power for recording data on the optical disc medium changes) occurs, the pattern shown in FIG. 31 can be stably detected.

Since the pattern shown in FIG. 31 starts with 3T, the continuity at the connection position is superior (easily fulfills the run length limitation) when the pattern in the second synchronization area VFO immediately preceding the fourth synchronization code sequence PS is (Tmin+1), i.e., a repetition of 3T.

As described above, the first frame area 501 corresponding to a linking frame area includes a first synchronization area PA, a second synchronization area VFO and a fourth synchronization area PS. Due to such a structure, even when the length of a frame area changes due to various fluctuation error factors of a driving apparatus, the data recorded in the second frame area 502 can be stably read. Thus, an optical disc medium having a high resistance to error can be realized with minimum possible overhead. Thus, the reliability of the reproduction apparatus can be maintained high.

In the example shown in FIG. 24, the data block 403a is not shown as including a sector. The data block 403a can have a sector as described above with reference to FIG. 9. The leading frame area of each sector and the other frame areas can have different synchronization code sequences (SY0 and SY) recorded therein, also as described above with reference to FIG. 9. In this case, the start of the sector or the data block can be more easily detected, thus significantly improving the reliability of information recording reproduction.

As described above, in the third example of the present invention, the information track 402 of the optical disc medium 401 is divided into data blocks 403 (403a), each of which is a unit of recording and reproduction. Each data block 403 (403a) includes a first frame area 501 (501a) located at the start thereof and at least one second frame area 502 located subsequent to the first frame area 501 (501a). Each first frame area 501 (501a) includes a first synchronization area PA, a second synchronization area VFO and a fourth synchronization area PS. Each second frame area 502 includes a third synchronization area SY and a data area DATA in which user data is to be recorded. The beginning/termination of data recording (linking) is performed in the second synchronization area VFO of the first frame area 501a (linking frame area). Therefore, even when the data is recorded in a discontinuous manner, that discontinuity is absorbed in the second synchronization area VFO. In the third example of the present invention, a fourth synchronization area PS is located after the second synchronization area VFO of the first frame area 501 (501a). In the fourth synchronization area PS, a PS pattern (fifth synchronization code sequence) for identifying the end of the VFO pattern is recorded. Identification of the end of the VFO pattern is equivalent to the Identification of the end of the first synchronization code sequence (the portion 2102 in FIG. 1) described in the first example. Since the synchronization information before and after the linking (data in the first synchronization area PA and the fourth synchronization area PS) is reinforced in this manner, data can always be reproduced stably. The PS pattern is used for specifying the start of the entirety of the at least one second frame area (first area) in which the at least one second frame (collectively referred to as first area data) is recorded (i.e., for specifying the start of the recorded first area data). The first area is located rearward to the fourth synchronization area PS.

In the third example, the first frame area (first area and third area) includes a first synchronization area PA, a second synchronization area VFO and a fourth synchronization area PS, but can include other synchronization code sequences or data bit streams.

Example 4

Figure 32:
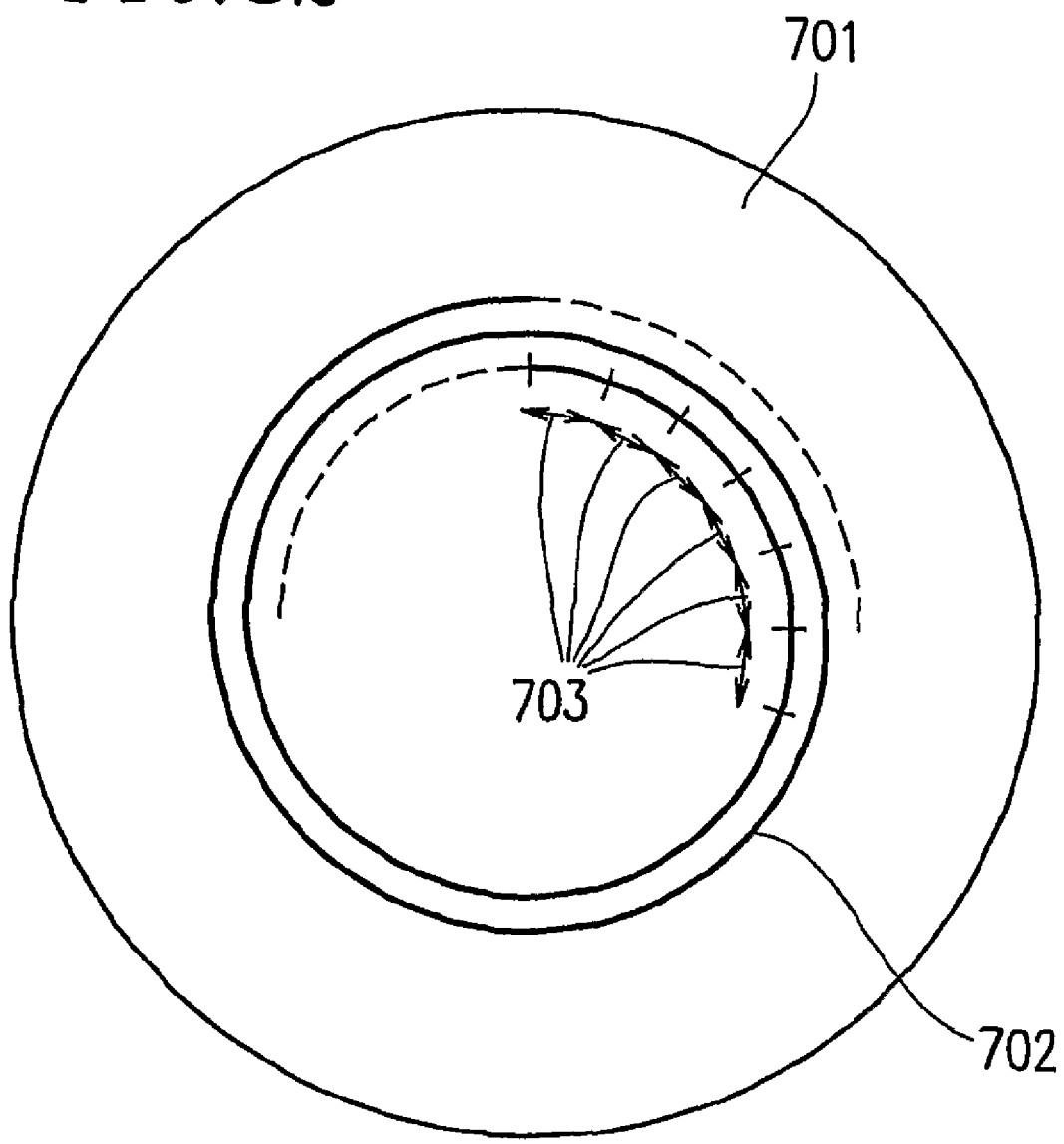
FIG. 32 shows a top view of a recordable optical disc medium 701 according to a fourth example of the present invention.

FIG. 32 shows a top view of a recordable optical disc medium 701 according to a fourth example of the present invention. On a recording surface of the optical disc medium 701, a recording track 702 is formed in a spiral manner. The recording track 702 is divided into data blocks 703. In other words, on the recording surface of the optical disc medium 701, the data blocks 703 are continuously arranged in a circumferential direction to form the information track 702.

Figure 33:
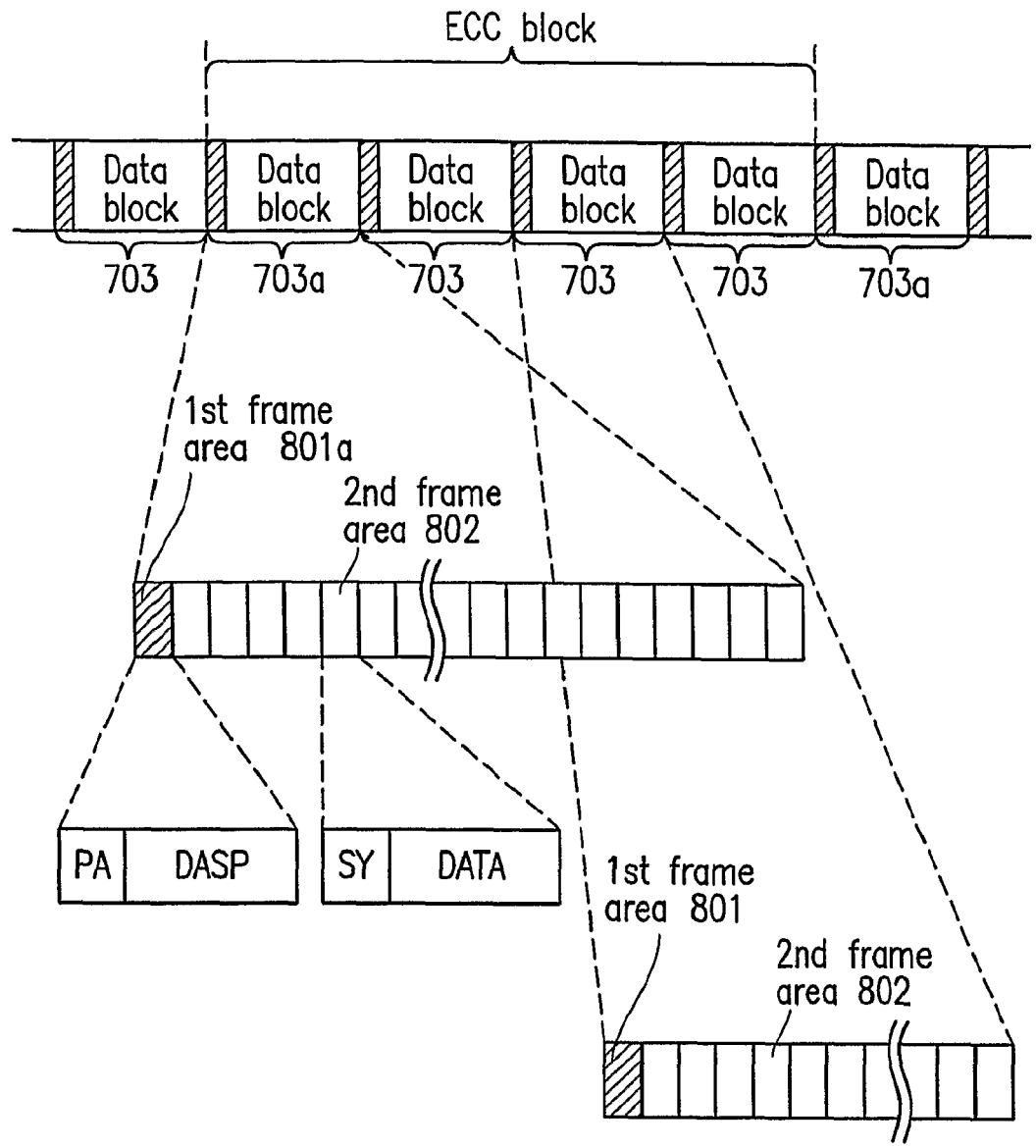
FIG. 33 shows a data format of data blocks 703 of the optical disc medium 701 according to the fourth example of the present invention.

FIG. 33 shows a data format of the data blocks 703 of the optical disc medium 701 according to the fourth example of the present invention. As shown in FIG. 33, a first frame area 801 is located at the start of each data block 703, and a plurality of second frame areas 802 are located subsequent to the first frame area 801. The first frame area 801 and the plurality of second frame areas 802 form one data block 703. In FIG. 33, an area shown in the right is rearward to an area shown in the left.

The first frame area 801 includes a first synchronization area PA at the start thereof, and a specific purpose data area DASP subsequent thereto. Each second frame areas 802 includes a third synchronization area SY at the start thereof and a data area DATA subsequent thereto.

In the fourth example of the present invention, the first synchronization area PA, the third synchronization area SY, and the data area DATA have the same roles of those in the first example, and will not be described in detail. The fourth example is different from the first example in that the specific purpose data area DASP is provided in the first frame area 801a which is located at the start of the ECC block (the first frame area included in a leading data block 703a of the ECC block), instead of located in the second synchronization area VFO in the first frame area 201. The first frame area 801 of each of the data blocks other than the leading data block of the ECC block can have a similar structure to that of the first frame area 801a.

In the fourth example of the present invention, as shown in FIG. 33, an ECC block 804 forming an error correction code includes four continuous data blocks 703. An error correction code accounts only for the data areas DATA included in the four continuous data blocks 703, and does not account for the specific purpose data area DASP.

In the specific purpose data area DASP, a data bit stream including specific purpose data having a different use from that of the user data included in the data area DATA is recorded. The data recorded in the specific purpose data area DASP can be treated as being independent from the data recorded in the data area DATA. Therefore, reading of the data recorded in the specific purpose data area DASP does not require the data recorded in the data area DATA in the same data block 703 to be read or error-corrected, etc.

At least one specific purpose data area DASP is provided in each data block. A plurality of specific purpose data areas DASP are provided in each ECC block. Therefore, in the specific purpose data area DASP, data representing information corresponding to the respective data block or ECC block (specific purpose data) can be recorded.

The specific purpose data area DASP can have, for example, the following uses.

(Use 1) Data attribute of user data recorded in the data area DATA of the respective data block.

(Use 2) Information regarding a method for recording data or recording characteristics of the respective data block.

Use 1 is for recording the attribute of the recorded user data on a data block-by-data block basis. The attribute is obtained independently from the user data included in the data area DATA of the respective data block. Accordingly, the attribute is obtained without reading the user data. Therefore, when information on copyright protection, for example, is included as the attribute, control can be performed for copyright protection using each data block as a minimum unit.

Use 2 is for recording information regarding a method for recording data or recording characteristics of the respective data block on a data block-by-data block basis. Such information is obtained independently from the user data included in the data area DATA of the respective data block. Accordingly, the information is obtained without reading the user data. Therefore, the information on a method for recording data or recording characteristics of the respective data block can be used when recording data in the respective data block or the other data block.

One ECC block includes a plurality of data blocks. Data is overwritten on a ECC block-by-ECC block basis. The first frame area 801a corresponding to the start of each ECC block is used as a linking frame area. Due to such a structure, a plurality of specific purpose data areas DASP can be located in one ECC block. It is effective to record identical specific purpose data in all the specific purpose data areas DASP included in one ECC block. In this manner, even when specific purpose data recorded in one specific purpose data area DASP of the first frame area 801a cannot be read because of overwriting and is lost, the same specific purpose data recorded in another specific purpose data area DATA can be read. Thus, the specific purpose data can be reproduced safely.

Figure 34A:
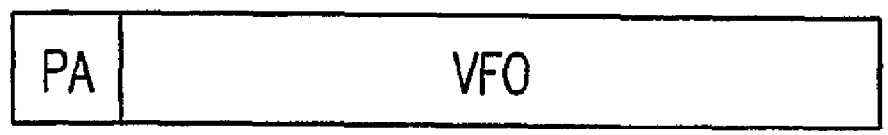
FIGS. 34A and 34B show other examples of the structure of a first frame area 801a in the fourth example of the present invention.
Figure 34B:

FIGS. 34A and 34B show other examples of the structure of the first frame area 801a in the fourth example of the present invention.

In the example shown in FIG. 34A, the first frame area 801a includes a first synchronization area PA and a second synchronization area VFO. In the example shown in FIG. 34B, the first frame area 801a includes a first synchronization area PA, a second synchronization area VFO, and a third synchronization area PS.

In these examples, the second synchronization area VFO is provided only in the leading frame area (corresponding to the linking frame area) at the start of each ECC block. Thus, the synchronization pattern required for stabilizing the reproduction of data recorded on the optical disc medium 701 is reinforced (i.e., a pattern for guaranteeing the synchronization at the time of reproduction is recorded). The specific purpose data area DASP is located in the first frame area 801 at the start of each of the data blocks other than the data block at the start of each ECC block. Accordingly, data can be read stably even at the beginning/termination position of data recording. Moreover, specific purpose data can be recorded or reproduced independently from the user data in each ECC block.

In the examples shown in FIGS. 34A and 34B, the frame area at the start of each ECC block includes a second synchronization area VFO so as to reinforce the synchronization pattern. The present invention is not limited to this. When data is recorded in a plurality of ECC blocks in a series of data recording, the leading frame area of each of the second and subsequent ECC blocks can have a specific purpose data area DASP, not the frame area having a synchronization pattern reinforced.

In the fourth example, the case where the first frame area (first area and third area) includes a first synchronization area PA, a second synchronization area VFO and a fourth synchronization area PS, and the case where the first frame area (first area and third area) includes a first synchronization area PA and a specific purpose data area DASP are described. The present invention is not limited to this. For example, the first frame area can include the fourth synchronization area PS when including the specific purpose data area DASP, or other synchronization code sequences or data bit streams.

Example 5

Figure 35:
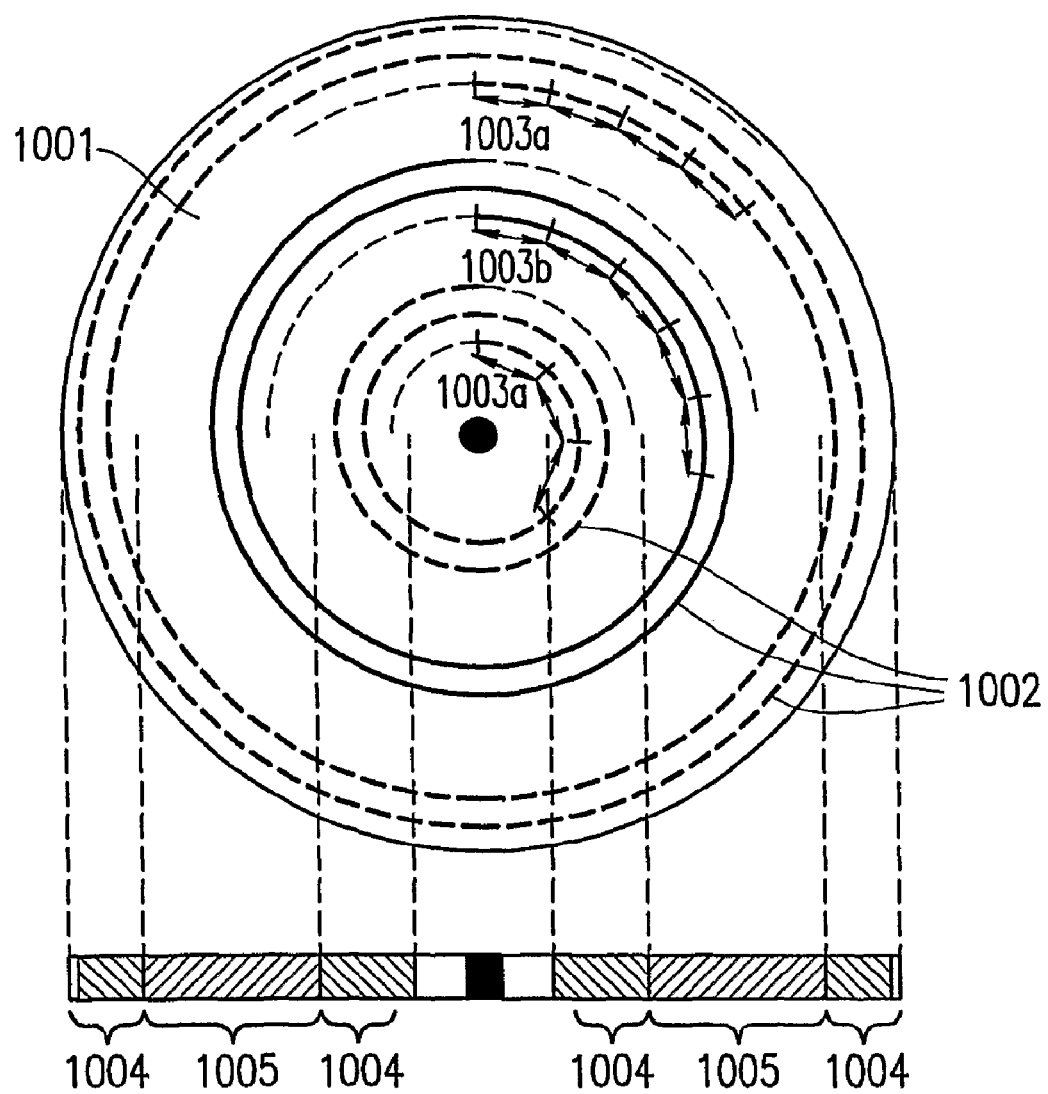
FIG. 35 shows a top view of a recordable optical disc medium 1001 according to a fifth example of the present invention.

FIG. 35 shows a top view of a recordable optical disc medium 1001 according to a fifth example of the present invention. On a recording surface of the optical disc medium 1001, a recording track 1002 is formed in a spiral manner. The recording track 1002 is divided into data blocks 1003a and 1003b. The information track 1002 is divided into an inner portion, an intermediately portion and an outer portion. The inner portion and the outer portion are each a reproduction-only area 1004 used exclusively for reproduction. The intermediate portion is a rewritable area 1005. Each data block 1003a included in the reproduction-only area 1004 has pits already recorded therein. The pits are formed using, for example, convex and concave portions of the recording surface. In each data block 1003b included in the rewritable area 1005, data is to be recorded by a recording apparatus.

Figure 36:
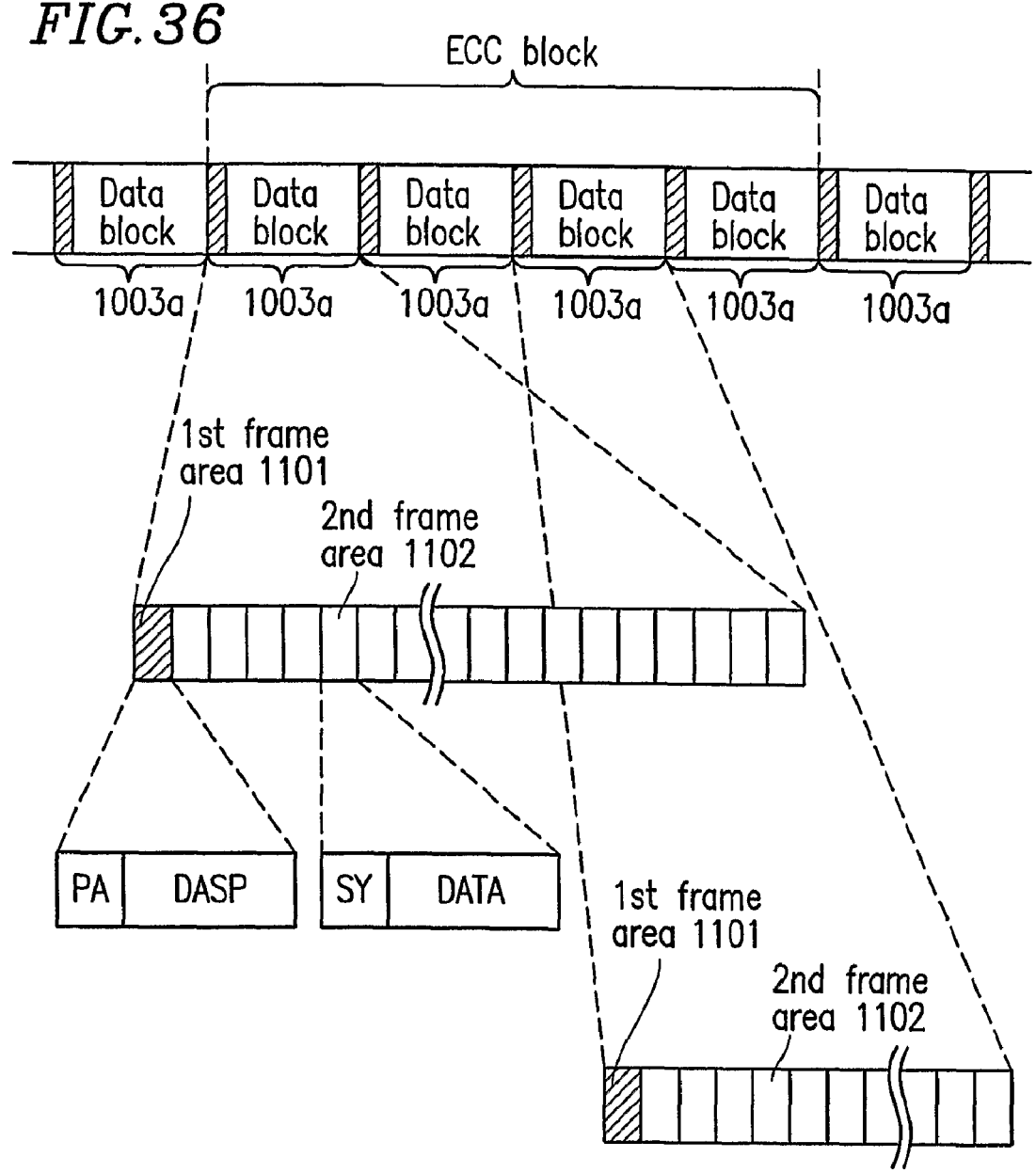
FIG. 36 shows a data format of data blocks 1003a included in a reproduction-only area 1004 of the optical disc medium 1001 in the fifth example of the present invention.

FIG. 36 shows a data format of the data blocks 1003a included in the reproduction-only area 1004 of the optical disc medium 1001 in the fifth example of the present invention. As shown in FIG. 36, each data block 1003a includes a first frame area 1101 at the start thereof and a plurality of second frame areas 1102 located subsequent to the first frame area 1101. The first frame area 1101 and the plurality of second frame areas 1102 form one data block 1003a. In FIG. 36, an area shown in the right is rearward to an area shown in the left.

The first frame area 1101 includes a first synchronization area PA at the start thereof, and a specific purpose data area DASP subsequent thereto. Each of the second frame areas 1102 includes a third synchronization area SY at the start thereof and a data area DATA subsequent thereto. The first synchronization area PA, the third synchronization area SY and a data area DATA have the same roles of those in the first example, and will not be described in detail. The specific purpose data area DASP has the same roles as those in the fourth example and will not be described in detail.

Figure 37:
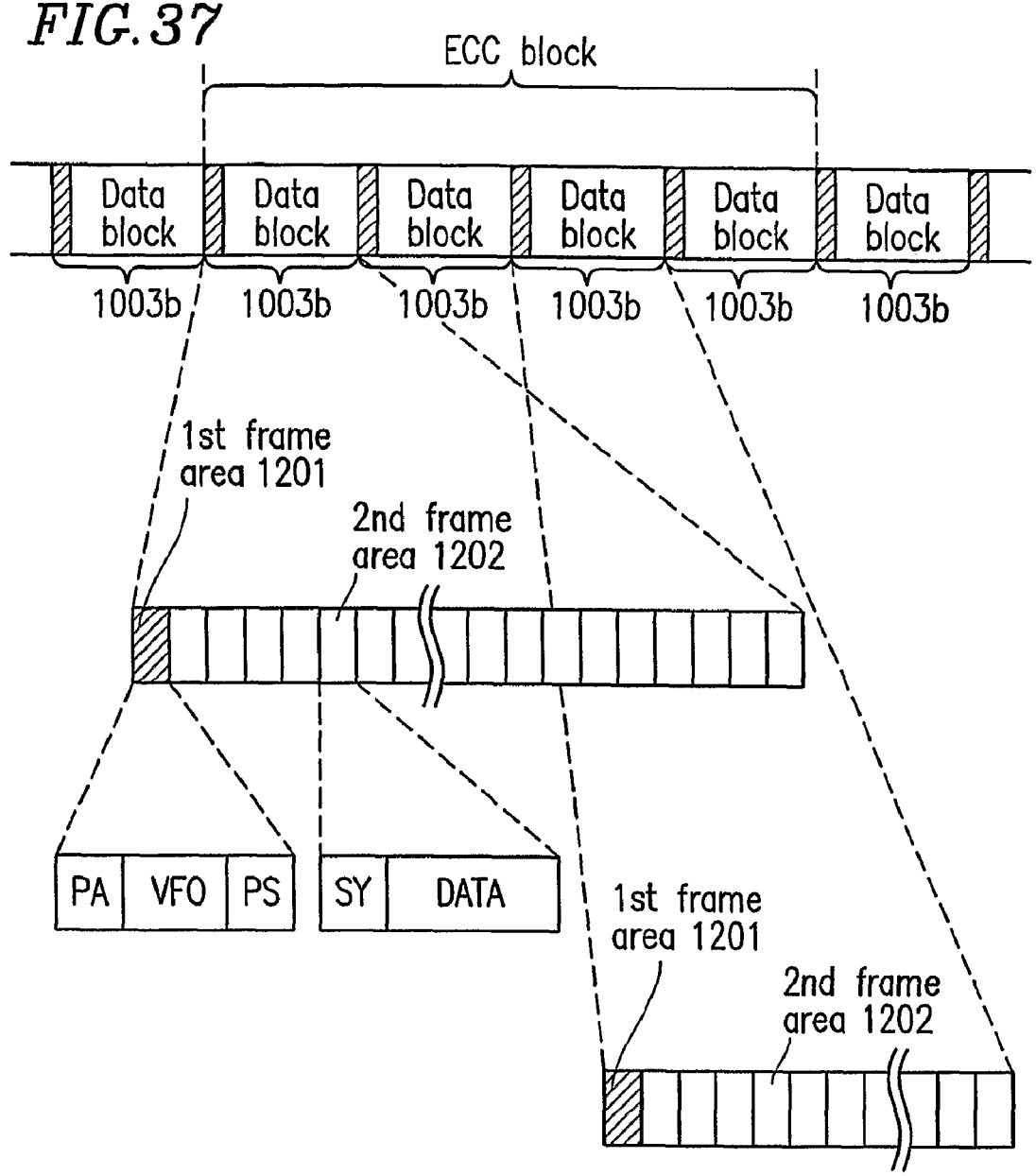
FIG. 37 shows a data format of data blocks 1003b included in a rewritable area 1005 of the optical disc medium 1001 in the fifth example of the present invention.

FIG. 37 shows a data format of the data blocks 1003b included in the rewritable area 1005 of the optical disc medium 1001 in the fifth example of the present invention. As shown in FIG. 37, each data block 1003b has the same structure as that of the data block 1003a. Each data block 1003b includes a first frame area 1201 at the start thereof and a plurality of second frame areas 1202 located subsequent to the first frame area 1201. The first frame area 1201 and the plurality of second frame areas 1202 form one data block 1003b. In FIG. 37, an area shown in the right is rearward to an area shown in the left.

The first frame area 1201 includes a first synchronization area PA at the start thereof, a second synchronization area VFO subsequent thereto, and a fourth synchronization area PS. The second frame area 1202 includes a third synchronization area SY at the start thereof and a data area DATA located subsequent to the third synchronization area SY.

The first synchronization area PA, the second synchronization area VFO, the data area DATA and the third synchronization area SY have the same roles as those of the first example and will not be described in detail. The fourth synchronization area PS has the same roles as those of the second example and will not be described in detail. The fourth synchronization area PS may be optionally provided.

As shown in FIGS. 36 and 37, both the reproduction-only area 1004 and the rewritable area 1005 are both divided into data blocks and have similar frame structures to each other. Therefore, reproduction steps at least after a reproduction RF is obtained (level slicing of data, PLL, demodulation and the like) can be performed in almost the same manner in the reproduction-only area 1004 and the rewritable area 1005 although the two areas have data recorded in different physical shapes (i.e., recorded by the convex and concave portions of the recording surface, or recorded by the phase change of the recording layer). Accordingly, the reproduction apparatus need not include two different types of reproduction circuits, i.e., a reproduction circuit for the reproduction areas and a reproduction circuit for the rewritable areas. Thus, the structure of the reproduction circuit can be simplified, thus reducing the cost of the reproduction apparatus.

The data block 1003a included in the reproduction-only area 1004 and the data block 1003b included in the rewritable area 1005 are different from each other in the internal structure of the first frame areas 1101 and 1201 at the start thereof.

The first frame area 1201 of a leading data block of each ECC block included in the rewritable area 1005 corresponds to a linking frame area including the beginning/termination position of additional data recording. As described in detail in the first example, when data is recorded in a discontinuous manner at the beginning/termination position (linking frame area) of additional data recording, the subsequent data blocks need to be correctly reproduced. For this purpose, the first frame area 1201 includes the first synchronization area PA, the second synchronization area VFO and the fourth synchronization area PS so as to reinforce the synchronization information. In addition, data recording can be begun and terminated in the second synchronization area VFO in which no user data is to be recorded.

The first frame area 1101 in the reproduction-only area 1004 corresponds to an overhead area in which no user data is to be recorded. In this area, data discontinuity does not occur since data is not rewritten. Therefore, in this area, data representing information corresponding to the respective data block (specific purpose data), which can be reproduced independently from the user data, can be recorded. For this purpose, the specific purpose data area DASP is provided after the first synchronization area PA, so that information which is reproduceable independently from the user data can be recorded.

In the example shown in FIG. 35, the optical disc medium 1001 includes the reproduction-only area 1004 and the rewritable area 1005. The optical disc medium 1001 can have only the reproduction-only area 1004.

As described above, in the optical disc medium 1001 in the fifth example of the present invention, the data blocks included in the reproduction-only area 1004 and the data blocks included in the rewritable area 1005 have the same frame structure. This contributes to a reduction in the scale of the reproduction circuit of a driving apparatus.

In the optical disc medium 1001 in the fifth example of the present invention, the first frame area 1101 in each data block in the reproduction-only area 1004, or the first frame area 1201 in a data block in the rewritable area 1005 which is not a linking area, can include a specific purpose data area DASP instead of an area for reinforcing synchronization. Thus, information which can be treated independently from user data can be recorded or reproduced as specific purpose data. For example, information on copyright protection, information which is inherent to each driving apparatus, or information for future application can be recorded or reproduced. This significantly contributes to an expansion in the usage of optical disc media and recording and reproduction apparatuses.

In the fifth example, the case where the first frame area (first area and third area) includes a first synchronization area PA, a second synchronization area VFO and a fourth synchronization area PS, and the case where the first frame area (first area and third area) includes a first synchronization area PA and a specific purpose data area DASP are described. The present invention is not limited to this. For example, the first frame area can include the fourth synchronization area PS when including the specific purpose data area DASP, or other synchronization code sequences or data bit streams.

Example 6

Figure 38:
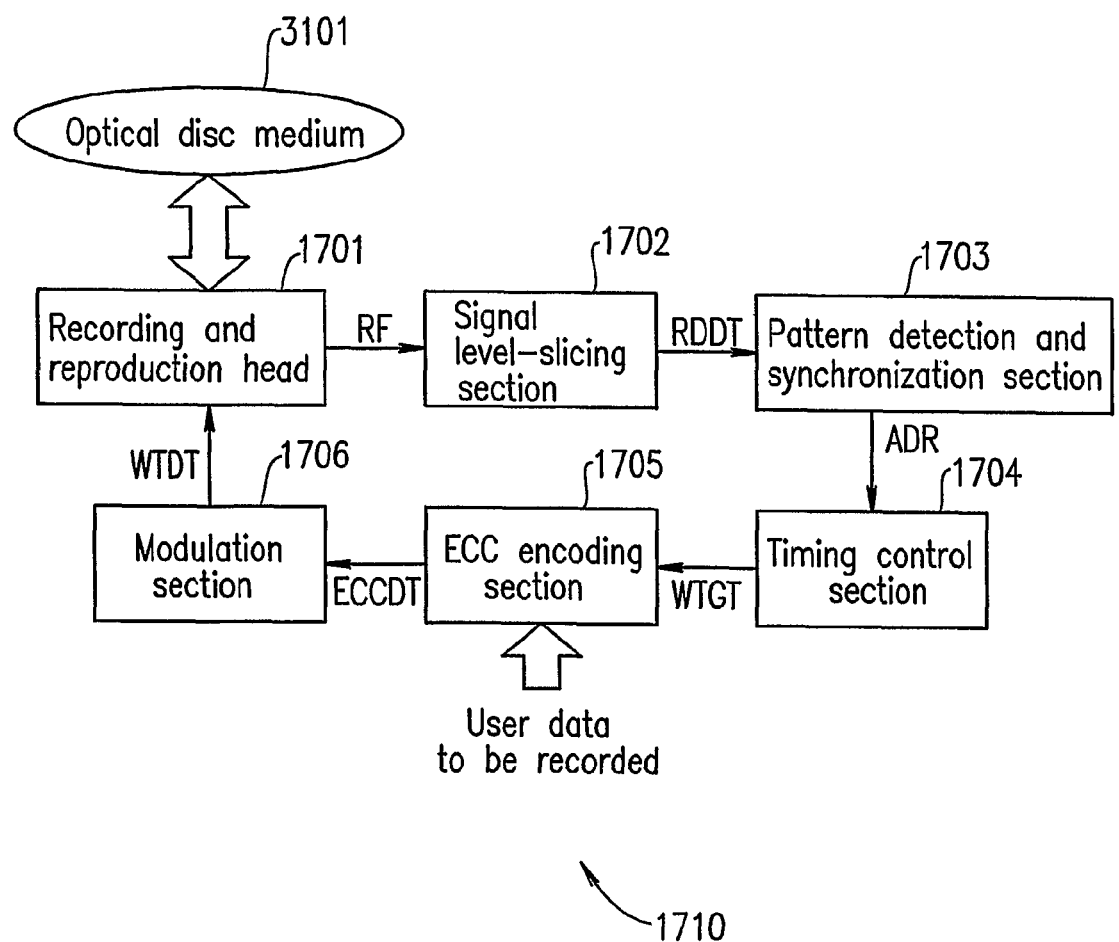
FIG. 38 shows a structure of an information recording apparatus (recording apparatus) 1710 according to a sixth example of the present invention.

FIG. 38 shows a structure of an information recording apparatus (recording apparatus) 1710 according to a sixth example of the present invention. The information recording apparatus 1710 records information on, for example, the optical disc medium 101 (FIG. 1), the optical disc medium 3101 (FIG. 8), the optical disc medium 401 (FIG. 23) or the optical disc medium 1001 (FIG. 35). In the following description, the information recording apparatus 1710 records information on the optical disc medium 3101 described in detail in the second example.

A recording and reproduction head 1701 records data on the optical disc medium 3101, or reads data pre-recorded on the optical disc medium 3101 or data recorded on the optical disc medium 3101 by an apparatus.

The recording and reproduction head 1701 includes, for example, a light source (for example, a semiconductor laser) for optically recording a signal, a driving circuit for driving the light source in correspondence with recording data WTDT, an optical system for collecting light emitted by the light source on a recording surface of the optical disc medium 3101 or detecting light reflected by the optical disc medium 3101 and reading the light as a signal, and an opto-electric converter for reproducing a read signal as an electric signal RF.

A signal level-slicing section 1702 amplifies the signal RF read by the recording and reproduction head 1701 and level-slices the signal RF by necessary processing.

A pattern detection and synchronization section 1703 detects a synchronization code sequence in conformity with the data format of the optical disc medium 3101 using level-sliced data RDDT obtained by the signal level-slicing section 1702, and identifies the position information of data which is being read by the recording and reproduction head 1701 in real time. The detailed internal operation of the pattern detection and synchronization section 1703 will be described later.

A timing control section 1704 controls the operation of an ECC encoding section 1705 and a modulation section 1706 so that data to be recorded is recorded at a prescribed position of the optical disc medium 3101 based on position information ADR obtained by the real-time identification performed by the pattern detection and synchronization section 1703. In addition to the control operations for recording, the timing control section 1704 also performs a search operation for moving the recording and reproduction head 1701 using the position information ADR so that the signal can be read or recorded at a prescribed position of the optical disc medium 3101.

The ECC encoding section 1705 adds redundant data such as an error correction code or the like to the user data to be recorded which is input from the outside of the information recording apparatus 1710 and encodes the resultant data into a prescribed format. The ECC encoding section 1705 also outputs the encoded data ECCDT to the modulation section 1706 based on a recording operation timing signal WTGT from the timing control section 1704. The ECC encoding section 1705 acts as a receiving section for receiving user data from the outside of the information recording apparatus 1710.

The modulation section 1706 receives the data ECCDT encoded by the ECC encoding section 1705, modulates the data ECCDT using a prescribed modulation system, and outputs the obtained data to the recording and reproduction head 1701 as recording data WTDT.

The information recording apparatus 1710 in the sixth example of the present invention records information on the optical disc medium 3101 by cooperation and association of the above-described elements. In order to additionally record data located subsequent to the data block in which data is already recorded (linking), precise recording needs to be performed to the data already recorded.

It is important that the information recording apparatus 1710 should correctly detect the position of the data already recorded and operate in precise synchronization therewith. For this purpose, an operation of detecting various synchronization code sequences described in detail in the second example using the level-sliced data reproduced by the recording and reproduction head 1701 and the level-slicing section 1702 so as to obtain correct position information, i.e., the operation of the pattern detection and synchronization section 1703, is most important. The position information ADR includes, for example, a sector position SPt, a frame position FPt, and a byte position BPt.

Figure 39:
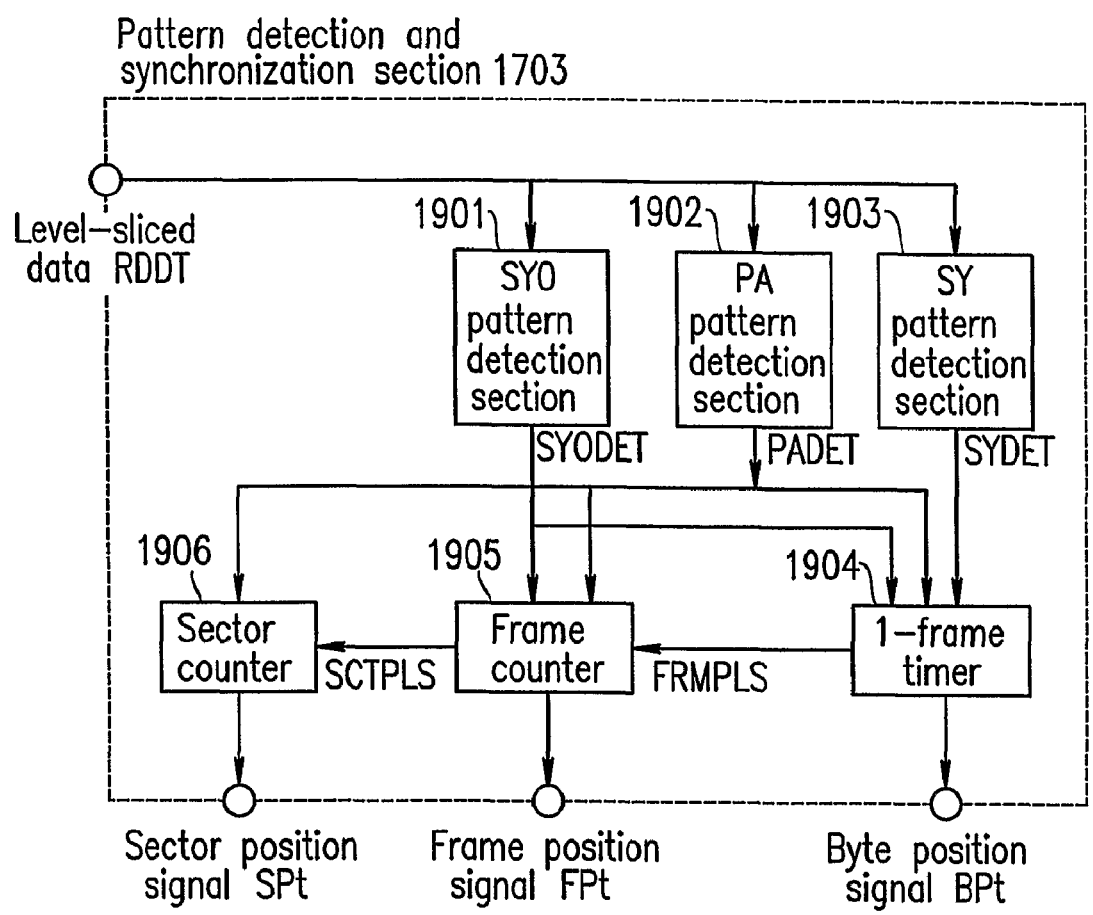
FIG. 39 shows an example of an internal structure of a pattern detection and synchronization section 1703.

FIG. 39 shows an example of an internal structure of the pattern detection and synchronization section 1703, which includes the following elements.

An SY0 pattern detection section 1901 detects an SY0 pattern from the level-sliced data RDDT and outputs an SY0 detection signal SY0DET. The SY0 pattern detection section 1901 acts as a first detection section for detecting the SY0 pattern (second synchronization code sequence).

A PA pattern detection section 1902 detects a PA pattern from the level-sliced data RDDT and outputs a PA detection signal PADET. The PA pattern detection section 1902 acts as a third detection section for detecting the PA pattern (third synchronization code sequence).

An SY pattern detection section 1903 detects an SY pattern from the level-sliced data RDDT and outputs an SY detection signal SYDET.

A 1-frame timer 1904 identifies the byte position from the start of each frame area and outputs a byte position signal BPt and a frame synchronization pulse FRMPLS reflecting the identification results in real time. The 1-frame timer 1904 includes, for example, a first counting section (not shown) for counting the number of bytes (93 bytes) or the number of channel bits (1488 channel bits in the case of the 8/16 modulation system) in one frame area, and a byte position detection window generation section (not shown) for generating a detection window for a synchronization code sequence. The 1-frame timer 1904 receives the detection signals SY0DET, PADET, and SYDET respectively from the pattern detection sections 1901 through 1903 and adjusts the built-in first counting section while appropriately controlling the detection window by the built-in byte position detection window generation section for preventing a synchronization shift from being caused by an incorrect detection of the pattern. The counting value obtained by the first counting section (representing the byte position of the start of the frame area) is output as a byte position signal BPt, and a frame synchronization pulse FRMPLS is output at a prescribed byte position once in one frame (about every 93 bytes).

The 1-frame timer 1904 basically predicts the position of a synchronization code sequence based on the pattern detection result of the immediately preceding synchronization code sequence, and opens the detection window during a time period in which the synchronization code sequence is expected to be detected. When a detection signal for the synchronization code sequence is received during this time period, the 1-frame timer 1904 determines that the correct synchronization code sequence is detected and presets the counting value BPt of the first counting section to a prescribed value. The preset value is not necessarily 0, but is determined in consideration of the time delay required for detection.

The number of bytes in each frame is equal among the frames. Therefore, the byte position detection window generation section controls the detection window to open for a prescribed time period every prescribed byte cycle (specifically, about every 93 bytes, which is the number of bytes in the frame area). The width of the detection window can be determined in consideration of all the fluctuation factors regarding signal reading performed by the recording and reproduction head 1701 (for example, a jitter component generated by rotation fluctuation, deflection or the like of the optical disc medium 3101, or data discontinuity in the linking frame area).

A frame counter 1905 identifies a frame position in each sector, and outputs a frame position signal FRt and a sector synchronization pulse SCTPLS reflecting the identification results in real time. The frame counter 1905 includes, for example, a second counting section (not shown) for counting the number of frames (26 to 27 frames) in one sector, and a frame position prediction window generation section (not shown) for generating a prediction window for a first synchronization code sequence SY0 and a third synchronization code sequence PA. The frame counter 1905 receives the frame synchronization pulse FRMPLS from the 1-frame timer 1904 and counts up the built-in second counting section. The frame counter 1905 also receives the detection signals SY0DET and PADET from the respective pattern detection sections, and adjusts the built-in second counting section while appropriately controlling the prediction window by the built-in frame position prediction window generation section for preventing a synchronization shift from being caused by an incorrect detection of the pattern.

The frame position prediction window generation section generates a prediction window for each of an SY0 pattern and a PA pattern in consideration of the order in which these patterns occurs. As described in detail in the second example, each synchronization code sequence is detected only in a prescribed order. For example, the second synchronization code sequence SY0 is detected once in one sector (once in 26 frame areas; or once in 27 frame areas where the first frame area 201 (FIG. 9) is included). Utilizing this, the frame position prediction window generation section can generate a prediction window for each synchronization code sequence.

When the detection signal SY0DET is output while the prediction window for the SY0 pattern is open, the frame counter 1905 presets the counting value FPt of the second counting section to 0. When the detection signal PADET is output while the prediction window for the PA pattern is open, the frame counter 1905 presets the counting value FPt of the second counting section to 26. Unless a detection signal is output, the counting value FPt of the second counting section is incremented by one each time the frame synchronization pulse FRMPLS is output. In this manner, the counting value of the built-in second counting section is output as a frame position signal FPt, and a sector synchronization pulse SCTPLS is output at a prescribed frame position once in one sector (every 26 to 27 frame areas).

A sector counter 1906 identifies a sector position in each data block, and outputs a sector position signal SPt reflecting the identification results in real time. The sector counter 1906 includes, for example, a third counting section (not shown) for counting the number of sectors (8 sectors) in one data block, and a sector position prediction window generation section (not shown) for generating a prediction window for the third synchronization code sequence PA. The sector counter 1906 receives the sector synchronization pulse SCT- PLS from the frame counter 1905 and counts up the built-in third counting section. The sector counter 1906 also receives the detection signal PADET from the PA pattern detection section 1902, and adjusts the built-in third counting section while appropriately controlling the prediction window by the built-in sector position prediction window generation section for preventing a synchronization shift from being caused by an incorrect detection of the pattern.

The sector position prediction window generation section generates a prediction window for the PA pattern in consideration of the order in which the PA pattern occurs. As described in detail in the second example, the third synchronization code sequence PA occurs only once in 8 sectors. The sector prediction window generation section can generate a prediction window utilizing this.

When the detection signal PADET is output while the prediction window for the PA pattern is open, the sector counter 1906 presets the counting value SPt of the third counting section to 0. Unless a detection signal PADET is output, the counting value SPt of the third counting section is incremented by one each time the sector synchronization pulse SCTPLS is output. In this manner, the counting value of the built-in third section is output as a sector position signal SPt.

The pattern detection and synchronization section 1703 having the above-described internal structure detects each synchronization code sequence (pattern) included in the data format described in detail in the second example, using level-sliced data RDDT which is read from the optical disc medium 3101. Thus, the position information of the reading data, i.e., the sector position SPt, the frame position FPt, and the byte position BPt are obtained in real time. Using such position information which is output from the pattern detection and synchronization section 1703, the timing control section 1704 (FIG. 38) can generate and output a recording operation timing signal WTGT which instructs at least the ECC encoding section 1705 to perform a recording operation.

The internal structure shown in FIG. 39 is merely an example. The internal structure of the pattern detection and synchronization section 1703 is not limited to this. In the example shown in FIG. 39, an SY0 pattern, an SY pattern and a PA pattern are used as synchronization code sequences to be detected. A PS pattern described in the third example can additionally be used. In this case, the number of patterns to be detected is increased, and therefore the synchronization performance and the position information identification performance are improved. This will be described below with reference to FIG. 40.

All the position information in the optical disc medium 3101 cannot be identified only with four types of synchronization code sequences. With the four types of synchronization code sequences, the sector position, the frame position and the byte position in each data block can be identified but the position of the data block currently read in an optical disc medium cannot be identified. In order to identify the position of the data block currently read, ID information is necessary. For example, the data position identification area DataID shown in FIG. 14 is used for that purpose.

Figure 40:
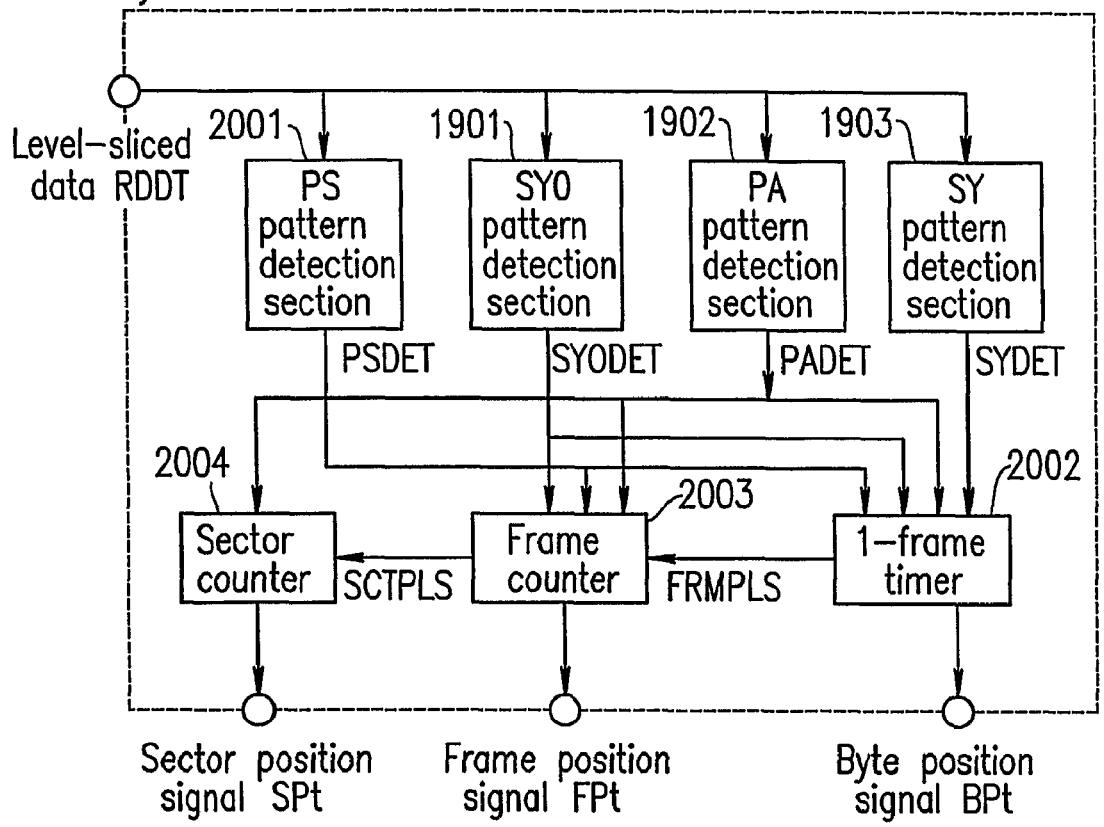
FIG. 40 shows another example of an internal structure of a pattern detection and synchronization section 1703.

FIG. 40 shows another example of an internal structure of the pattern detection and synchronization section 1703, which includes the following elements. The internal structure shown in FIG. 40 is different from the internal structure shown in FIG. 39 in that a PS pattern detection section 2001 is further included. Identical elements and identical internal signals transmitted between the elements as those described above with reference to FIG. 39 bear corresponding reference numerals thereto and will not be described in detail.

As described in the third example, a PS pattern is located at the end of the first frame area 501a, which is the linking position, for the purpose of improving the reliability of detecting the start of each data block. When the data block includes sectors, the first frame area 501a is necessarily located immediately before the second frame area at the start of the sector. Therefore, the PS pattern can also be used for the purpose of improving the reliability of detecting the start of each sector. Since the PS pattern is located at the end of the first frame area 501a, the PS pattern can also be used for the purpose of improving the reliability of detecting the start of each frame area. The PS pattern detection section 2001 acts as a fourth detection section for detecting the PS pattern (fifth synchronization code sequence).

For the above-described reasons, an output PSDET from the PS pattern detection section 2001, which is a detection result of the PS pattern, is input to a 1-frame timer 2002, a frame counter 2003, and a sector counter 2004, and is used for position identification in each of the counters.

Figure 41:
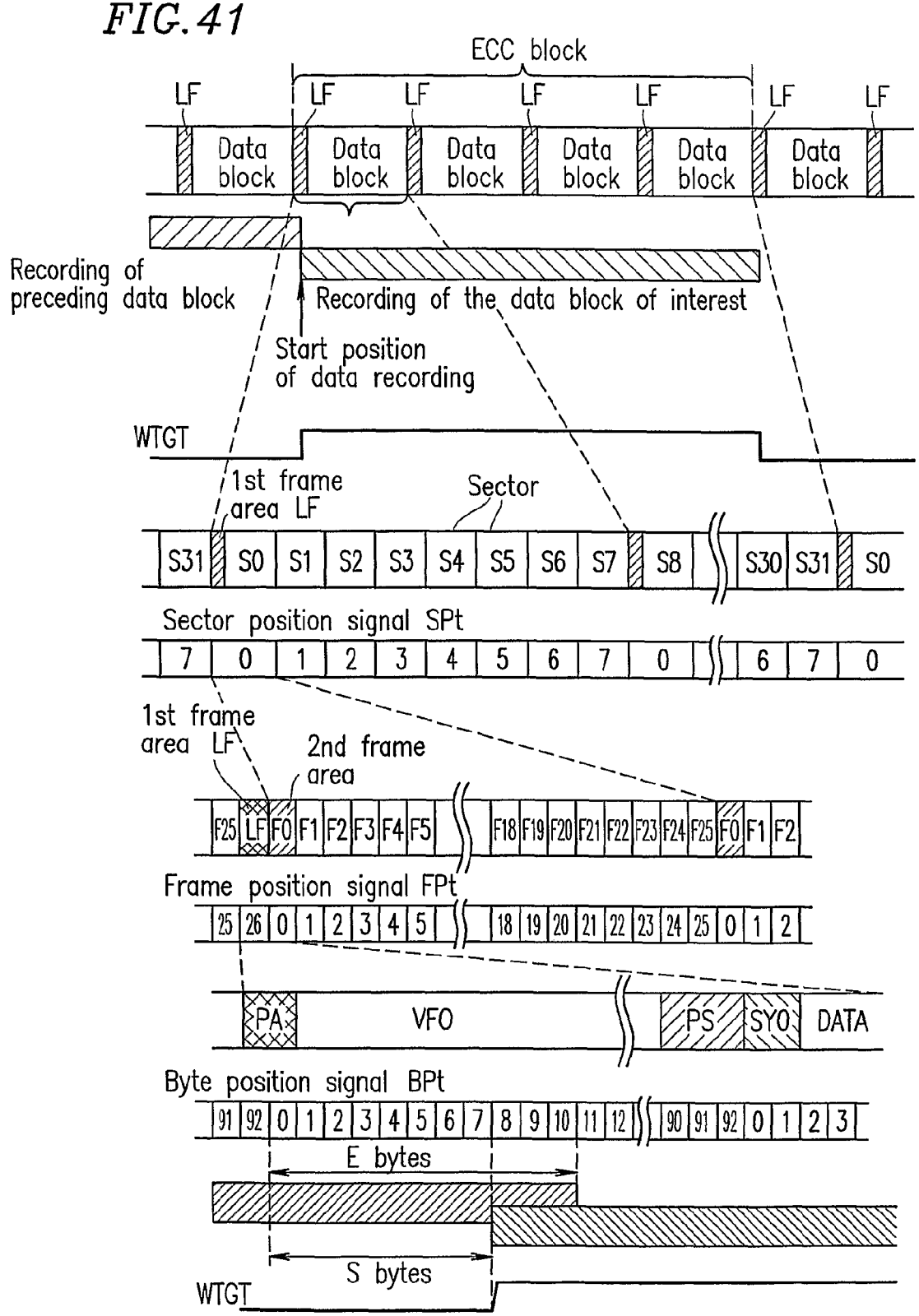
FIG. 41 shows the relationship between a data format of the optical disc medium 3101 and the position information.

FIG. 41 shows the relationship between the data format of the optical disc medium 3101 and the position information. In FIG. 41, the first frame area is represented by "LF". The first frame area is represented as having the fourth synchronization area PS described in the third example. FIG. 41 shows exemplary values of the position information, i.e., the sector position signal SPt, the frame position signal FPt, and the byte position signal BPt, in the state where the synchronization is established.

The sector position signal SPt takes values of 0 through 7 sequentially from the leading sector of each data block. In the first frame area LF at the start of the data block, the sector position signal SPt is 0.

The frame position signal FPt takes values of 0 through 25 sequentially from the leading sector of each sector, although the value of the frame position signal FPt is 26 in the first frame area LF. In all the sectors included in each data block, the value of the frame position signal FPt of each of the frame areas (F0 through F25) is in the range of 0 through 25.

The byte position signal BPt has a value of 0 through 92 sequentially from the leading sector of each frame area. In all the frame areas included in each sector, the value of the byte position signal BPt is 0 at the start of the frame area. The value of the byte position signal BPt when passing through any of the SY0 pattern, the SY pattern, or the PA pattern is 0 or 1.

FIG. 41 also shows an exemplary waveform of a recording operation timing signal WTGT generated by the timing control section 1704 using the position information (position signals SPt, FPt and BPt). The recording operation timing signal WTGT shown in FIG. 41 is for recording data in one ECC block, i.e., four continuous data blocks. The recording operation timing signal WTGT represents a recording operation when being at a HIGH level. At this point, the ECC encoding section 1705 outputs ECC-encoded data ECCDT to the modulation section 1706.

The additional data recording is performed in the first frame area which is a linking frame area. In other words, the beginning/termination of data recording is always performed in the second synchronization area VFO of the first frame area. Therefore, the recording operation timing signal WTGT changes from the LOW level to the HIGH level (beginning of recording) at the Sth byte counted from the start of the first frame area LF (S=8 in the example shown in FIG. 41) at the start of the data block which is at the start of the ECC block. The recording operation timing signal WTGT changes from the HIGH level to the LOW level (termination of recording) at the Eth byte counted from the start of the first frame area LF (E=11 in the example shown in FIG. 41) at the start of the next ECC block.

When proper synchronization is performed, in the first frame area LF, SPt=0 and FPt=26. Accordingly, the recording operation timing signal WTGT is preferably controlled so as to be at a HIGH level when {SPt=0, FPt=26 and BPt=S} in the current ECC block (in which the data is being recorded) and so as to be at a LOW level when {SPt=0, FPt=26 and BPt=E} in the next ECC block.

Thus, the pattern detection and synchronization section 1703 acts as a detection section for detecting a PA pattern (third synchronization code sequence). The timing control section 1704 acts as a determination section for determining the recording beginning position based on the start of the detected PA pattern. As described above with reference to FIG. 2, the timing control section 1704 can determine the recording beginning position randomly each time recording is performed.

The ECC encoding section 1705, the modulation section 1706 and the recording and reproduction head 1701 together act as a recording section for performing a recording process. As described above with reference to FIG. 2, the recording process includes a step of recording the record start VFO portion 2102 (first additional synchronization code sequence used for stably reproducing data) (FIG. 2), a step of recording a second frame, a step of recording a PA pattern, and a step of processing the record finish VFO portion 2101 (fourth additional synchronization code sequence used for stably reproducing data) in the VFO pattern (FIG. 2). In the case where the optical disc medium has a data format described in the third example, the recording process includes a step of recording a PS pattern.

During the recording operation, each synchronization code sequence is not detected (or controlled not to be detected). Therefore, each position signal (SPt, FPt, BPt) is not preset and interpolation is continued.

As described above, the information recording apparatus 1710 includes the pattern detection and synchronization section 1703 for detecting an SY0 pattern and a PA pattern from the pre-recorded data when additionally recording data to the information which is pre-recorded on the optical disc medium (linking) or overwriting data. The information recording apparatus 1710 also includes the timing control section 1704 for determining the timing for beginning recording of additional data using the result of pattern detection. Due to such a structure, information can be additionally recorded or overwritten while detecting the start of the first data unit (sector) or the second data unit (data block) where data is pre-recorded at a high speed and stably. Thus, the information recording apparatus obtains a significantly improved positional precision of recording and thus an enhanced reliability.

Accordingly, the information recording apparatus 1710 provides significant effects when applied to a large capacity, high speed data storage device, video disc recorder, and multimedia recorder.

Example 7

Figure 42:
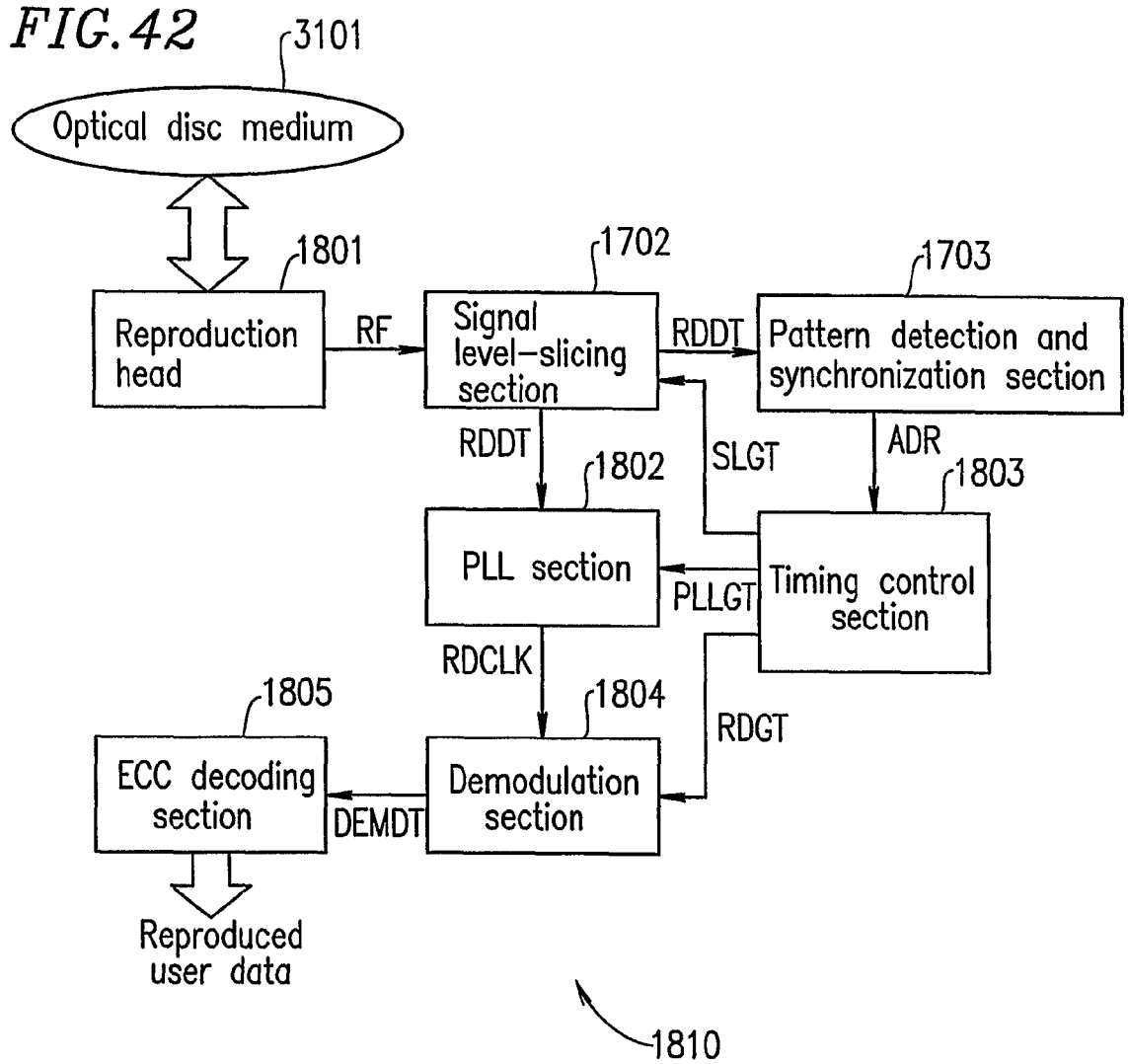
FIG. 42 shows a structure of an information reproduction apparatus (reproduction apparatus) 1810 according to a seventh example of the present invention.

FIG. 42 shows a structure of an information reproduction apparatus (reproduction apparatus) 1810 according to a seventh example of the present invention. The information reproduction apparatus 1810 reproduces information recorded on, for example, the optical disc medium 101 (FIG. 1), the optical disc medium 3101 (FIG. 8), the optical disc medium 401 (FIG. 23) or the optical disc medium 1001 (FIG. 35). In the following description, the information reproduction apparatus 1810 reproduces information recorded on the optical disc medium 3101 described in detail in the second example. In FIG. 42, the signal level-slicing section 1702 and the pattern detection and synchronization section 1703 are identical with those described above with reference to FIG. 38 and will not be described in detail.

A reproduction head 1801 reads data recorded on the optical disc medium 3101. The reproduction head 1801 includes, for example, a light source for irradiating the optical disc medium 3101 with light (for example, a semiconductor laser), an optical system for detecting light reflected by a recording surface of the optical disc medium 3101 and reading the light as a signal, and an opto-electric converter for reproducing read signal as an electric signal RF.

A PLL section 1802 uses level-sliced data RDDT obtained by the signal level-slicing section to reproduce a bit synchronization clock RDCLK in phase synchronization with the position of an edge of the level-sliced data RDDT.

A demodulation section 1804 demodulates reproduction data using the level-sliced data RDDT and bit synchronization clock RDCLK and outputs the post-demodulation data DEMDT.

A timing control section 1803 outputs a demodulation operation timing signal RDGT to the demodulation section 1804 so that data recorded at a prescribed position of the optical disc medium 3101 can be reproduced based on position information ADR obtained by the real-time identification performed by the pattern detection and synchronization section 1703. The demodulation operation timing signal RDGT represents a demodulation operation of reproduction data when being at a HIGH level. The demodulation section 1804 outputs post-demodulation signal DEMDT only when the RDGT is at a HIGH level.

The timing control section 1803 outputs a level-slicing control timing signal SLGT for controlling the mode of level slicing to the signal level-slicing section 1702. The level-slicing control timing signal SLGT represents a usual level-slicing operation mode when being at a HIGH level. The signal level-slicing section 1702 controls the level-slicing level using a reproduction signal RF when the SLGT is at a HIGH level. When the SLGT is at a LOW level, the signal level-slicing section 1702 holds the level-slicing level to the value at the time when SLGT is at a HIGH level and does not perform control.

The timing control section 1803 outputs a PLL control timing signal PLLGT for controlling the mode of PLL phase comparison to the PLL section 1802. The PLL control timing signal PLLGT represents a usual PLL-following mode when being a HIGH level. When the PLLGT signal is at a HIGH level, the PLL section 1802 controls the built-in PLL to be phase-locked to the level-sliced data RDDT. When the PLLGT signal is at a LOW level, the PLL section 1802 holds the PLL and does not perform control.

In addition to the control operations for reproduction, the timing control section 1803 also performs a search operation for moving the reproduction head 1801 using the position information ADR so that the signal can be read at a prescribed position of the optical disc medium 3101.

An ECC decoding section 1805 retrieves necessary data from the demodulated data DEMDT, corrects the retrieved data using an error correction code as necessary when an error is detected, and outputs the resultant data as user data.

The reproduction head 1801, the signal level-slicing section 1702, the PLL section 1802, the demodulation section 1804 and the ECC decoding section 1805 together act as a reproduction section for reproducing various synchronization signals recorded in a synchronization area of the optical disc medium 3101 and at least a portion of user data recorded in the data area DATA.

The information reproduction apparatus 1810 reproduces information recorded on the optical disc medium 3101 by cooperation and association of the above-described elements. It is important that the information reproduction apparatus 1810 should correctly detect the position of the data already recorded on the optical disc medium 3101 having the data format described in the second example and operate in precise synchronization therewith. For this purpose, an operation of detecting various synchronization code sequences described in detail in the second example using the level-sliced data reproduced by the reproduction head 1801 and the level-slicing section 1702 so as to obtain correct position information, i.e., the operation of the pattern detection and synchronization section 1703, is most important. The operation of the pattern detection and synchronization section 1703 is described above in detail with reference to FIGS. 39 and 40 and will not be described in detail.

Figure 43:
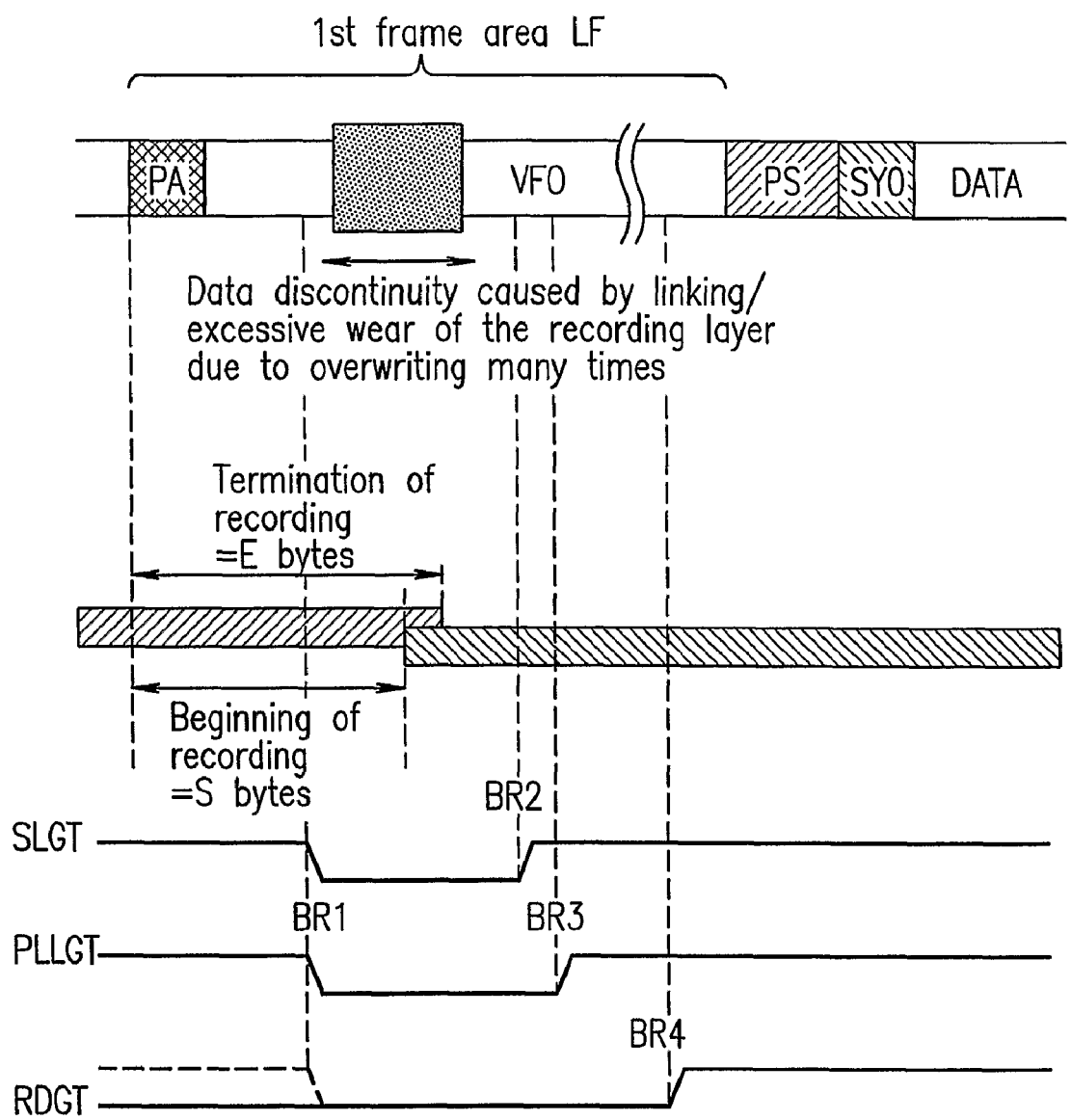
FIG. 43 shows operating waveforms of various timing signals used for reproducing data recorded in and in the vicinity of the first frame area LF corresponding to the linking frame.
Figure 44:
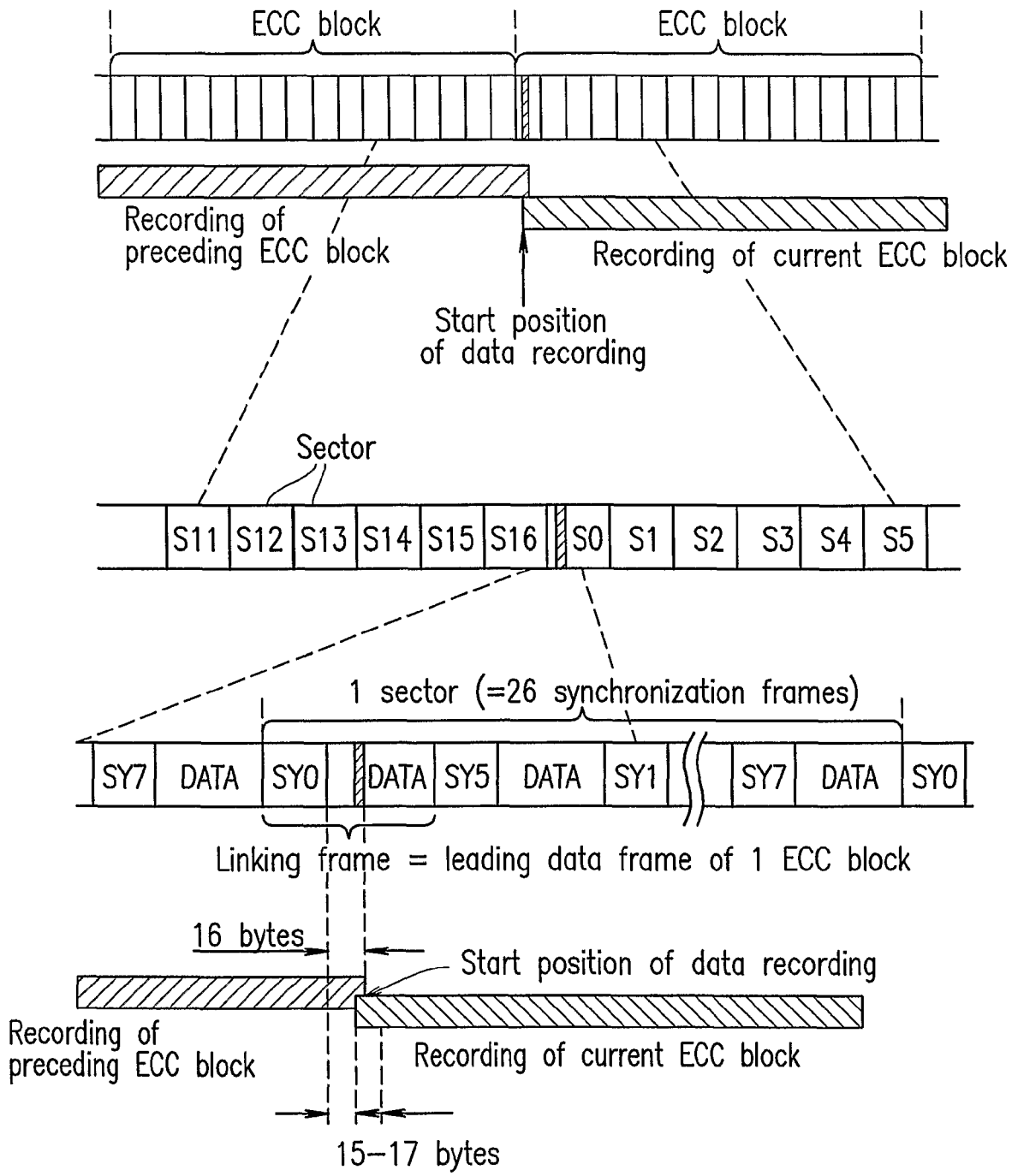
FIG. 44 shows a data format of a linking position and the vicinity thereof of a conventional DVD-RW.

FIG. 43 shows operating waveforms of various timing signals used for reproducing data recorded in and in the vicinity of the first frame area LF corresponding to the linking frame. The level-sliced control timing signal SLGT changes from a HIGH level to a LOW level at the BR1st byte counted from the start of the first frame area LF, and changes from a LOW level to a HIGH level at the BR2nd byte counted from the start of the first frame area LF. The PLL control timing signal PLLGT changes from a HIGH level to a LOW level at the BR1st byte counted from the start of the first frame area LF, and changes from a LOW level to a HIGH level at the BR3rd byte counted from the start of the first frame area LF, like the level-sliced control timing signal SLGT.

The demodulation operation timing signal RDGT is controlled in various manners depending on whether the immediately preceding data block is to be demodulated or not. When the immediately preceding data block is demodulated, the demodulation operation timing signal RDGT is at a HIGH level (as shown in FIG. 43 by dashed line), but changes from the HIGH level to a LOW level in the first frame area LF, at or before the BR1st byte counted form the start of the first frame area LF. Then, at or after the BR4th byte counted from the start of the first frame area LF, the demodulation operation timing signal RDGT is changed from the LOW level to a HIGH level. When the immediately preceding data block is not demodulated, the demodulation operation timing signal RDGT is already at a LOW at the start of the first frame area LF (as shown in FIG. 43 by solid line).

Here, it is assumed that the termination position of recording is the Eth byte counted from the start of the first frame area LF, the beginning position of recording is the Sth byte counted from the start of the first frame area LF (S and E are rational numbers less than 93 bytes and fulfill S≦E), and the length of the third synchronization code sequence PA is 2 bytes. The values of BR1, BR2, BR3 and BR4 are determined so as to fulfill 2≦BR1<S, E<BR2<BR3<BR4<93.

In other words, by setting the level-slicing control timing signal SLGT to a LOW level at least from the Eth byte counted from the start of the first frame area LF to the Sth byte counted from the start of the first frame area LF, the level-slicing level is held so as not to follow the reproduction signal RF in a portion where the quality of the reproduction signal RF is possibly inferior. The PLL control timing signal PLLGT is at a LOW level for at least a portion where SLGT=LOW, like the level-slicing control timing signal SLGT. However, the point at which the PLL control timing signal PLLGT changes from the LOW level to a HIGH level is set rearward with respect to the point at which the level-slicing control timing signal SLGT is changed. Thus, the level-slicing control timing signal SLGT is held without PLL control in a portion where the quality of the reproduction signal RF is possibly inferior, and after the operation of following the level-slicing is started, phase comparison between the PLL and the level-sliced data RDDT is resumed. The demodulation operation timing signal RDGT is set to be at a LOW level at least for a portion where PLLGT=LOW, like the PLL control timing signal PLLGT. However, the point at which the demodulation operation timing signal RDGT changes from the LOW level to a HIGH level is set rearward with respect to the point at which the PLL control timing signal PLLGT is changed. Thus, the demodulation operation is not performed in a portion where the quality of the reproduction signal RF is possibly inferior.

By setting the various timing signals as described above, even when data recorded in and in the vicinity of the first frame area LF (linking area) is reproduced, the data discontinuity caused by linking or the degradation in the recording layer caused by overwriting data many times is prevented from influencing the reproduction processing system of the information reproduction apparatus. Thus, data can be correctly reproduced.

The reproduction apparatus 1810 reproduces the specific purpose data recorded in the reproduction area of the optical disc medium 1001 (FIG. 35) as follows. A PA pattern (further third pattern) recorded in the first synchronization area PA in the first frame area 1101 (FIG. 36) is detected by the PA pattern detection section 1902 (detection section). In response to the detection, the specific purpose data (specific purpose data) recorded in the specific purpose data area DASP is reproduced.

Thus, the reproduction apparatus 1810 includes the pattern detection and synchronization section for detecting the second synchronization code sequence (SY0 pattern) and the third synchronization code sequence (PA pattern) and also the timing control section and the demodulation section for determining the timing for beginning the reading operation of information using the pattern detection result. Due to such a structure, the reproduction apparatus 1810 can reproduce information while detecting the start of the first data unit (sector) or the second data unit (data block) at a high speed and stably. Thus, the information reproduction apparatus 1810 can reproduce data at a high speed and stably.

The timing control section 1704 and the signal level-slicing signal 1702 together act as a level-slicing mode switching section for switching the level-slicing mode of a reproduction signal during a prescribed period of the first frame area LF using the pattern detection result. The timing control section 1704 and the PLL section 1802 together act as a clock reproduction mode switching section for reproducing a clock in bit synchronization with the reproduction signal. Due to such a structure, even when data is discontinuous or the quality of the reproduction signal is degraded at the linking position, information recorded in and in the vicinity of the linking position can be reproduced stably. As a result, the information reproduction apparatus 1810 has a significantly enhanced reliability of information reproduction.

Accordingly, the information reproduction apparatus 1810 provides significant effects when applied to a large capacity, high speed data storage device, video disc recorder, and multimedia recorder.

In the above-described seven examples, an optical disc medium is used as an information recording medium according to the present invention. The present invention is not limited to an optical disc medium. The present invention is applicable to, for example, a magnetic recording medium such as a hard disc. None of the above-described examples limits the present invention. The present invention is only limited by the claims.

The recording medium according to the present invention is not limited to either a medium having data pre-recorded or a medium having no data recorded. Data may be pre-recorded in the entirety of the information track of the recording medium, or the recording medium may have no data recorded. The recording medium may have an area in which data is pre-recorded and an area in which no data is recorded.

INDUSTRIAL APPLICABILITY

In a recording medium according to the present invention, a recording area includes a first area and a second area. The area includes a frame area. In the frame area, a second synchronization code sequence and at least a portion of data are recorded. The second area includes an area in which a third synchronization code sequence and a fourth synchronization code sequence are to be recorded. On such a recording medium, additional data recording (linking) can be performed with a position in the fourth synchronization code sequence as the beginning position. Thus, additional data recording is not performed in the frame area in which data is recorded. Therefore, data recording and reproduction can be stably performed even at the beginning position and termination position of the data recording.

The invention claimed is:

1. A PLL control device, comprising:
a PLL section for generating a clock signal from a reading signal, and
a timing control section for controlling an operation of the PLL section,
wherein the timing control section controls the PLL section to perform a hold operation during at least a period of a linking portion of the reading signal in the case where the reading signal includes the linking portion.

2. A PLL control device, comprising:
a PLL section for generating a clock signal from a reading signal, and
a timing control section for controlling an operation of the PLL section,
wherein the timing control section controls the PLL section to start the generating operation after at least a period of a linking portion of the reading signal in the case where the reading signal includes the linking portion.

3. A reproduction apparatus, comprising:
a PLL control device of claim 1, and
a reproduction section for reproducing data.

4. A reproduction apparatus, comprising:
a PLL control device of claim 2, and
a reproduction section for reproducing data.

* * * * *